(12) United States Patent
Wengreen

(10) Patent No.: US 11,231,744 B2
(45) Date of Patent: Jan. 25, 2022

(54) MOUNTING SYSTEMS FOR HEADPHONES

(71) Applicant: Innovelis, Inc., Sammamish, WA (US)

(72) Inventor: Eric John Wengreen, Sammamish, WA (US)

(73) Assignee: Innovelis, Inc., Sammamish, WA (US)

( * ) Notice: Subject to any disclaimer, the term of this patent is extended or adjusted under 35 U.S.C. 154(b) by 206 days.

(21) Appl. No.: 16/737,800

(22) Filed: Jan. 8, 2020

(65) Prior Publication Data

US 2020/0319671 A1  Oct. 8, 2020

Related U.S. Application Data

(63) Continuation-in-part of application No. 16/375,730, filed on Apr. 4, 2019, now Pat. No. 10,575,427.

(51) Int. Cl.
| | |
|---|---|
| *H05K 7/14* | (2006.01) |
| *H05K 5/02* | (2006.01) |
| *G06F 1/16* | (2006.01) |
| *H04R 1/10* | (2006.01) |
| *F16M 11/20* | (2006.01) |
| *F16M 13/02* | (2006.01) |

(52) U.S. Cl.
CPC ........... *G06F 1/1607* (2013.01); *F16M 11/20* (2013.01); *F16M 13/022* (2013.01); *H04R 1/1008* (2013.01)

(58) Field of Classification Search
CPC ............................... H05K 7/14; H05K 5/0204
USPC .......................................................... 348/836
See application file for complete search history.

(56) References Cited

U.S. PATENT DOCUMENTS

| | | | |
|---|---|---|---|
| 8,934,060 B1 | 1/2015 | Wengreen | |
| 8,934,061 B1 | 1/2015 | Wengreen | |
| 8,939,417 B1 | 1/2015 | Wengreen | |
| 9,339,112 B2 | 5/2016 | Wengreen | |
| 9,543,082 B1 | 1/2017 | Wengreen | |
| D797,750 S | 9/2017 | Wengreen | |
| 2003/0227854 A1* | 12/2003 | Weaver | G11B 33/0438 720/600 |

OTHER PUBLICATIONS

Headphone Monitor Hanger, available on Amazon.com on Mar. 8, 2016, downloaded on Jun. 10, 2020 from https://www.amazon.com/Mudder-Headphone-Headset-Hanger-Monitor/dp/B01COWDLGG.

* cited by examiner

*Primary Examiner* — Jeffery A Williams

(57) ABSTRACT

Mounting systems can attach headphones to computer monitors. Some systems mount headphones to a left side or to a right side of a computer monitor. A mounting system can include a base coupled to a backside of the computer monitor, a cantilever beam coupled to the base and protruding horizontally away from the base, and a headphone support coupled to a distal portion of the cantilever beam.

22 Claims, 38 Drawing Sheets

MOUNTING SYSTEMS FOR HEADPHONES

CROSS-REFERENCE TO RELATED APPLICATIONS

The entire contents of the following application are incorporated by reference herein: U.S. patent application Ser. No. 13/278,759; filed Oct. 21, 2011; and entitled MOUNTING SYSTEM FOR DIGITAL MEDIA PLAYERS.

The entire contents of the following application are incorporated by reference herein: U.S. patent application Ser. No. 13/332,373; filed Dec. 21, 2011; and entitled MOUNTING SYSTEM FOR DIGITAL MEDIA PLAYERS.

The entire contents of the following application are incorporated by reference herein: U.S. patent application Ser. No. 14/169,148; filed Jan. 30, 2014; and entitled MOUNTING METHODS FOR DIGITAL MEDIA PLAYERS.

The entire contents of the following application are incorporated by reference herein: U.S. patent application Ser. No. 14/209,452; filed Mar. 13, 2014; and entitled MOUNTING METHODS FOR DIGITAL MEDIA PLAYERS.

The entire contents of the following application are incorporated by reference herein: U.S. patent application Ser. No. 14/478,665; filed Sep. 5, 2014; and entitled MOUNTING SYSTEMS FOR DIGITAL MEDIA PLAYERS.

The entire contents of the following application are incorporated by reference herein: U.S. patent application Ser. No. 14/527,687; filed Oct. 29, 2014; and entitled MOUNTING SYSTEMS FOR DIGITAL MEDIA PLAYERS.

The entire contents of the following application are incorporated by reference herein: U.S. patent application Ser. No. 14/260,577; filed Apr. 24, 2014; and entitled MOUNTING SYSTEMS FOR ELECTRONIC DEVICES.

The entire contents of the following application are incorporated by reference herein: U.S. patent application Ser. No. 14/572,293; filed Dec. 16, 2014; and entitled MOUNTING SYSTEMS FOR ELECTRONIC DEVICES.

The entire contents of the following application are incorporated by reference herein: U.S. patent application Ser. No. 29/532,043; filed Jul. 1, 2015; and entitled MOUNT FOR ELECTRONIC DEVICES.

The entire contents of the following application are incorporated by reference herein: U.S. patent application Ser. No. 13/779,733; filed Feb. 27, 2013; and entitled LINE OF SIGHT MOUNTING SYSTEM FOR DIGITAL MEDIA PLAYERS.

The entire contents of the following application are incorporated by reference herein: U.S. patent application Ser. No. 13/781,717; filed Feb. 28, 2013; and entitled LINE OF SIGHT MOUNTING SYSTEM FOR DIGITAL MEDIA PLAYERS.

The entire contents of the following application are incorporated by reference herein: U.S. patent application Ser. No. 14/480,830; filed Sep. 9, 2014; and entitled MOUNTING SYSTEMS FOR DIGITAL MEDIA PLAYERS.

The entire contents of the following application are incorporated by reference herein: U.S. patent application Ser. No. 14/482,070; filed Sep. 10, 2014; and entitled MOUNTING SYSTEMS FOR DIGITAL MEDIA PLAYERS.

The entire contents of the following application are incorporated by reference herein: U.S. Patent Application No. 62/243,722; filed Oct. 20, 2015; and entitled MOUNTING SYSTEMS FOR DIGITAL MEDIA PLAYERS.

The entire contents of the following application are incorporated by reference herein: U.S. patent application Ser. No. 29/542,647; filed Oct. 15, 2015; and entitled MOUNT FOR ELECTRONIC DEVICES.

The entire contents of the following application are incorporated by reference herein: U.S. Patent Application No. 62/252,652; filed Nov. 9, 2015; and entitled MOUNTING SYSTEMS AND KITS FOR DIGITAL MEDIA PLAYERS.

The entire contents of the following application are incorporated by reference herein: U.S. Patent Application No. 62/245,723; filed Oct. 23, 2015; and entitled MOUNTING SYSTEMS FOR ELECTRICAL CABLES.

The entire contents of the following application are incorporated by reference herein: U.S. Patent Application No. 62/242,988; filed Oct. 16, 2015; and entitled MOUNTING SYSTEMS FOR REMOTE CONTROLS.

The entire contents of the following application are incorporated by reference herein: U.S. Patent Application No. 62/242,968; filed Oct. 16, 2015; and entitled MOUNTING SYSTEMS FOR DIGITAL MEDIA PLAYERS.

The entire contents of the following application are incorporated by reference herein: U.S. Patent Application No. 62/241,948; filed Oct. 15, 2015; and entitled MOUNTING SYSTEMS FOR DIGITAL MEDIA PLAYERS.

The entire contents of the following application are incorporated by reference herein: U.S. Patent Application No. 62/239,125; filed Oct. 8, 2015; and entitled MOUNTING SYSTEMS FOR DIGITAL MEDIA PLAYERS.

The entire contents of the following application are incorporated by reference herein: U.S. Patent Application No. 62/234,610; filed Sep. 29, 2015; and entitled MOUNTING SYSTEMS FOR DIGITAL MEDIA PLAYERS.

The entire contents of the following application are incorporated by reference herein: U.S. patent application Ser. No. 29/542,610; filed Oct. 15, 2015; and entitled MOUNT FOR ELECTRONIC DEVICES.

The entire contents of the following application are incorporated by reference herein: U.S. patent application Ser. No. 29/541,839; filed Oct. 8, 2015; and entitled CABLE HOLDER.

The entire contents of the following application are incorporated by reference herein: U.S. patent application Ser. No. 14/169,148; filed Jan. 30, 2014; and entitled MOUNTING METHODS FOR DIGITAL MEDIA PLAYERS.

The entire contents of the following application are incorporated by reference herein: U.S. patent application Ser. No. 29/514,250; filed Jan. 9, 2015; and entitled MOUNT FOR ELECTRONIC DEVICES.

The entire contents of the following application are incorporated by reference herein: U.S. patent application Ser. No. 29/522,576; filed Mar. 31, 2015; and entitled MOUNT FOR ELECTRONIC DEVICES.

The entire contents of the following application are incorporated by reference herein: U.S. patent application Ser. No. 15/089,181; filed Apr. 1, 2016; and entitled MOUNTING SYSTEMS FOR REMOTE CONTROLS.

The entire contents of the following patent are incorporated by reference herein: U.S. Pat. No. D716,580; issued Nov. 4, 2014; and entitled REMOTE CONTROL HOLDER.

The entire contents of the following patent are incorporated by reference herein: U.S. Pat. No. 10,299,400; issued May 21, 2019; and entitled MOUNTING SYSTEMS FOR DIGITAL MEDIA PLAYERS.

The entire contents of the following patent are incorporated by reference herein: U.S. Pat. No. 10,039,201; issued Jul. 31, 2018; and entitled MOUNTING SYSTEMS FOR DIGITAL MEDIA PLAYERS.

The entire contents of the following application are incorporated by reference herein: U.S. patent application Ser. No. 16/375,730; filed Apr. 4, 2019; and entitled MOUNTING SYSTEMS FOR DIGITAL MEDIA PLAYERS.

The entire contents of the following application are incorporated by reference herein: U.S. patent application Ser. No. 29/690,706; filed May 9, 2019; and entitled MOUNT FOR ELECTRONIC DEVICES.

The entire contents of the following application are incorporated by reference herein: U.S. patent application Ser. No. 29/715,709; filed Dec. 4, 2019; and entitled MOUNT FOR ELECTRONIC DEVICES.

The entire contents of the following application are incorporated by reference herein: U.S. patent application Ser. No. 29/710,657; filed Oct. 24, 2019; and entitled MOUNT FOR ELECTRONIC DEVICES.

The entire contents of the following application are incorporated by reference herein: U.S. patent application Ser. No. 29/709,809; filed Oct. 17, 2019; and entitled MOUNT FOR ELECTRONIC DEVICES.

The entire contents of the following application are incorporated by reference herein: U.S. patent application Ser. No. 29/690,707; filed May 9, 2019; and entitled MOUNT FOR ELECTRONIC DEVICES.

The entire contents of the following application are incorporated by reference herein: U.S. patent application Ser. No. 29/711,751; filed Nov. 1, 2019; and entitled MOUNT FOR HEADPHONES.

The entire contents of the following application are incorporated by reference herein: U.S. patent application Ser. No. 29/712,007; filed Nov. 5, 2019; and entitled MOUNT FOR HEADPHONES.

BACKGROUND

Field

Various embodiments disclosed herein relate to mounting systems and mounting methods. Certain embodiments relate to mounting systems for electronic devices such as audio headphones.

Description of Related Art

Headphone stands can be placed on top of desks. Audio headphones can be hung on a stand. These types of stands, however, take up limited and valuable desk space. In addition, headphone stands can be knocked over easily, which can lead to headphone damage. Moreover, headphone stands can block a user's view of a computer monitor.

Headphone hooks can be coupled to an underside of a desk. Headphone hooks, however, can cause painful knee injuries when a user sits down at her desk and slides her chair in. These painful knee injuries can also damage headphones.

Thus, there is a need for systems and methods to mount headphones more safely and conveniently.

SUMMARY

Mounting systems can be used to couple electronic devices to a wall, such as a wall of a building or a wall of a television. In some embodiments, the mounting system can couple electronic devices to a backside of a television such that a portion of the mounting system is located between the backside of the television and an electronic device such as a digital media player.

In some embodiments, a mounting system is configurable to couple an electronic device to a television. Mounting systems can comprise a base; a first sidewall that protrudes outward from the base; and/or a second sidewall that protrudes outward from the base such that the mounting system is configured to hold a least a portion of the electronic device between the first and second sidewalls.

In several embodiments, mounting systems comprise an anchor wall oriented within plus or minus 30 degrees of parallel to the base and coupled to the base by at least one connecting protrusion that protrudes inward from the base to the anchor wall; an adhesive coupled to the anchor wall and configured to couple the mounting system to the television; a first ventilation channel located between the base and the anchor wall; and/or a second ventilation channel in fluid communication with the first ventilation channel. The second ventilation channel can be oriented outward from the first ventilation channel such that the second ventilation channel is in fluid communication with an area between the first and second sidewalls, wherein the area is configured to hold the portion of the electronic device.

Mounting systems can include a base configured to hold the electronic device such that a portion of the base is located between the television and the electronic device. The base can comprise a bottom portion and a top portion. Mounting systems can also include a first ventilation channel located between a first wall and a second wall of the base. The first ventilation channel can continue from the bottom portion to the top portion of the base. As well, mounting systems can include a second ventilation channel in fluid communication with the first ventilation channel. The second ventilation channel can extend outward from the first ventilation channel such that the second ventilation channel fluidly couples the first ventilation channel with a portion of the mounting system configured to hold the electronic device.

In some embodiments, the first channel continues from a bottom portion of the base to a top portion of the base. In some embodiments, the bottom portion contains a first open end configured to provide access to electrical ports of the electronic device, and the top portion contains a second open end.

As well, in some embodiments, the mounting system further comprises a third channel in fluid communication with the first channel. The third channel can extend outward from the first channel such that the third channel fluidly couples the first channel with the portion of the mounting system configured to hold the electronic device. The mounting system can further comprise an adhesive configured to couple the base to the television. In some embodiments, a first central axis of the first channel is within plus or minus twenty degrees of a plane of the adhesive.

The second channel and the third channel can be within plus or minus forty degrees of being perpendicular to the first central axis of the first channel. As well, a second central axis of the second channel can be within plus or minus thirty degrees of a third central axis of the third channel. In some embodiments, a third central axis of the third channel can be substantially parallel to a second central axis of the second channel.

In some embodiments, the mounting system includes a fourth channel in fluid communication with the first channel. The fourth channel can extend outward from the first channel such that the fourth channel fluidly couples the first channel with the portion of the mounting system configured to hold the electronic device. The mounting system can even include a fifth channel in fluid communication with the first channel. The fifth channel can extend outward from the first channel such that the fifth channel fluidly couples the first channel with the portion of the mounting system configured to hold the electronic device.

The mounting system can further include a sixth channel in fluid communication with the first channel. The sixth channel can extend outward from the first channel such that the sixth channel fluidly couples the first channel with the portion of the mounting system configured to hold the electronic device. The mounting system can also include a seventh channel in fluid communication with the first channel. The seventh channel can extend outward from the first channel such that the seventh channel fluidly couples the first channel with the portion of the mounting system configured to hold the electronic device. In some embodiments, the fourth channel is substantially parallel to at least one of the fifth channel, the sixth channel, and the seventh channel. Furthermore, the fourth channel can be substantially parallel to the fifth channel. As such, the fifth channel can be substantially parallel to the sixth channel, and the sixth channel can be substantially parallel to the seventh channel.

In some embodiments, the base comprises a first sidewall and a second sidewall. The second channel, the first sidewall, and the second sidewall can extend outward.

As well, in some embodiments, the first channel extends from a top opening to a bottom opening of the base. The top opening and the bottom openings can be located between the first wall and the second wall of the base.

Even still, in some embodiments, mounting systems can include an adapter slideably received by the base between the first wall and the second wall. In some embodiments, the adapter comprises an aperture. When the adapter is slideably received by the base between the first wall and the second wall, the aperture can be in fluid communication with the first channel and the second channel.

In some embodiments, the mounting system further includes adhesive configured to couple the base to the television. The first channel can be located between the adhesive and the base. The first channel can be located between the adhesive and the first wall, and the first channel can be located between the adhesive and the second wall.

As well, in some embodiments, the mounting system further comprises one or more legs coupled between the base and the adhesive. In some embodiments, the one or more legs comprise four legs. The second channel can extend along a first direction. As well, the one or more legs can extend along the first direction.

The disclosure also includes a mounting kit configured to couple an electronic device and a remote control to a television. The mounting kit can include a mount configurable to couple the electronic device to the television; and a remote holder configurable to couple the remote control to the television. The remote control can be communicatively coupled to the electronic device.

In some embodiments, the mount comprises adhesive configurable to couple the electronic device to a backside of the television. As well, in some embodiments, the remote holder comprises adhesive configurable to couple the electronic device to at least one of a side of the television and the backside of the television.

The electronic device can be a first electronic device having a first thickness. As well, in some embodiments, the kit can further include an adapter slideably received by the mount. The adapter can allow the mount to securely receive a second electronic device having a second thickness that is less than the first thickness.

The remote holder can be configurable to receive a charging cable such that when the remote holder receives the remote control the charging cable electrically couples with the remote control. The mount can be configurable to receive at least one of a power cable electrically coupled to the electronic device and a High-Definition Multimedia Interface cable communicatively coupled to the electronic device.

In some embodiments, the mounting kit further includes a cord management system configurable to guide at least one of the charging cable, the High-Definition Multimedia Interface cable, and the power cable. The cord management system can comprise adhesive configurable to couple the cord management system to the backside of the television. In some embodiments, the electronic device comprises a streaming media player and/or a gaming console. Accordingly, in some embodiments, the mounting kit further comprises a gaming controller configurable to be communicatively coupled to the gaming console. Even still, in some embodiments, the mounting kit further comprises an HDMI cable configurable to communicatively couple to the electronic device. The mount can be configurable to receive the HDMI cable.

The disclosure also includes a mounting kit configured to couple an electronic device and a cable to a television. The mounting kit can comprise a mount configurable to couple the electronic device to the television; and a cord management system configurable to guide the cable coupled to the electronic device.

In some embodiments, the mount comprises adhesive configurable to couple the electronic device to a backside of the television. As well, in some embodiments, the cord management system comprises adhesive configurable to couple the cord management system to the backside of the television.

The electronic device can be a first electronic device having a first thickness. The kit can further include an adapter slideably received by the mount. The adapter can allow the mount to securely receive a second electronic device having second thickness that is less than the first thickness.

In some embodiments, a mounting system is configurable to couple audio headphones to a monitor. The mounting system can comprise a first adhesive; a base configured to be coupled to a backside of the monitor by the first adhesive; and/or a first cantilever beam coupled to the base and configured to protrude horizontally away from the base.

In some embodiments, a mounting system comprises a headphone support coupled to a distal portion of the first cantilever beam. The headphone support can be configured to hold a headband of the headphones such that the headphones are coupled to the monitor by the mounting system.

In some embodiments, a headphone support comprises a platform configured to hold a headband of headphones. A base can be coupled to the backside of the monitor such that the first cantilever beam positions the platform to at least one of a left side of the monitor and a right side of the monitor.

In some embodiments, a platform comprises an upward facing side, a distally facing side, a proximally facing side, a front facing side, a back facing side, and a downward facing side. The upward facing side can be at least twice as large (in surface area) as the distally facing side, the proximally facing side, the front facing side, and the back facing side. The platform can be configured to be oriented horizontally such that the platform protrudes inward and outward relative to the first cantilever beam.

In some embodiments, the proximally facing side comprises a first sidewall that protrudes upward and the distally facing side comprises a second sidewall that protrudes upward such that the platform holds the headphones and at least a portion of the headband is located between the first sidewall and the second sidewall.

In some embodiments, a headphone support comprises an upward facing surface that is convex. The upward facing surface can comprise a first side, a second side located opposite the first side, and a middle portion located between the first side and the second side. The middle portion is farther upward than the first side and the second side.

In some embodiments, a base is coupled to the backside of the monitor such that the first cantilever beam positions the upward facing surface to at least one of a left side of the monitor and a right side of the monitor.

In some embodiments, a headphone support comprises a first sidewall located on a proximal portion of the headphone support and a second sidewall located on a distal portion of the headphone support such that the headphone support is configured to hold at least a portion of the headband between the first sidewall and the second sidewall.

In some embodiments, the first sidewall and the second sidewall protrude upward. The base is coupled to the backside of the monitor such that the first cantilever beam positions the first sidewall and the second sidewall to a left side of the monitor or to a right side of the monitor.

In some embodiments, a first cantilever beam comprises a first central axis oriented in a first direction toward the headphone support. A base can comprise a first portion having a second cantilever beam that protrudes in a second direction that is within twenty degrees of parallel to the first direction. A base can comprise a third cantilever beam that protrudes in a third direction that is within twenty degrees of opposite to the first direction. The second cantilever beam can protrude away from the third cantilever beam. The second cantilever beam and the third cantilever beam can be on opposite sides of the base. The first portion of the base can be configured to be coupled to the backside of the monitor by the first adhesive.

In some embodiments, the second cantilever beam is thin such that the second cantilever beam is configured to bend according to the contours of the backside of the monitor such that adhesive can couple the second cantilever beam to the backside of the monitor even if the backside is curved. The second cantilever beam can comprise a first length of greater than 14 millimeters and less than 100 millimeters; a first height greater than 14 millimeters and less than 35 millimeters, and a first thickness less than 4 millimeters and greater than 0.7 millimeters.

In some embodiments, the third cantilever beam is thin such that the third cantilever beam is configured to bend according to the contours of the backside of the monitor such that adhesive can couple the third cantilever beam to the backside of the monitor even if the backside is curved. The third cantilever beam can comprise a first length of greater than 14 millimeters and less than 100 millimeters; a first height greater than 14 millimeters and less than 35 millimeters, and a first thickness less than 4 millimeters and greater than 0.7 millimeters.

Some embodiments comprise a second adhesive and a first stretchable foam tape that couples the first adhesive to the second adhesive. The first stretchable foam tape can be configured to break a first adhesion between the backside of the monitor and the first adhesive and to break a second adhesion between the first portion of the base and the second adhesive in response to a user stretching the first stretchable foam tape.

In some embodiments, the first stretchable foam tape comprises a first pull tab configured to enable the user to stretch the first stretchable foam tape. The first pull tab can be coupled to the third cantilever beam.

In some embodiments, the base comprises a second portion having a fourth cantilever beam that protrudes in a fourth direction that is within twenty degrees of parallel to the first direction and a fifth cantilever beam that protrudes in a fifth direction that is within twenty degrees of opposite to the first direction. The fourth cantilever beam and the fifth cantilever beam can be on opposite sides of the base. The second portion of the base can be configured to be coupled to the backside of the monitor by adhesive.

Some embodiments comprise a second adhesive coupled to the first portion of the base, a third adhesive, a fourth adhesive coupled to the second portion of the base, a first foam tape that couples the first adhesive to the second adhesive, and a second foam tape that couples the third adhesive to the fourth adhesive.

In some embodiments, the first adhesive couples the first foam tape to the backside of the monitor, the second adhesive couples the first foam tape to the first portion of the base, the third adhesive couples the second foam tape to the backside of the monitor, and the fourth adhesive couples the second foam tape to the second portion of the base.

In some embodiments, a headphone support comprises a platform configured to hold the headband. The platform can comprise a first channel having a first opening and a second opening.

In some embodiments, a mounting system comprises a first protrusion coupled to the distal portion of the first cantilever beam and a second protrusion coupled to the distal portion of the first cantilever beam. The first protrusion and the second protrusion can secure the first cantilever beam to the platform. The first protrusion and the second protrusion can be configured to couple the first cantilever beam to the platform by entering the first opening and residing at least partially inside the first channel.

In some embodiments, the first protrusion is a first cantilever protrusion having a third protrusion configured to pass through the first channel and impede the first cantilever protrusion from exiting the first channel by interfering with the second opening.

In some embodiments, the second protrusion is a second cantilever protrusion having a fourth protrusion configured to pass through the first channel and impede the second cantilever protrusion from exiting the first channel by interfering with the second opening.

In some embodiments, the first protrusion and the second protrusion are configured to flex toward each other to enable the third protrusion and the fourth protrusion to pass through the first channel. The first protrusion and the second protrusion are configured to flex away from each other to enable the third protrusion and the fourth protrusion to interfere with the second opening to impede the first and second cantilever protrusions from exiting the first channel.

In some embodiments, a headphone support comprises a platform configured to hold the headband. The platform can comprise a first channel having a proximal opening and a distal opening. The first cantilever beam can comprise a first central axis oriented in a first direction toward the headphone support.

In some embodiments, a mounting system comprises a first protrusion coupled to the distal portion of the first cantilever beam and a second protrusion coupled to the distal portion of the first cantilever beam. The first protrusion can protrude in a second direction that is within twenty degrees of parallel to the first direction. The second protrusion can protrude in a third direction that is within twenty degrees of parallel to the first direction. The first protrusion and the second protrusion can be oriented within twenty degrees of parallel to each other.

In some embodiments, the first protrusion and the second protrusion are located at least partially in the first channel, a third protrusion is coupled to a distal portion of the first protrusion, and the third protrusion interferes with the distal opening such that the third protrusion is configured to impede the first protrusion from exiting the first channel out of the proximal opening.

In some embodiments, a headphone support comprises a platform configured to hold the headband. The platform can comprise a distal sidewall, a proximal sidewall, a front sidewall, and a back sidewall. The headphone support can comprise a rubber pad located at least partially between the distal sidewall, the proximal sidewall, the front sidewall, and the back sidewall.

In some embodiments, a rubber pad comprises a first sidewall coupled to a distal portion of the rubber pad and a second sidewall coupled to a proximal portion of the rubber pad. At least a portion of the headband can be located between the first sidewall and the second sidewall such that the first cantilever beam positions the portion of the headband to at least one of a left side of the monitor and a right side of the monitor, and the first adhesive couples the base to the backside of the monitor.

In some embodiments, a headphone support comprises a platform configured to hold the headband, the platform comprises a first channel, at least a first portion of the first cantilever beam is located in the first channel, the headphone support comprises a rubber pad configured to face upward toward at least a portion of the headband, the rubber pad comprises an open area, and the rubber pad is coupled to the platform such that the first channel is located at least partially in the open area of the rubber pad.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Mounts for Media Players

Referring now to FIGS. 1-34, electronic devices include many types of devices that send content (e.g., movies, TV shows) to televisions. Electronic devices can include Digital Video Disc (DVD) players, Blu-ray players, digital media extenders, and digital media players such as Apple TV (made by Apple, Inc.), Roku players (made by Roku, Inc.), and Amazon Fire TV (made by Amazon.com, Inc.).

Digital media players often transmit digital signals wirelessly or through a wire such as a High-Definition Multimedia Interface (HDMI) cable to a screen that displays an image based on the digital signal. Screens include monitors, televisions, and image-producing portions of movie projectors. Televisions include flat-panel displays, flat-screen televisions, and tube televisions.

Owners of digital media players may prefer to mount their digital media players near their screens. For example, a person who owns a flat screen television that is mounted on the wall might want to mount her Apple TV onto her flat screen television or onto the wall behind her flat screen television. Some embodiments described herein enable people to mount their digital media players to their televisions (e.g., to a backside of a television).

Figure 4:
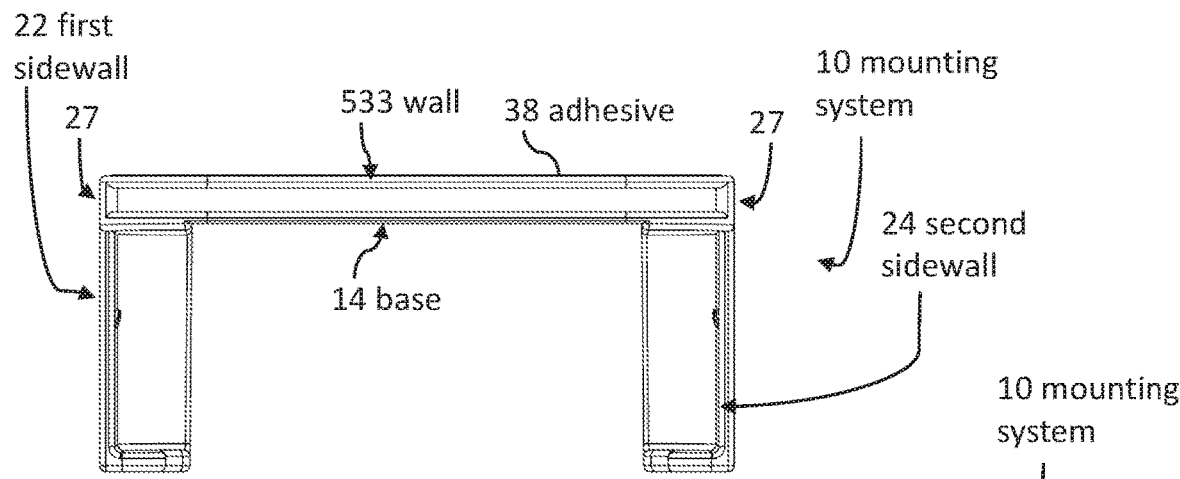
FIG. 4 illustrates a top view of an embodiment of a mounting system, according to some embodiments.
Figures 5, 6:
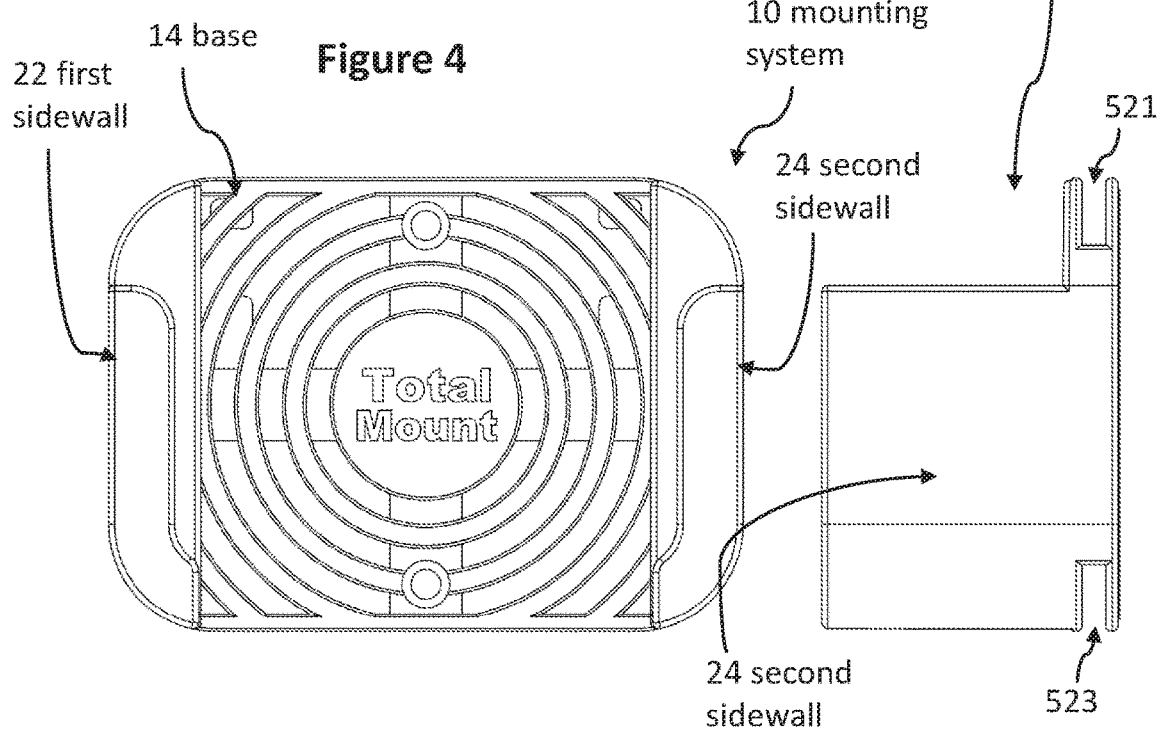
FIG. 5 illustrates a front view of an embodiment of a mounting system, according to some embodiments.
FIG. 6 illustrates a right side view of an embodiment of a mounting system, according to some embodiments.
Figure 7:
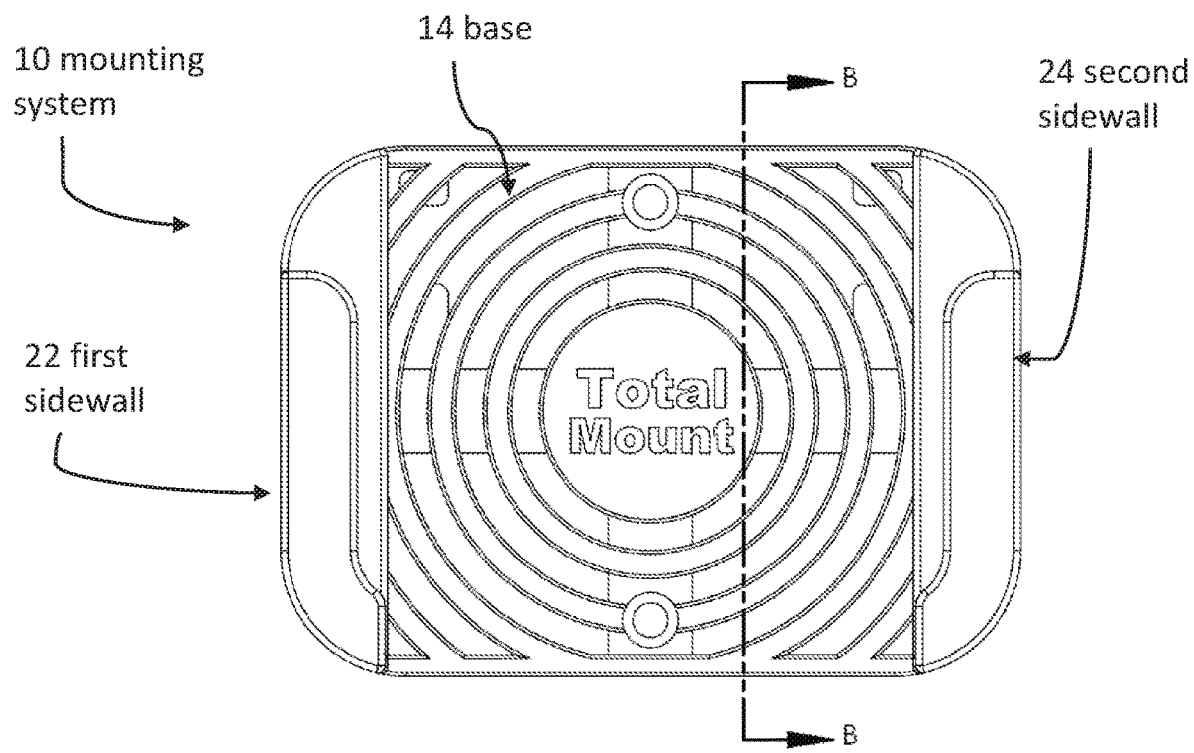
FIG. 7 illustrates a front view of an embodiment of a mounting system, according to some embodiments.
Figure 8:
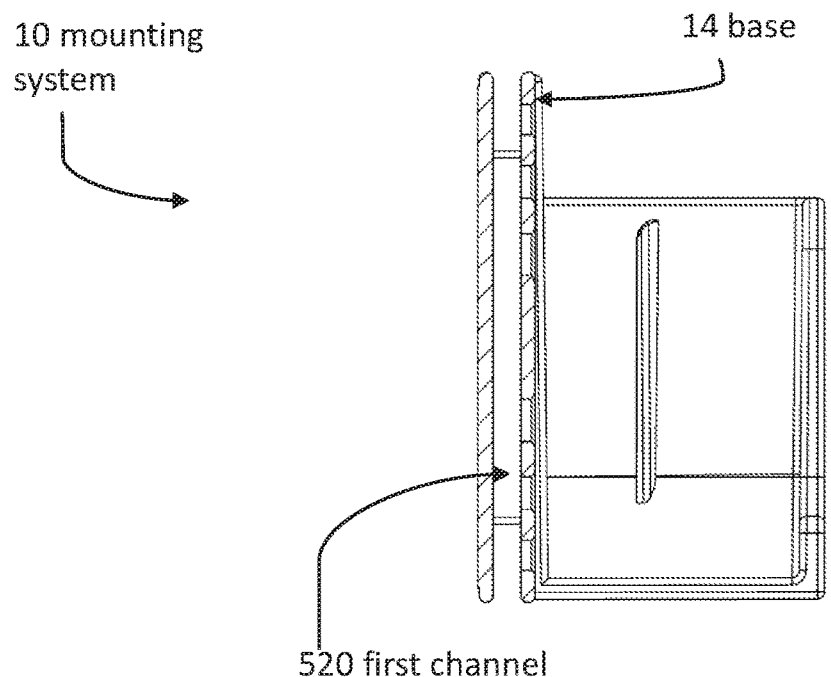
FIG. 8 illustrates a cross-sectional view along line B-B from FIG. 7, according to some embodiments.

The disclosure includes various mounting systems 10 for mounting electronic devices 11 (e.g. digital media players) to various surfaces (e.g. a backside surface of a television 13, a wall of a building, etc.). In some embodiments, a mounting system 10 is configurable to couple an electronic device 11 to a television 13. The mounting system 10 can include a base 14 configured to hold the electronic device 11 such that a portion of the base 14 is located between the television 13 and the electronic device 11. In some embodiments, the base 14 comprises and a top portion 34 and a bottom portion 36. In some embodiments, the mounting system 10 comprises a first sidewall 22 and a second sidewall 24 that extend outward away from the base 14. As illustrated in FIGS. 4 and 5, the first sidewall 22 and the second sidewall 24 can be located at opposite sides of the base 14.

Figure 19:
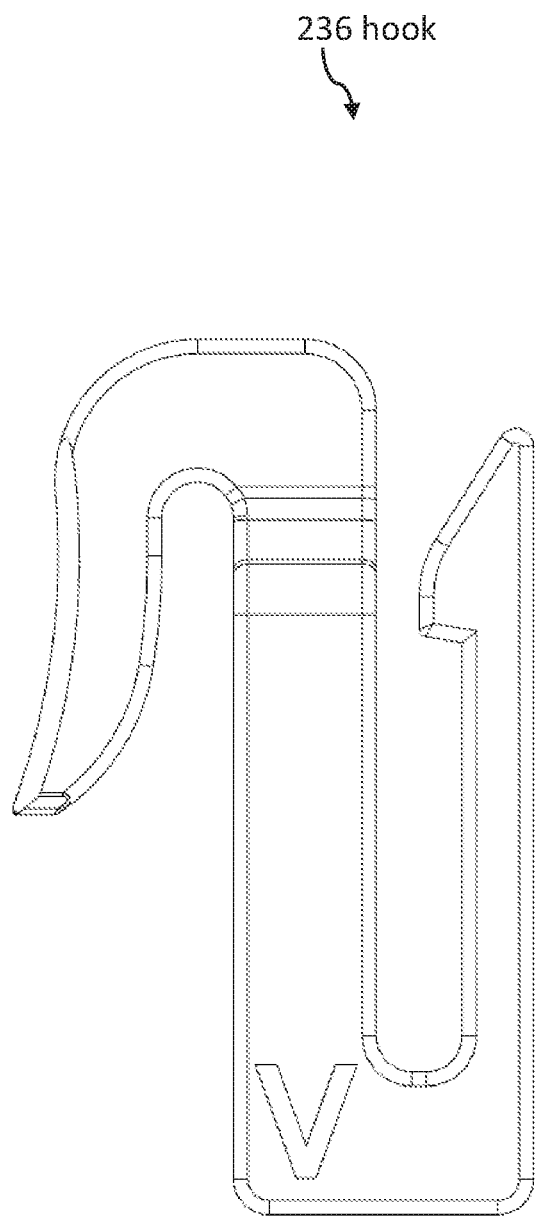
FIG. 19 illustrates a side view of an embodiment of a hook, according to some embodiments.

The mounting systems 10 can also be coupled to walls (e.g., a wall of an electronic display such as a television 13) via adhesive 38, such as adhesive pads made by 3M Company, which has offices in St. Paul, Minn. The mounting systems 10 can also be coupled to walls and various surfaces via screws (not shown) and hooks 236 (as shown in FIG. 19). For example, the mounting systems 10 described herein can use the hooks 236 as described in U.S. Provisional patent application Ser. No. 14/169,148.

The mounting systems 10 can be molded from acrylonitrile butadiene styrene ("ABS"). In some embodiments, surfaces of the mounting systems 10 that may touch portions of the electronic device 11 (e.g. media player) are overmolded with a softer material, which can be a thermoplastic elastomer ("TPE").

Figure 9:
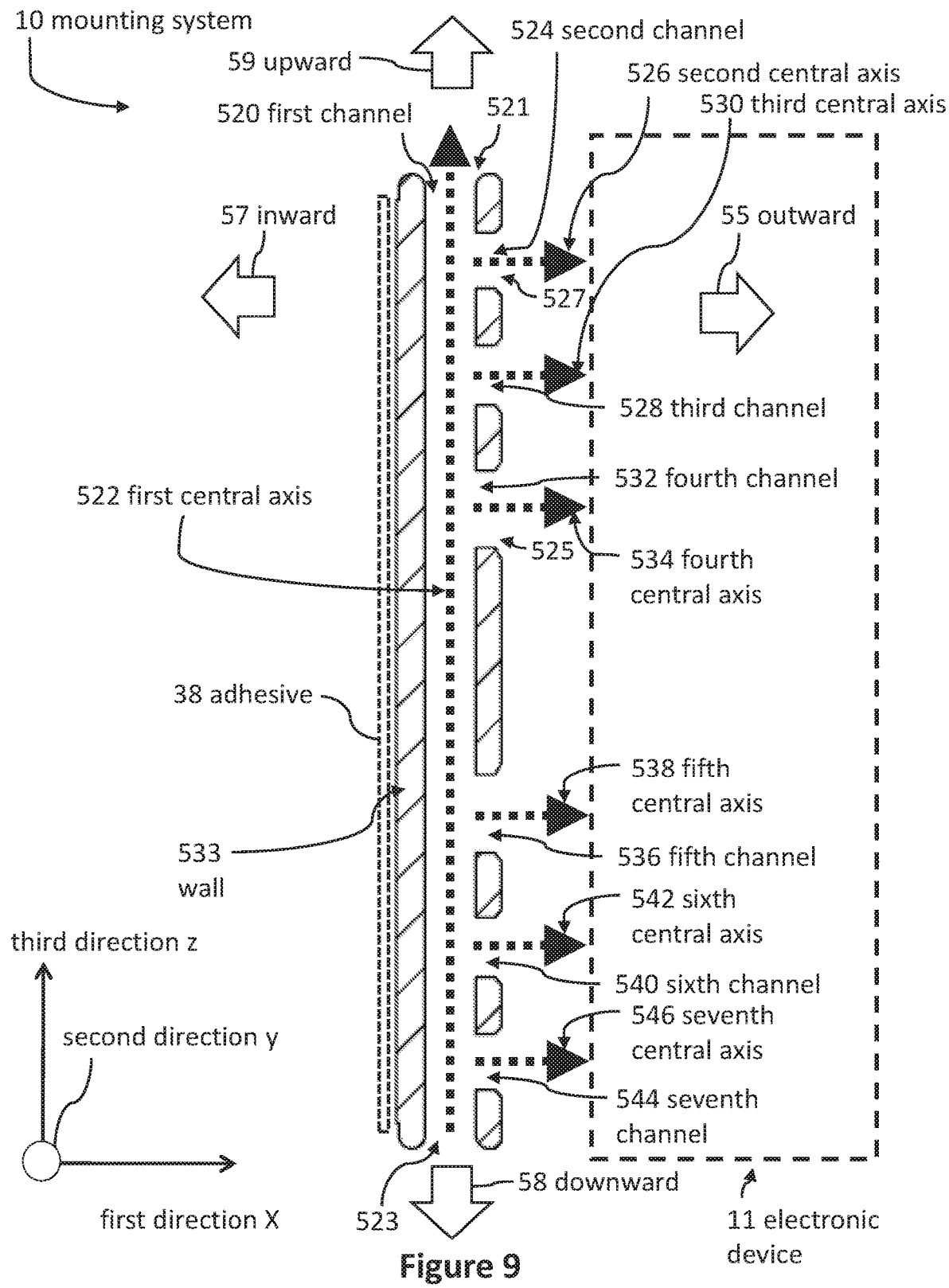
FIG. 9 illustrates a slice-sectional view along line B-B from FIG. 7, according to some embodiments.

Some mounting systems 10 can include at least one channel that passes through an internal portion of the mounting system 10 to thereby provide airflow to the electronic device 11. The channels can allow air to flow to the electronic device 11 to prevent the electronic device 11 from getting too hot during use. With reference to FIG. 9, mounting systems 10 can include a first channel 520 located between a first wall 22 and a second wall 24 of the base 14 and a second channel 524 in fluid communication with the first channel 520. The first channel 520 can continue along a third direction Z from the bottom portion 36 to the top portion 34 of the base 14. As well, the second channel 524 can extend outward from the first channel 520 such that the second channel 524 fluidly couples the first channel 520 with a portion of the mounting system 10 configured to hold the electronic device 11. In this regard, the second channel 524 can extend along a first direction X.

Figure 1:
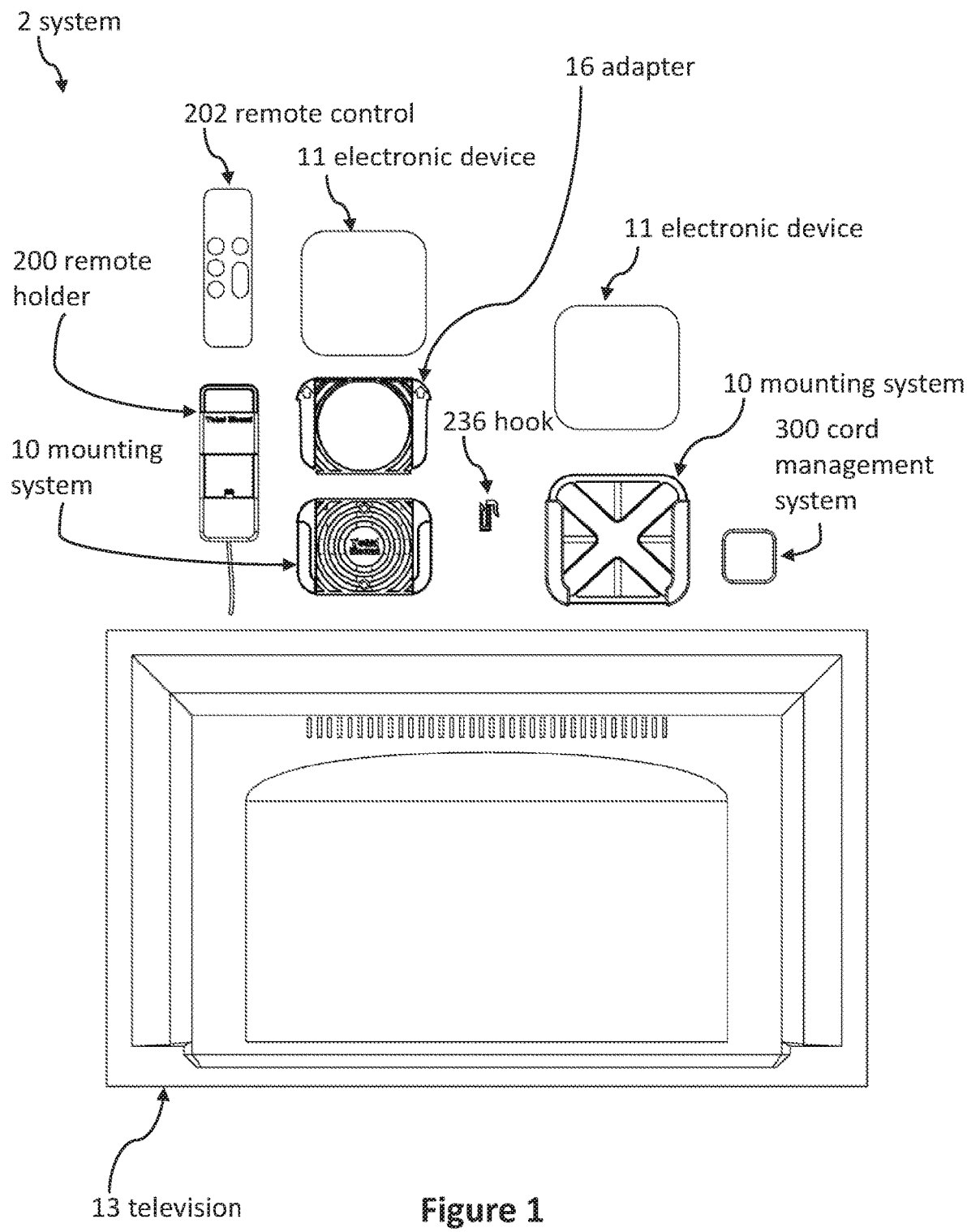
FIG. 1 illustrates a front view of an embodiment of the system, according to some embodiments.
Figure 2:
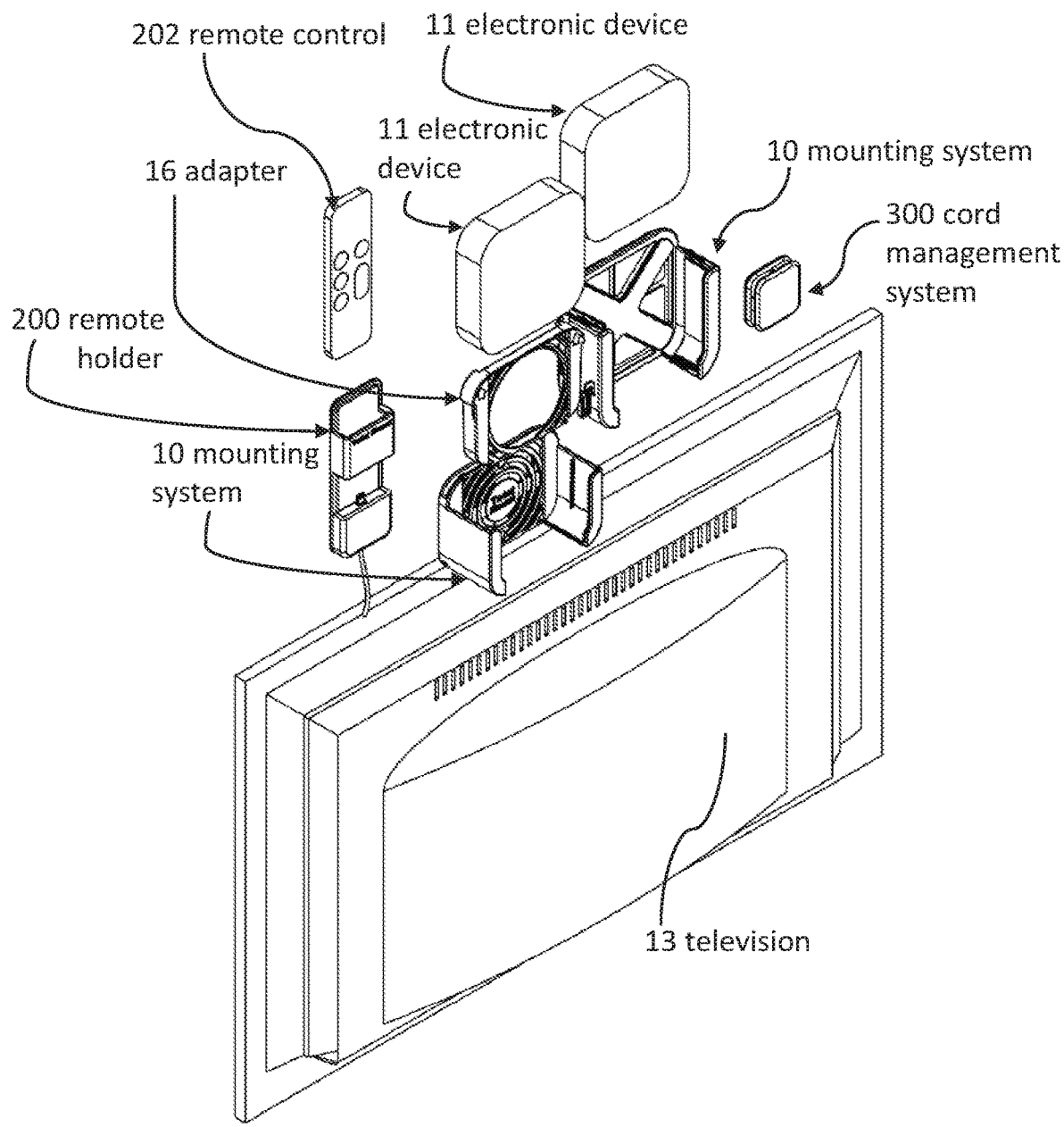
FIG. 2 illustrates a perspective view of an embodiment of the system, according to some embodiments.
Figure 3:
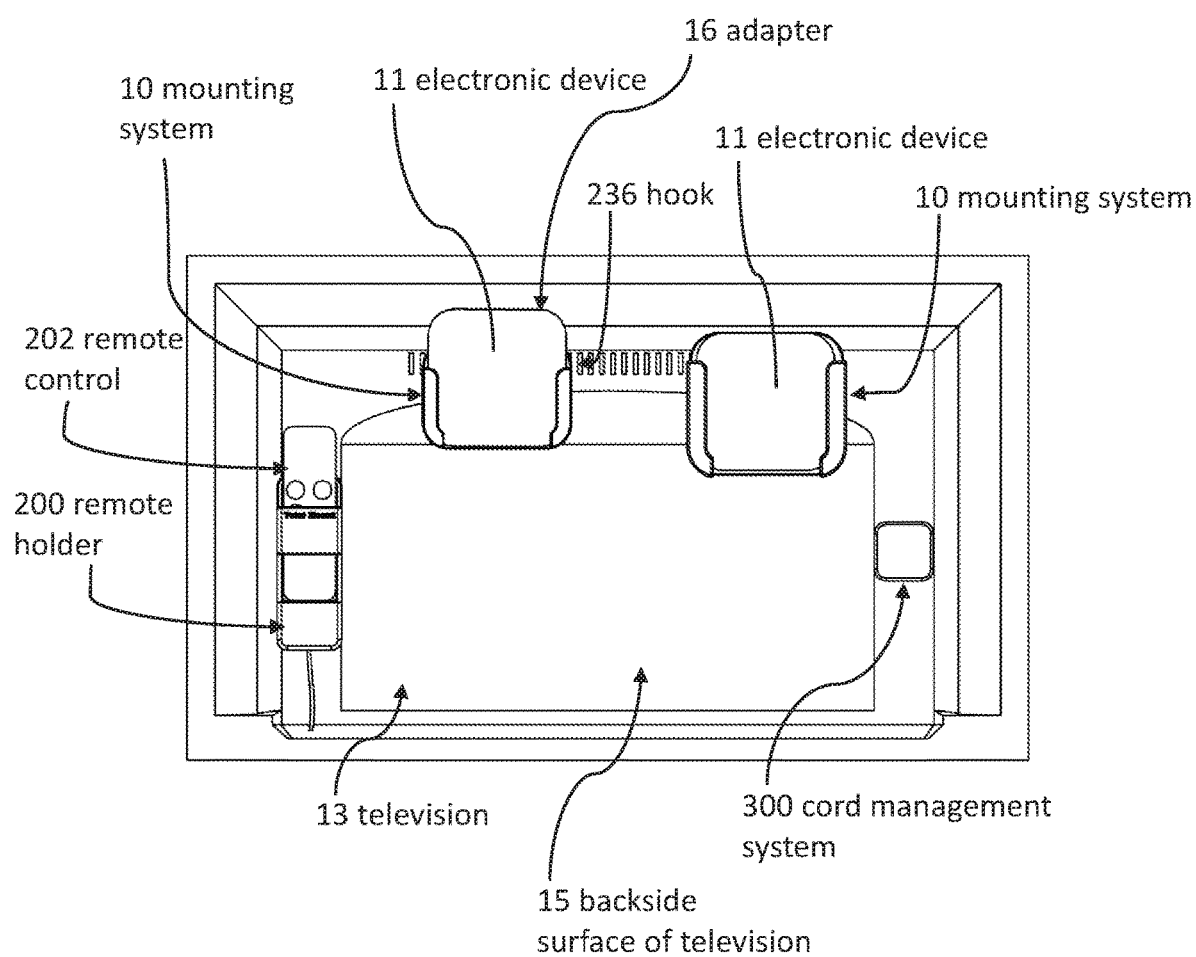
FIG. 3 illustrates a front view of an embodiment of the system, according to some embodiments.

FIG. 9 illustrates outward direction 55 and inward direction 57 (as indicated by the arrows in FIG. 9). The outward direction 55 is away from the adhesive 38 towards a portion of the mounting system 10 configured to hold an electronic device 11. The inward direction 57 is away from the adhesive 38 and is opposite to the outward direction 55. The outward direction 55 is away from a surface to which the mounting system 10 is coupled (e.g., via the adhesive 38). The inward direction 57 is towards the surface to which the mounting system 10 is coupled. In the context of FIG. 3, the inward direction 57 is towards the television 13 and the outward direction 55 is away from the television 13.

FIG. 9 illustrates a downward direction 58, which is perpendicular to the outward direction 55. FIG. 9 also illustrates an upward direction 59, which is perpendicular to the outward direction 55. As shown in FIG. 9, the first channel 520 extends from a first opening 521 (that faces upward) to second opening 523 (that faces downward). The vertical dashed arrow in FIG. 9 indicates the first ventilation channel 520. The horizontal (outward) dashed arrows in FIG. 9 indicate ventilation channels 524, 528, 532, 536, 540, 544 that face outward, are in fluid communication with the first ventilation channel 520, and are in fluid communication with a portion of the mounting system 10 that holds the electronic device 11.

FIGS. 4 and 9 illustrates an anchor wall 533 oriented parallel to the base (and within plus or minus 30 degrees of parallel to the base) and coupled to the base 14 (labeled in FIG. 4) by at least one connecting protrusion 27 that protrudes inward from the base 14 to the anchor wall 533. An adhesive 38 is coupled to the anchor wall 533 and is configured to couple the mounting system 10 to a wall, such as the wall of a television 13 (shown in FIG. 3).

As used herein, an "anchor wall" is a wall having adhesive 38 that is used to couple the mounting system 10 to a mounting surface. The anchor wall 533 can be molded plastic. Adhesive 38 can be bonded to the anchor wall 533.

As shown in FIG. 9, the mounting system 10 comprises an outward direction 55, a first opening (e.g. 525 or 527) and a second opening (e.g., 521 or 523). The first opening (e.g. 525 or 527) faces outward, the second opening (e.g., 521 or 523) faces perpendicular to the outward direction, and the first ventilation channel 520 and the second ventilation channel (e.g., 524 or 532) fluidly couple the first opening (e.g. 525 or 527) to the second opening (e.g., 521 or 523) such that the mounting system 10 is configured to enable air heated by the electronic device 11 to enter the first opening (e.g. 525 or 527) in an inward direction 57, pass through the second ventilation channel (e.g., 524 or 532), pass through the first ventilation channel 520, and then exit the second opening (e.g., 521 or 523).

In some embodiments, the first channel 520 continues from a bottom portion 36 of the base 14 to a top portion 34 of the base 14. As such, the bottom portion 36 can include a first open end configured to provide access to electrical ports of the electronic device 11, while the top portion 36 can include a second open end. Some embodiments can also include a third channel 528 in fluid communication with the first channel 520. The third channel 528 can extend outward from the first channel 520 such that the third channel 528 fluidly couples the first channel 520 with the portion of the mounting system 10 configured to hold the electronic device 11. In this regard, the third channel 528 can extend along the first direction X.

Figure 22:
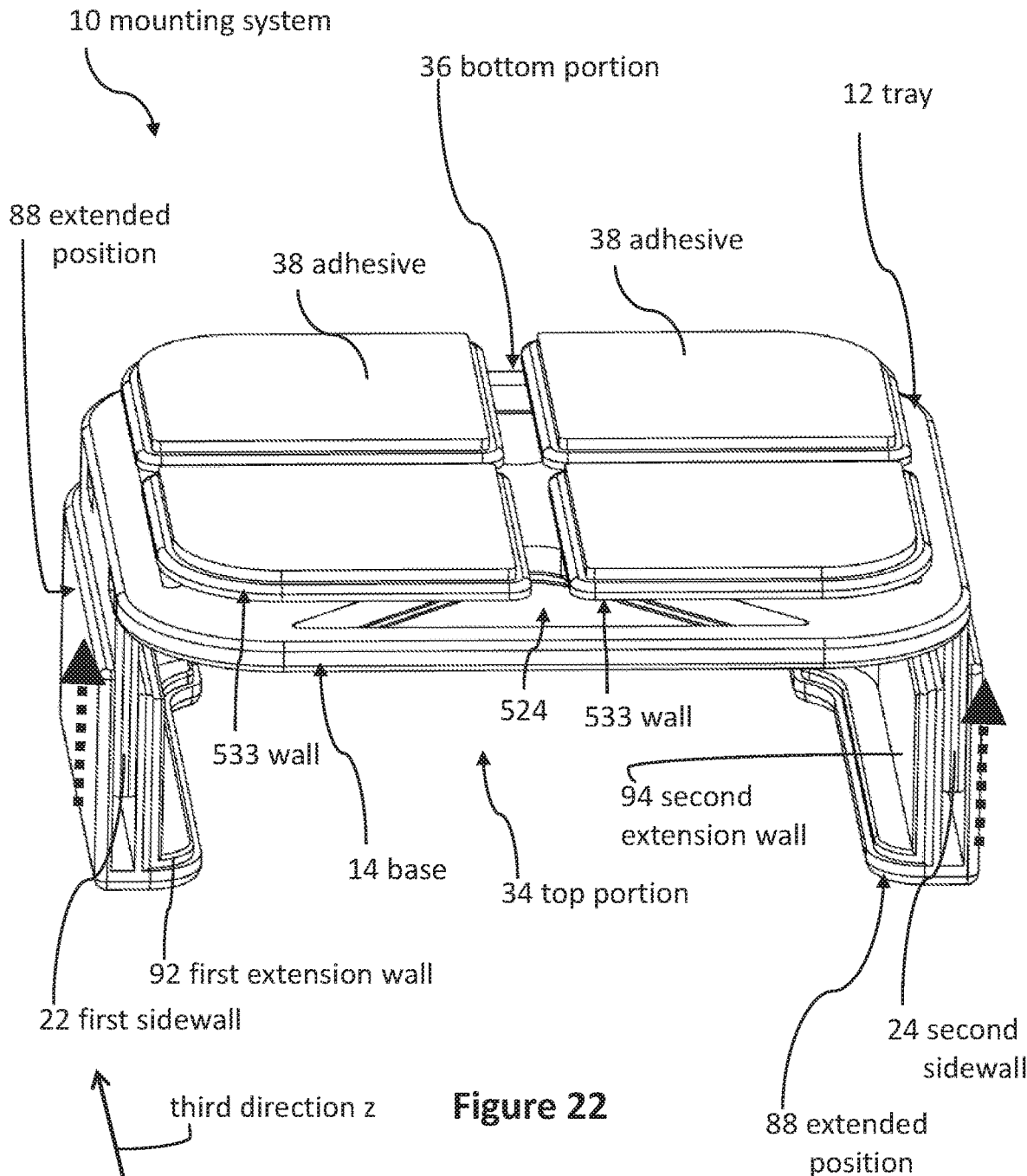
FIG. 22 illustrates a top perspective view of an embodiment of a mounting system, according to some embodiments.
Figure 23:
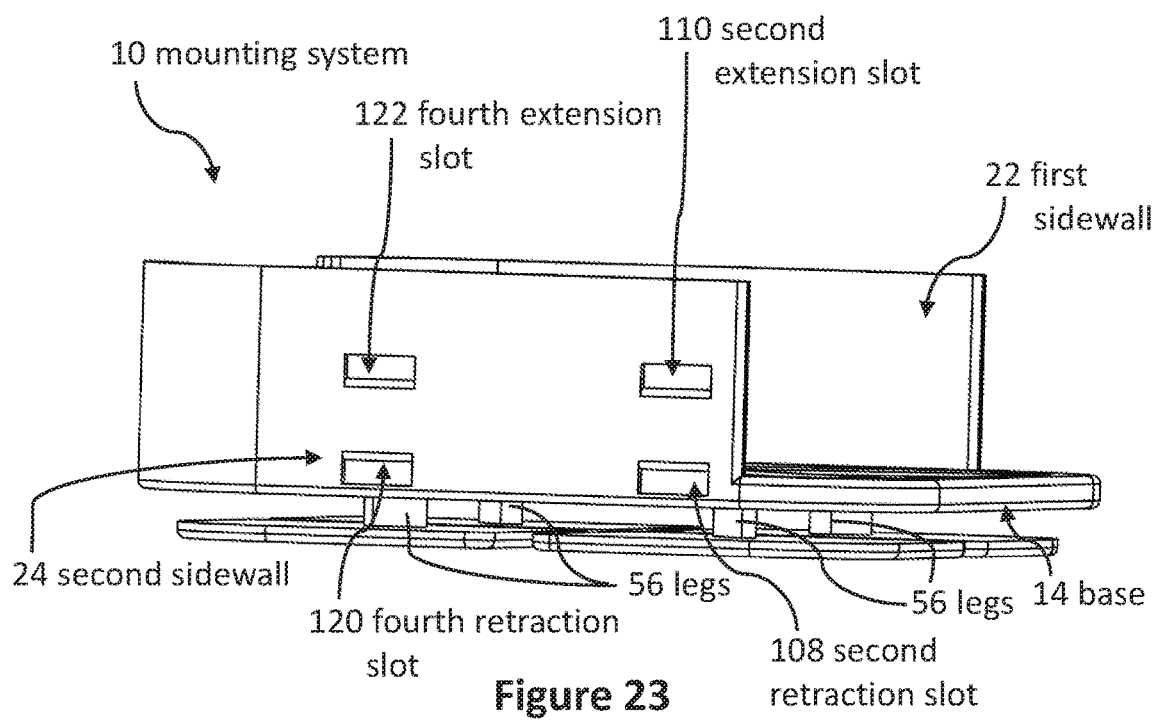
FIG. 23 illustrates a first side perspective view of an embodiment of a mounting system, according to some embodiments.

With continued reference to FIGS. 9, 22 and 23, the mounting system 10 can further comprise an adhesive 38 configured to couple the base 14 to the television 13. As shown in FIGS. 22 and 23, in some embodiments, the adhesive 38 is coupled to the base 14 via one or more legs 56. The one or more legs 56 can extend along the first direction X to thereby offset the adhesive 38 from the base 14. It should be appreciated that the mounting system 10 can include any number of legs 56, such as one, two, three, four, and even five or more legs 56.

In some embodiments, the first channel 520 is located between the adhesive 38 and the base 14 along the first direction X. As well, the first channel 520 can be located between the one or more legs 56 and the base 14 along the first direction X. In some embodiments, the first channel 520 is located between the adhesive 38 and the first wall 22 along the first direction X. Even still, in some embodiments, the first channel 520 is located between the adhesive 38 and the second wall 24 along the first direction X.

Various embodiments of the mounting system 10 can dispose the first channel 520 at various locations along the first direction X. For example, when the electronic device 11 is coupled to the mounting system 10, the first channel 520 can be located between the adhesive 38 and the electronic device 11. As well, the first channel 520 can be located between the base 14 and the electronic device 11 along the first direction X.

In some embodiments, the mounting system 10 can include additional channels. For example, some mounting systems 10 can include a fourth channel 532 in fluid communication with the first channel 520. The fourth channel 532 can extend outward from the first channel 520 such that the fourth channel 532 fluidly couples the first channel 520 with the portion of the mounting system 10 configured to hold the electronic device 11. The fourth channel 532 can extend along a fourth central axis 534, which can extend along the first direction X.

As well, some mounting systems 10 can include a fifth channel 536 in fluid communication with the first channel 520. The fifth channel 536 can extend outward from the first channel 520 such that the fifth channel 536 fluidly couples the first channel 520 with the portion of the mounting system 10 configured to hold the electronic device 11. The fifth channel 536 can extend along a fifth central axis 538, which can extend along the first direction X.

Even still, some mounting systems 10 can even include a sixth channel 540 in fluid communication with the first channel 520. The sixth channel 540 can extend outward from the first channel 520 such that the sixth channel 540 fluidly couples the first channel 520 with the portion of the mounting system 10 configured to hold the electronic device 11. The sixth channel 540 can extend along a sixth central axis 542, which can extend along the first direction X.

Some mounting systems 10 can even include a seventh channel 544 in fluid communication with the first channel 520. The seventh channel 544 can extend outward from the first channel 520 such that the seventh channel 544 fluidly couples the first channel 520 with the portion of the mounting system 10 configured to hold the electronic device 11. The seventh channel 544 can extend along a seventh central axis 546, which can extend along the first direction X.

In some embodiments, the fourth channel 532 can be substantially parallel to at least one of the fifth channel 536, the sixth channel 540, and the seventh channel 544. As well, in some embodiments, the fourth channel 532 is substantially parallel to the fifth channel 536, the fifth channel 536 is substantially parallel to the sixth channel 540, and the sixth channel 540 is substantially parallel to the seventh channel 544.

The first channel 520 can extend from a top opening to a bottom opening of the base 14. In some embodiments, the top opening and the bottom opening are located between the first wall 22 and the second wall 24 of the base 14.

Even still, in various embodiments, the first channel 520 and the additional channels can be disposed in various locations along the mounting system 10. In this regard, the first channel 520 and any additional channels can be configured to provide airflow to specific locations of the electronic device 11, when the electronic device 11 is coupled to the mounting system 10. For example, the second, third, fourth, fifth, sixth, and/or seventh channel 524, 528, 532, 536, 540, 544 can be disposed at any angle with respect to the first channel 520. As such, the second, third, fourth, fifth, sixth, and/or seventh channel 524, 528, 532, 536, 540, 544 can be disposed at angles that allow the various channels to be aimed at specific locations on the electronic device 11. For example, in some embodiments, the second, third, fourth, fifth, sixth, and/or seventh channel 524, 528, 532, 536, 540, 544 are disposed perpendicular with respect to the first channel 520. In other embodiments, the second, third, fourth, fifth, sixth, and/or seventh channel 524, 528, 532, 536, 540, 544 are not perpendicular with respect to the first channel 520.

In some embodiments, a first central axis 522 of the first channel 520 can be within plus or minus twenty degrees of a plane of the adhesive 38. As well, the second channel 524 and the third channel 528 can be within plus or minus forty degrees of being perpendicular to the first central axis 522 of the first channel 520. Even still, a second central axis 526 of the second channel 524 can be within plus or minus thirty degrees of a third central axis 530 of the third channel 528. In some embodiments, the third central axis 530 of the third channel 528 is substantially parallel to the second central axis 526 of the second channel 524.

As shown in FIGS. 10-19, mounting systems 10 can be configured to accommodate electronic devices 11 of different sizes, such as electronic devices 11 of different thicknesses. In some embodiments, a mounting system 10 is configurable to couple an electronic device (e.g. a streaming media player, gaming console, cable box, and the like) to a television 13.

Figure 11:
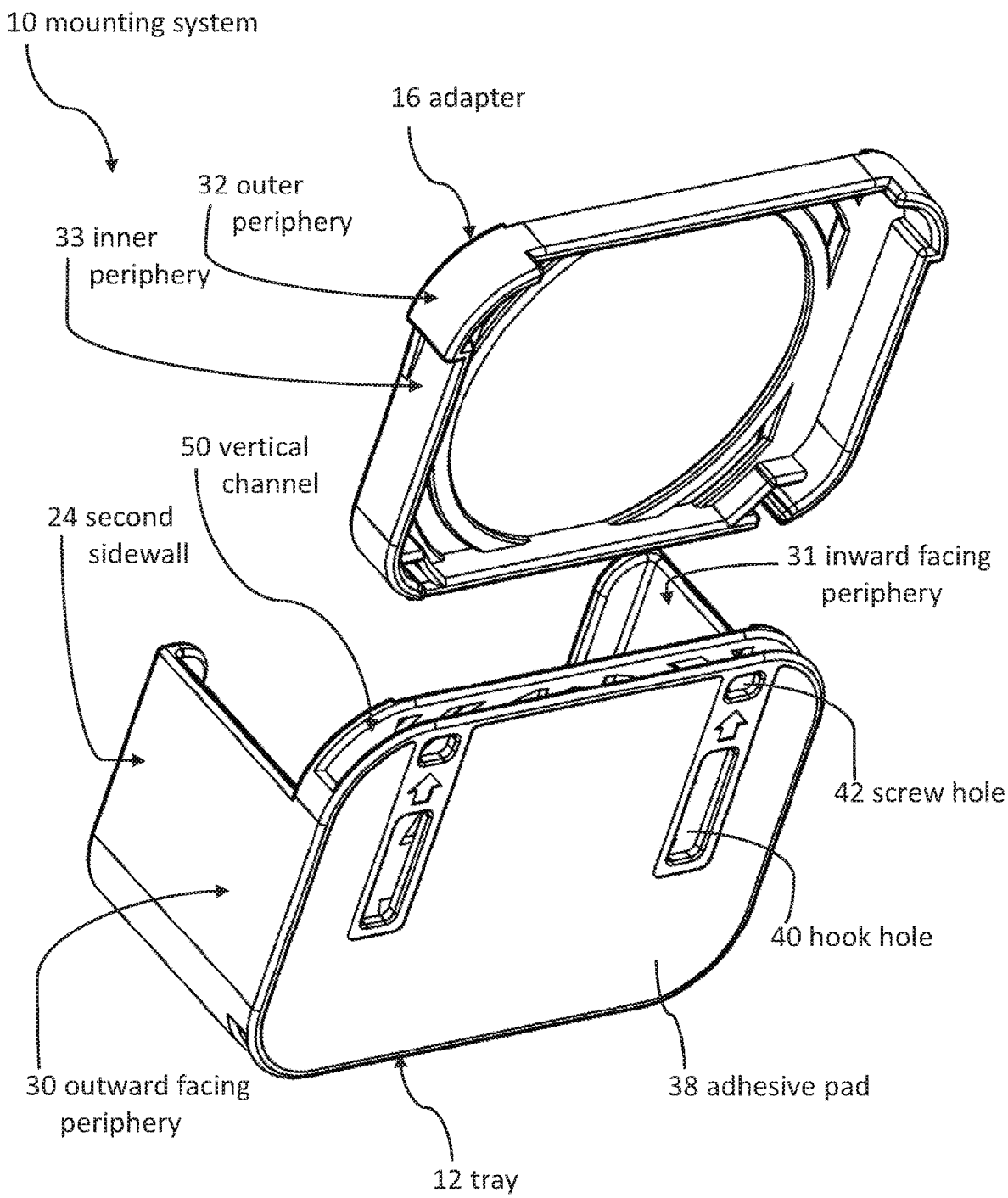
FIG. 11 illustrates a back perspective view of an embodiment of the mounting system, according to some embodiments.
Figure 12:
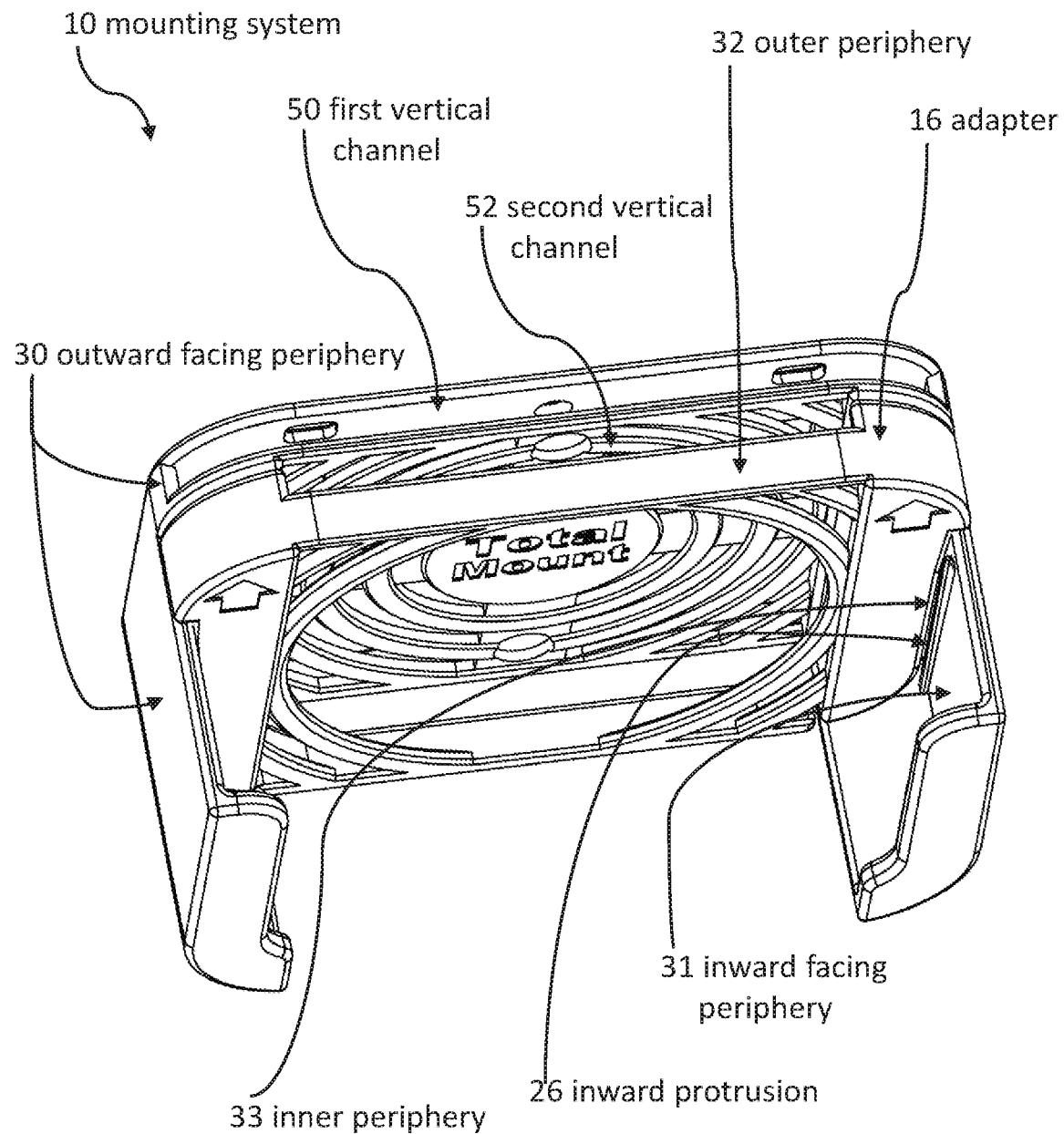
FIG. 12 illustrates a top perspective view of an embodiment of the mounting system, according to some embodiments.

The mounting system 10 can be attached to any surface, such as a wall or television 13 (e.g. a backside surface of a television 13). As shown in FIG. 11, the mounting system 10 can include various attachment features. In some embodiments, the mounting system 10 includes at least one hook hole 40, at least one screw hole 42, and/or an adhesive (e.g. an adhesive pad 38) located along a backside of the base 14. A first side of the adhesive pad 38 can be adhesively attached to the backside of the base 14, while the second side of the adhesive pad 38, which is opposite the first side of the adhesive pad 38, can be adhesively attached to any surface, such as a backside of the television 13, and the like. In some embodiments the adhesive pad 38 is about 1 millimeter thick. In some embodiments, the adhesive pad 38 is about 0.045 inches thick. Generally, it should be appreciated that the adhesive pad 38 can define any thickness greater than 0.045 inches, or any thickness less than 0.045 inches.

As well, the at least one hook hole 40 can be configured to receive a first end of a hook 236 (as shown in FIG. 17), such as the hooks described in U.S. patent application Ser. No. 13/278,759, filed Oct. 21, 2011, and entitled MOUNTING SYSTEM FOR DIGITAL MEDIA PLAYERS. The entire contents of U.S. patent application Ser. No. 13/278,759 are incorporated by reference herein. A second end of the hook 236 can thereby engage an opening along the television 13, such as an air vent located along a backside of the television 13, to thereby couple the mounting system 10 to the television 13. Even still, the screw hole 42 can be an aperture that receives a screw, which can be threadably attached to a surface, such as a wall or television 13, to thereby attach the mounting system 10 to the surface.

The mounting system 10 can include a base 14 configured to hold the electronic device 11. As well, the mounting system 10 can include a first sidewall 22 that extends from a first side of the base 14 along a first direction X that points away from the television 13. The mounting system 10 can also include a second sidewall 24 that extends from a second side of the base 14 along the first direction X. It should be appreciated that the first side can be opposite the second side. The second sidewall 24 can be spaced from the first sidewall 22 along a second direction Y that is perpendicular to the first direction X.

In order to receive electronic devices 11 of different sizes, the mounting system 10 can include an adapter 16 received (e.g. removably coupled) between the first sidewall 22 and the second sidewall 24. In some embodiments, the adapter 16 can be slideably received by the tray 12 along a third direction Z that is perpendicular to the first direction X and the second direction Y. In some embodiments, the tray 12 can receive the adapter along a mating direction, other than the third direction Z, such as the first direction X or even the second direction Y.

Figure 10:
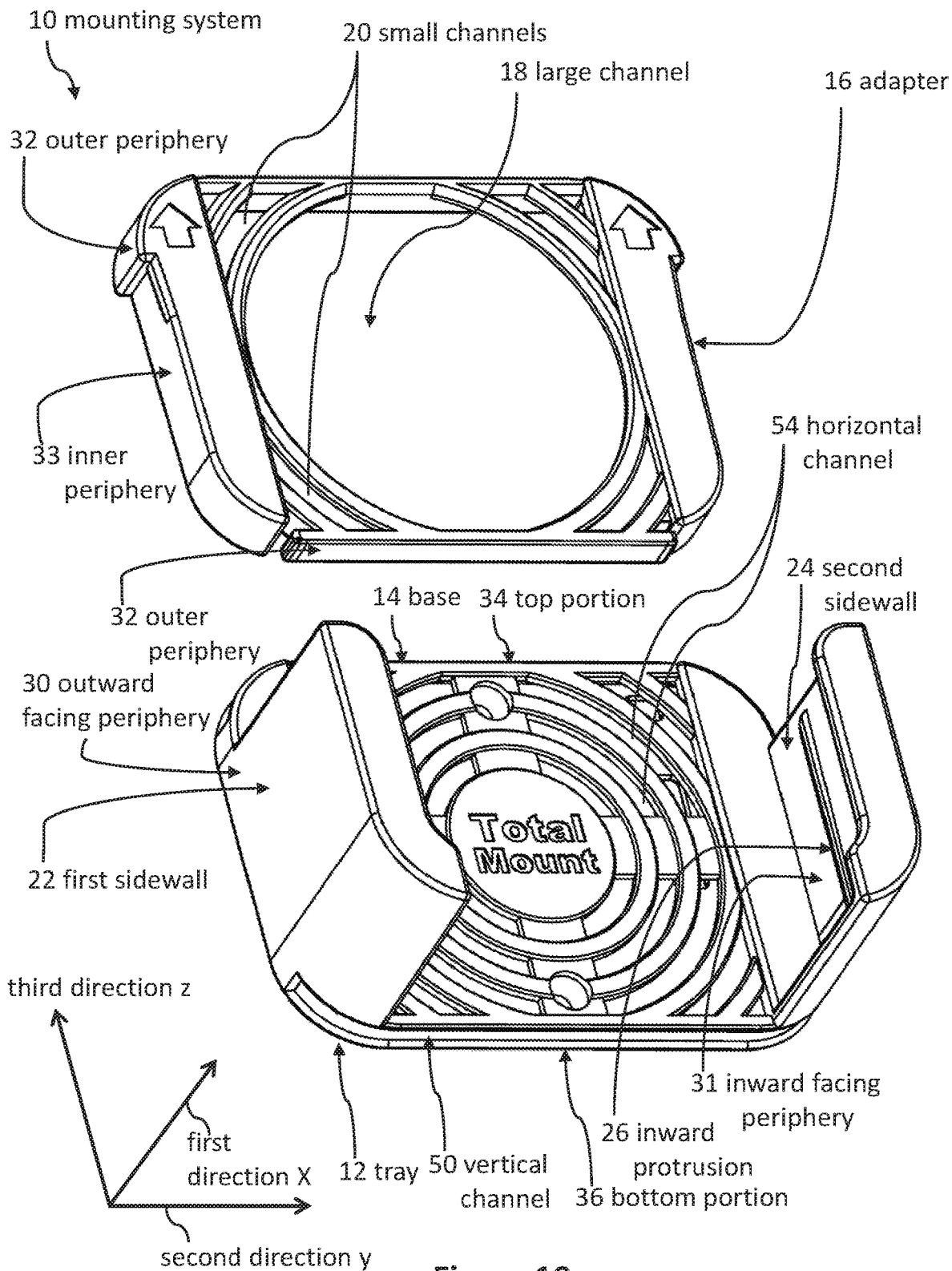
FIG. 10 illustrates a front perspective view of an embodiment of the mounting system, according to some embodiments.
Figure 13:
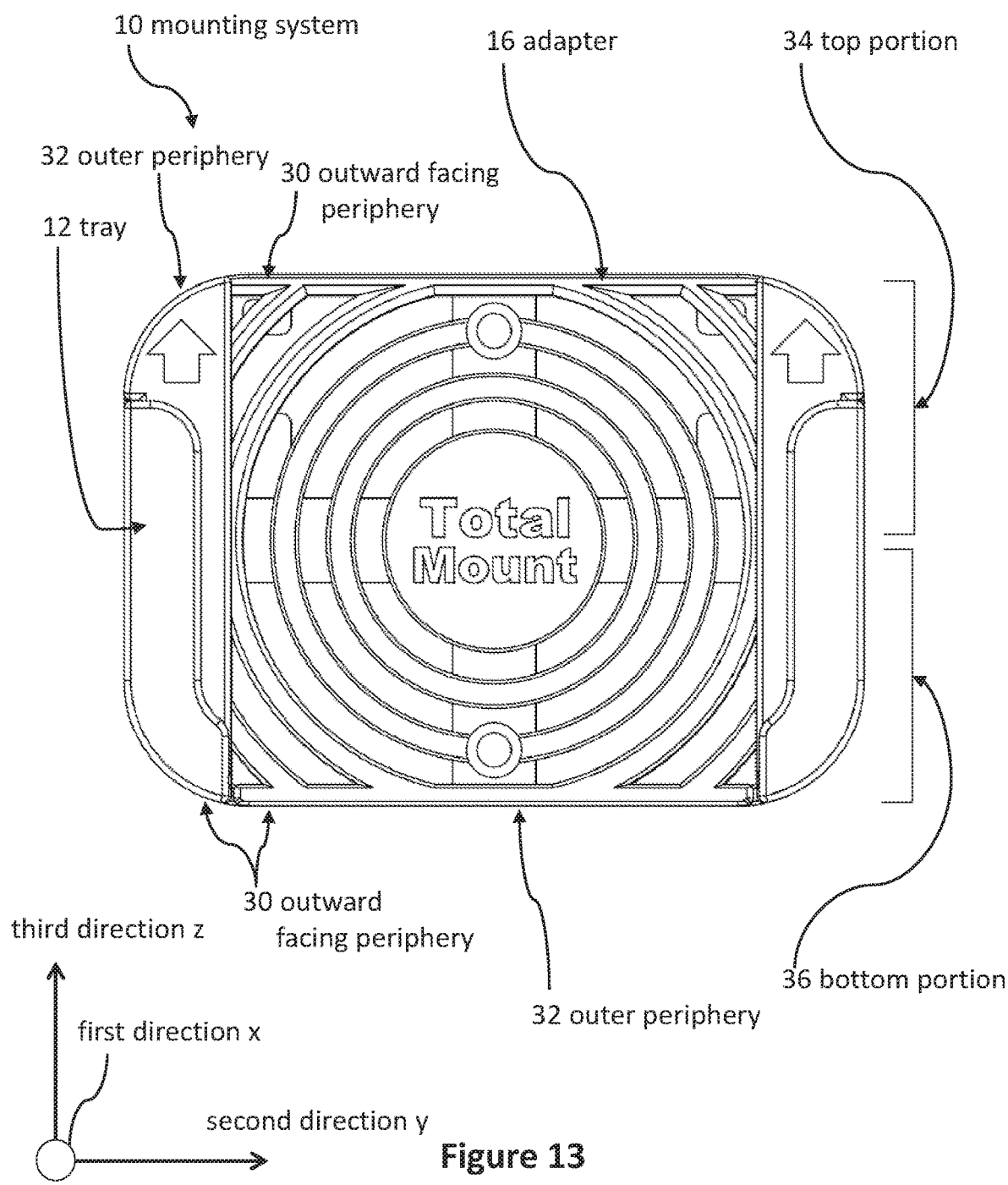
FIG. 13 illustrates a front view of an embodiment of the mounting system, according to some embodiments.

When the mounting system 10 receives the electronic device 11 and is attached to a television 13, a portion of the base 14 can be located between the television 13 and the electronic device 11. As shown in FIGS. 10 and 13, the tray 12 can include a top portion 34 and a bottom portion 36 that is located opposite the top portion 34. The top portion 34 can be spaced from the bottom portion 36 along a third direction Z that is perpendicular to the first direction X and the second direction Y.

In some embodiments, the first sidewall 22 extends from the top portion 34 to the bottom portion 36 of the tray 12, and the second sidewall 24 extends from the top portion 34 to the bottom portion 36 of the tray 12. The first sidewall 22 and the second sidewall 24 can be configured to slideably receive the electronic device 11 at the top portion 34 of the tray 12. As well, the first sidewall 22 and the second sidewall 24 can be configured to retain the electronic device 11 at the bottom portion 36 of the base 14. For example, a bottom portion of the first sidewall 22 and a bottom portion of the second sidewall 24 can curve inward such that the bottom portion of the first sidewall 22 faces the bottom portion of the second sidewall 24 to thereby retain the electronic device 11 from moving along the third direction Z.

Portions of the first and second sidewalls 22, 24 can also extend along the second direction Y to provide additional support for retaining (i.e. securing) the electronic device 11. In some embodiments, a portion of the first sidewall 22 extends along the second direction Y towards the second sidewall 24. As well, a portion of the second sidewall 24 can extend along the second direction Y towards the first sidewall 22. In this manner, the portions of the first and second sidewalls 22, 24 can wrap around a surface of the electronic device 11.

Furthermore, in some embodiments, the first sidewall 22 and the second sidewall 24 are located along at least one of a top portion 34 of the tray 12 and a bottom portion 36 of the tray 12. In some embodiments, the first sidewall 22 and/or the second sidewall 24 are elongate along the third direction Z whereby the first and second sidewalls 22, 24 continuously extend from the top portion 34 to the bottom portion 36 of the tray 12. In this regard, a portion of the first sidewall 22 and a portion of the second sidewall 24 each can be disposed along a middle portion of the tray 12 that is located between a top portion 34 and a bottom portion 36 of the tray 12.

In some embodiments, the first and second sidewalls 22, 24 are not continuous between the top portion 34 and the bottom portion 36. The first sidewall 22 and the second sidewall 24 might each comprise one or more segments that are not adjoined along the third direction Z. For example, the first sidewall 22 and the second sidewall 24 might each contain one or more posts to retain the electronic device 11 and the adapter 16.

The first sidewall and the second sidewall can be configured to receive a first electronic device having a first thickness. As well, the first sidewall and the second sidewall can be configured to simultaneously receive a second electronic device having a second thickness and the adapter having a third thickness. In some embodiments, the first thickness is greater than the second thickness. As well, in some embodiments, the first thickness is substantially equal to the second thickness plus the third thickness. Even still, in some embodiments, the first thickness is about 1.4 inches thick, the second thickness is about 0.9 inches thick, and the third thickness is about 0.5 inches thick. Moreover, the electronic device 11 can define a length of about 3.9 inches and a width of about 3.9 inches.

The adapter 16 can be coupled to or removed from the mounting system 10 to thereby accommodate different thickness electronic devices 11. For example, the adapter 16 can be removed from the mounting system 10 to thereby allow thicker electronic devices 11 having a first thickness to securely fit between the base 14 and the first and second walls 22, 24 of the mounting system 10. Likewise, when the adapter 16 is received by the mounting system 10, thinner electronic devices 11 having a second thickness may securely fit between the base 14 and the first and second sidewalls 22, 24 of the mounting system 10. It should be appreciated that the adapter allows the thicker and thinner electronic devices 11 to be securely fit with respect to the first direction X. In other words, the electronic devices will be substantially fixed with respect to the first direction X. As well, it should be appreciated that the first thickness is greater than the second thickness. In some embodiments, the first thickness is 0.5 inches thicker than the second thickness. In some embodiments, the first thickness is less than 0.5 inches thicker than the second thickness, while in some embodiments, the first thickness is greater than 0.5 inches thicker than the second thickness.

As well, the first sidewall 22 and the second sidewall 24 can include various features to securely retain the adapter 16 in place within the mounting system 10. As shown in FIGS. 10, 12, 14, and 15, the mounting system 10 can include a first inward protrusion 26a that extends from an inward surface (or inner periphery 32) of the first sidewall 22, and a second inward protrusion 26b that extends from an inward surface (or inner periphery 32) of the second sidewall 24. The first inward protrusion 26a and the second inward protrusion 26b can extend along the second direction Y. In some embodiments, the first inward protrusion 26a and the second inward protrusion 26b extend toward each other along the second direction Y. In this regard, the first inward protrusion 26a can face the second inward protrusion 26b.

In some embodiments, the first sidewall 22 and the second sidewall 24 can be configured to receive a first electronic device 11a having a first thickness. As well, the first sidewall 22 and the second sidewall 24 can be configured to receive both a second electronic device 11b having a second thickness and the adapter having a third thickness. In this manner, the first thickness can be greater than the second thickness. As well, the first thickness can be substantially equal to the second thickness plus the third thickness.

Figure 14:
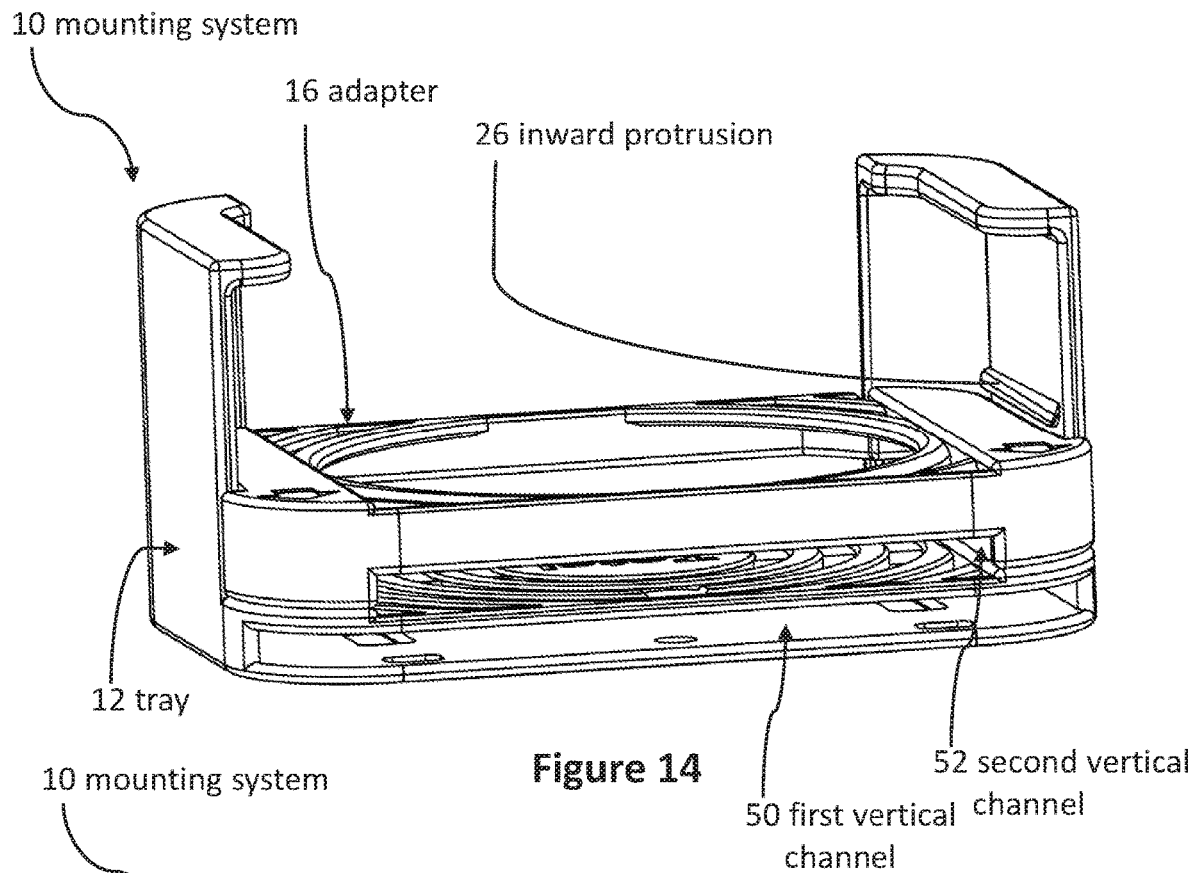
FIG. 14 illustrates a first top perspective view of an embodiment of the mounting system, according to some embodiments.
Figure 15:
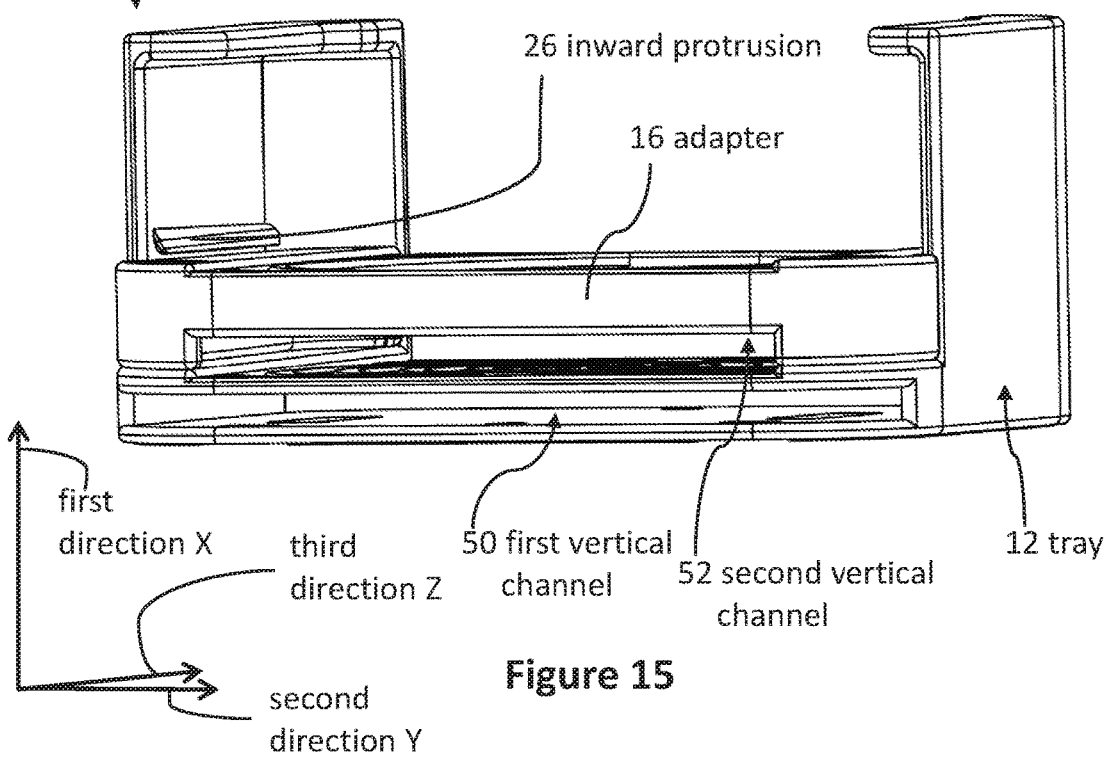
FIG. 15 illustrates a second top perspective view of an embodiment of the mounting system, according to some embodiments.

As further shown in FIGS. 14 and 15, the first inward protrusion 26a and the second inward protrusion 26b can securely retain the adapter 16 along the first direction X. Described differently, the first and second inward protrusions 26a, 26b can substantially fix the adapter 16 with respect to the first direction X.

As illustrated in FIG. 10, in some embodiments, the adapter 16 comprises a large ventilation channel 18 that extends through the adapter 16 along the first direction X. In this manner, the large ventilation channel 18 can provide air flow to a surface of the electronic device 11 to thereby regulate or maintain a temperature of the electronic device 11. The large ventilation channel 18 can be elongate along the second direction Y and the third direction Z. As well, the large ventilation channel 18 can define any shape, such as round, rectangular, and the like. In some embodiments, the adapter 16 can comprise at least one small ventilation channel 20 that extends through the adapter 16 along the first direction X. In some embodiments, the large ventilation channel 18 is at least partially surrounded by the at least one small ventilation channel 20. As such, a center point or location of the base 14 can be located within the large ventilation channel 18.

Alternatively, in some embodiments, the large ventilation channel 18 and the small ventilation channel 20 can be located in opposite positions with respect to one another, as previously described. For example, the at least one small ventilation channel 20 can be at least partially surrounded by the large ventilation channel 18. As well, a center location of the base 14 can be located within the small ventilation channel 20.

The adapter 16 can be configured to fit in a variety of ways within the mounting system 10. In some embodiments, when the electronic device 11 is coupled to the mounting system 10 a portion of the adapter 16 can be located between the television 13 and the electronic device 11. As well, in some embodiments, when the electronic device 11 is coupled to the mounting system 10, the electronic device 11 can be located between the base 14 and a portion of the adapter 16.

As shown in FIGS. 10-13, the tray 12 can comprise an outward facing periphery 30 and an inward facing periphery 31 that is opposite the outward facing periphery 30. When the electronic device 11 is coupled to the mounting system 10, the outward facing periphery 30 can comprise an outer surface that faces away from the electronic device 11. Accordingly, the inward facing periphery 32 can define an inner surface that faces towards the electronic device 11. When the adapter 16 is coupled to the tray 12, portions of the adapter 16 can be arranged and configured to align with portions of the outward facing periphery 30 and the inward facing periphery 32. For example, as shown in FIG. 13, when the adapter 16 is received by the tray 12, a top portion of the outer periphery 32 of the adapter 16 can be substantially aligned (along the first direction X) with a top portion of the outward facing periphery 30 of the tray 12. Likewise, when the adapter 16 is received by the tray 12, a bottom portion of the outer periphery 32 of the adapter 16 can be substantially aligned (along the first direction X) with a bottom portion of the outward facing periphery 30 of the tray 12. As such, when the adapter 16 is decoupled from the tray 12, the outward facing periphery 30 of the tray 12 can define a first footprint of the mounting system 10. Accordingly, when the adapter 16 is coupled to the tray 12, the mounting system 10 can define a second footprint. In some embodiments, the first footprint is substantially aligned (along the first direction X) with the second footprint. However, in some embodiments, the first footprint is not substantially aligned (along the first direction X) with the second footprint.

In the embodiment illustrated in FIG. 4, the anchor wall 533 is rigidly coupled to the base 14 by connecting protrusions 27. As shown in FIG. 10, the mounting system 10 comprises an adapter 16 slideably received by the base 14 between the first sidewall 22 and the second sidewall 24. (FIG. 10 illustrates an exploded view with the adapter 16 slid out of the base 14. The adapter 16 comprises an aperture 18 configured to be in fluid communication with the first ventilation channel 50 and the second ventilation channel 54. FIGS. 14 and 15 illustrate the adapter 16 slid into mounting system 10 such that the aperture 18 is in fluid communication with the first ventilation channel 50 and the second ventilation channel 54.

With continued reference to FIGS. 10-13, the inner periphery 31 of the adapter 16 can be arranged and configured to fit within the inward facing periphery 31 of the tray 12. As such, the adapter 16 can be slideably received by the tray 12. In some embodiments, the inner periphery 31 is dimensionally sized such that the adapter 16 easily slides into the tray 12. "Easily" can be defined as requiring minimal force or effort by a human hand, almost effortless. However, in some embodiments, the inner periphery 31 is dimensionally sized such that the adapter 16 frictionally slides into the tray 12. This arrangement can be used in various embodiments where the mounting system 10 is oriented such that a friction fit between the adapter 16 and tray 12 is required in order to retain the adapter 16 within the tray 12. Alternatively, this configuration can be used in embodiments where the mating direction to couple the adapter 16 to the tray 12 is along another direction, such as the first direction X.

Figure 16:
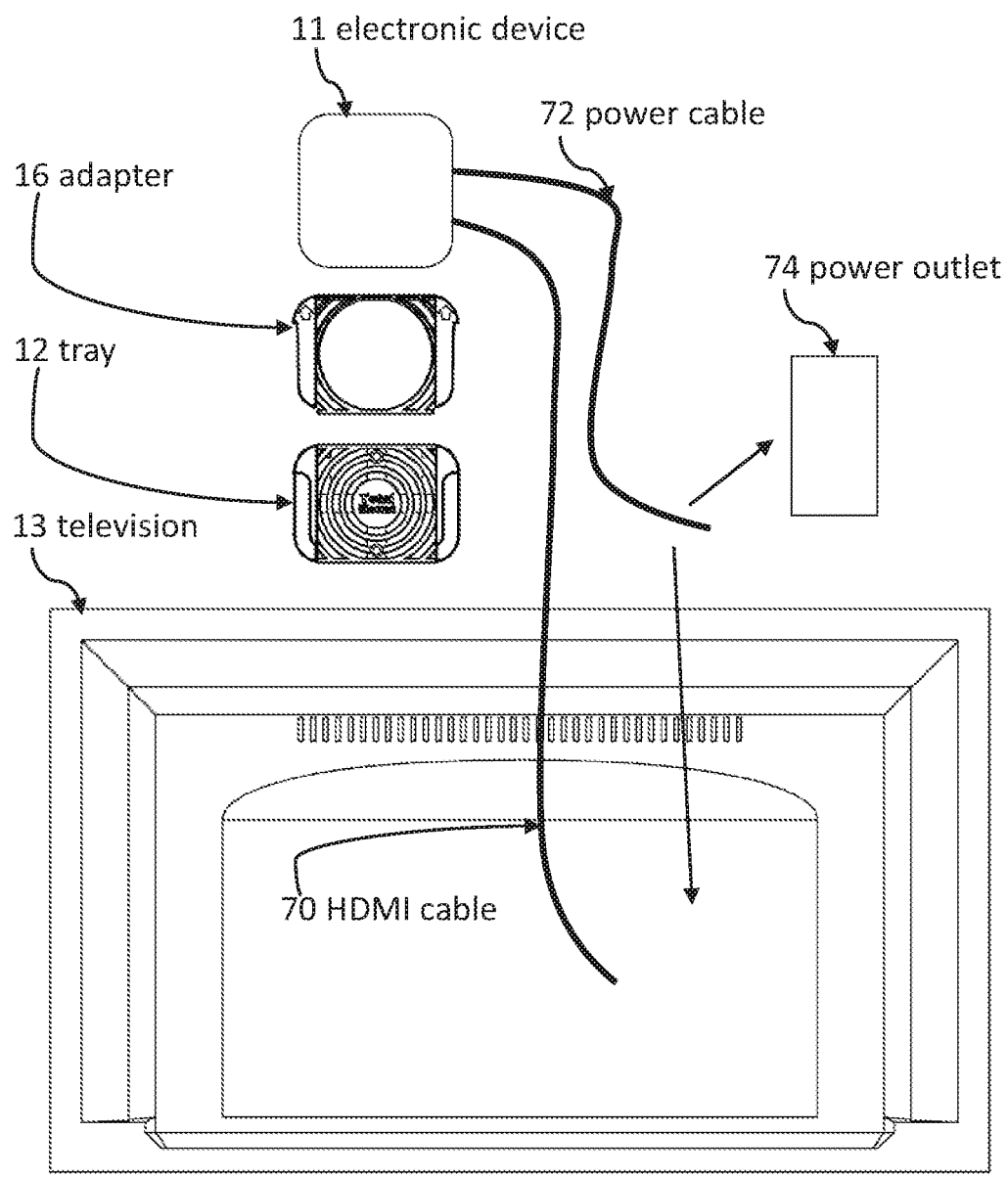
FIG. 16 illustrates a front view of an embodiment of the system, according to some embodiments.

As shown in FIG. 16, embodiments of the mounting system 10 can even include an electronic device 11, such as a streaming media player 11. As well, the mounting system 10 can include a television 13 communicatively coupled to the streaming media player 11. The mounting system 10 can even include a HDMI cable 70 having a first end coupled to the streaming media player 11 and a second end coupled to the television 13. The HDMI cable 70 can be configured to transmit digital signals between the streaming media player 11 and the television 13. Even still, the mounting system 10 can include a power cable 72 having a first end coupled to the streaming media player 11 and a second end coupled to one of the television 13 and a wall outlet 74. The power cable 72 can be configured to transmit electricity from one of the television 13 and the wall outlet 74 to the streaming media player 11.

Figure 17A:
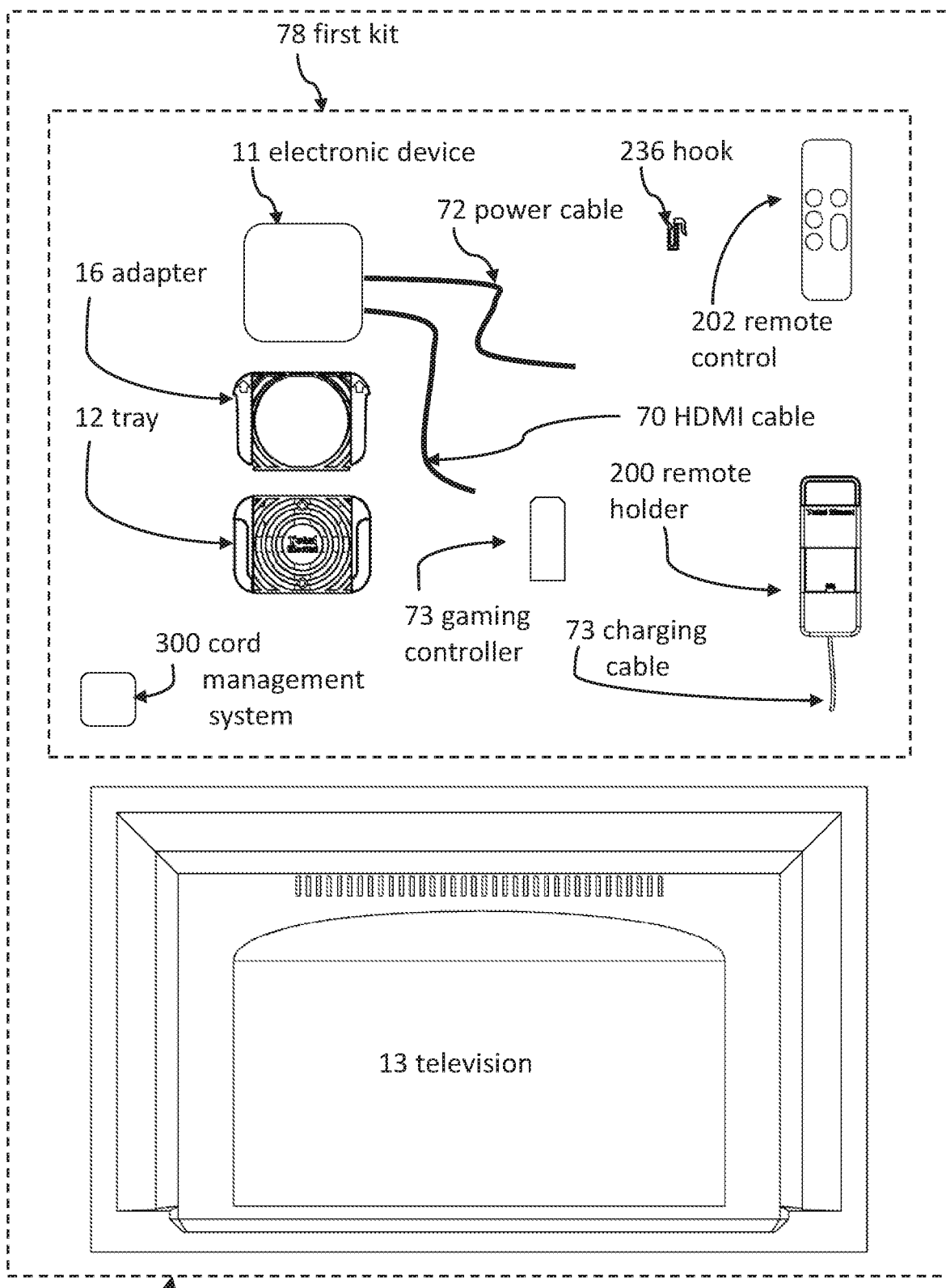
FIG. 17a illustrates a first kit embodiment and a second kit embodiment, according to various embodiments.

With reference to FIG. 17a, the disclosure includes various kits. For example, a first kit 78 can include the electronic device 11 (such as a streaming media player and/or gaming console), a tray 12 configurable to couple the electronic device 11 to the television 13, and an adapter 16 that can be slideably received by the tray 12. It should be appreciated that the tray 12 can also be referred to as a mount 12.

The first kit can also include an HDMI cable 70 that can be communicatively coupled with the electronic device 11 and a television 13, a power cable 72 that can be electrically coupled to the electronic device 11 to thereby supply power, a remote holder 200 (such as the remote holders disclosed in U.S. Provisional Patent Applications 62/242,988 and 62/243,722), and a remote control 202 that can be communicatively coupled to the electronic device 11 and/or television 13. The first kit 78 can even include a remote control charging cable 73 that can be electrically coupled to the remote control 202, a hook 236 that can securely couple the tray 12 to the television 13, a gaming controller 85 configurable to be communicatively coupled to the electronic device 11 (e.g. gaming console), and a cord management system 300 configurable to guide at least one of the charging cable, the High-Definition Multimedia Interface cable, and the power cable (such as the cord management systems disclosed in U.S. Provisional Patent Application 62/245,723). In some embodiments, a second kit 80 includes the components of the first kit and further includes a television 13.

It should be appreciated that the disclosure also includes kits that comprise any combination of components from the first and second kits 78, 80. For example, with reference to FIG. 17b, the disclosure includes a third kit 82 that comprises a tray 12, a remote holder 200, and a cord management system 300. As shown in FIG. 17c, a fourth kit 84 can include a tray 12, adapter 16, remote holder 200, and cord management system 300. As well, some kits comprise various quantities of specific components. For example, in some embodiments a kit comprises one tray 12, one remote holder 200, and two cord management systems 300.

Figure 17B:
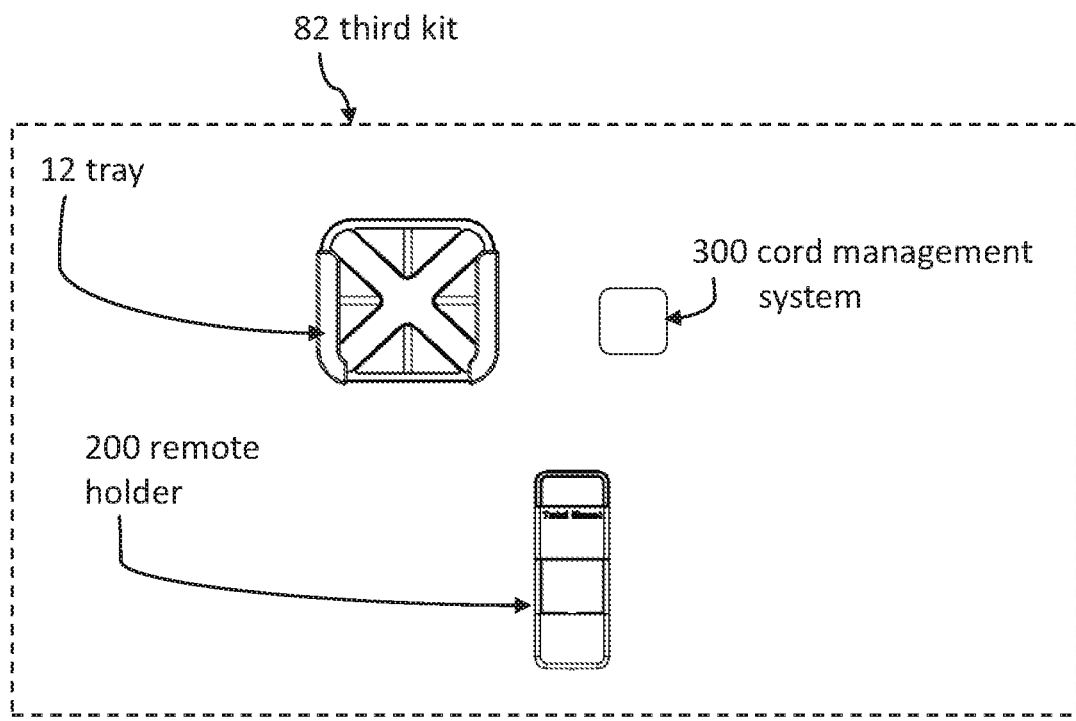
FIG. 17b illustrates a third kit embodiment, according to various embodiments.
Figure 17C:
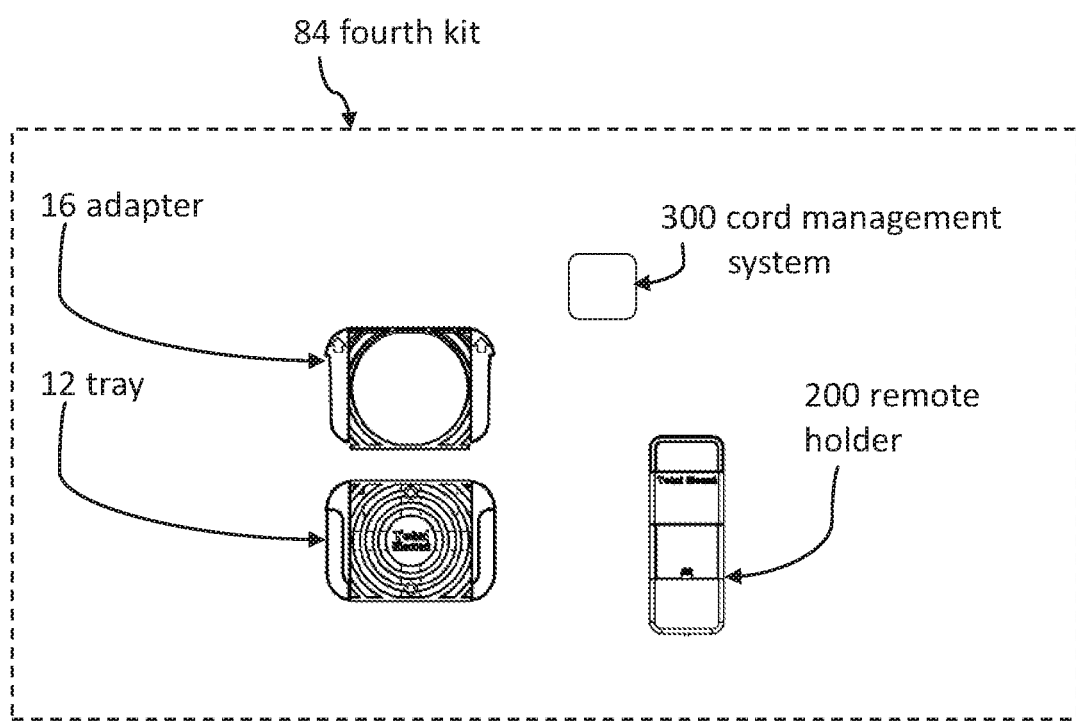
FIG. 17c illustrates a fourth kit embodiment, according to various embodiments.

The disclosure also includes other kits, not shown in FIGS. 17a-17c. For example, the disclosure includes a fifth kit comprising the electronic device 11, tray 12, adapter 16, and HDMI cable 70. The disclosure also includes a sixth kit comprising the tray 12, adapter 16, and HDMI cable 70. Even still, the disclosure includes a seventh kit comprising the electronic device 11, tray 12, and adapter 16. Furthermore, the disclosure includes an eighth kit comprising the tray 12, adapter 16, HDMI cable 70 and/or the power cable 72. As previously mentioned, it should be appreciated that the disclosure includes any combination of components as illustrated in FIG. 17a.

In some embodiments, the electronic device 11 is a first electronic device 11a having a first thickness. In this regard, the adapter 16 can be slideably received by the mount 12 whereby the adapter 16 allows the mount 12 to securely receive a second electronic device 11b having second thickness that is less than the first thickness.

In some embodiments, the tray 12 comprises adhesive 38 configurable to couple the electronic device 11 to a backside of the television 13. As well, the remote holder 200 can include adhesive configurable to couple the electronic device 11 to at least one of a side of the television 13 and the backside of the television. As it should be appreciated, the cord management system 300 can also comprise adhesive configurable to couple the cord management system 300 to the television 13, such as the backside of the television.

The tray 12 and remote holder 200 can be configured to receive various cables. In some embodiments, the tray 12 is configurable to receive at least one of a power cable 72 electrically coupled to the electronic device 11 and an HDMI cable 70 communicatively coupled to the electronic device 11. As well, the remote holder 200 can be configurable to receive a charging cable 73 such that when the remote holder 200 receives the remote control 202 the charging cable 73 electrically couples with the remote control 202.

Figure 20:
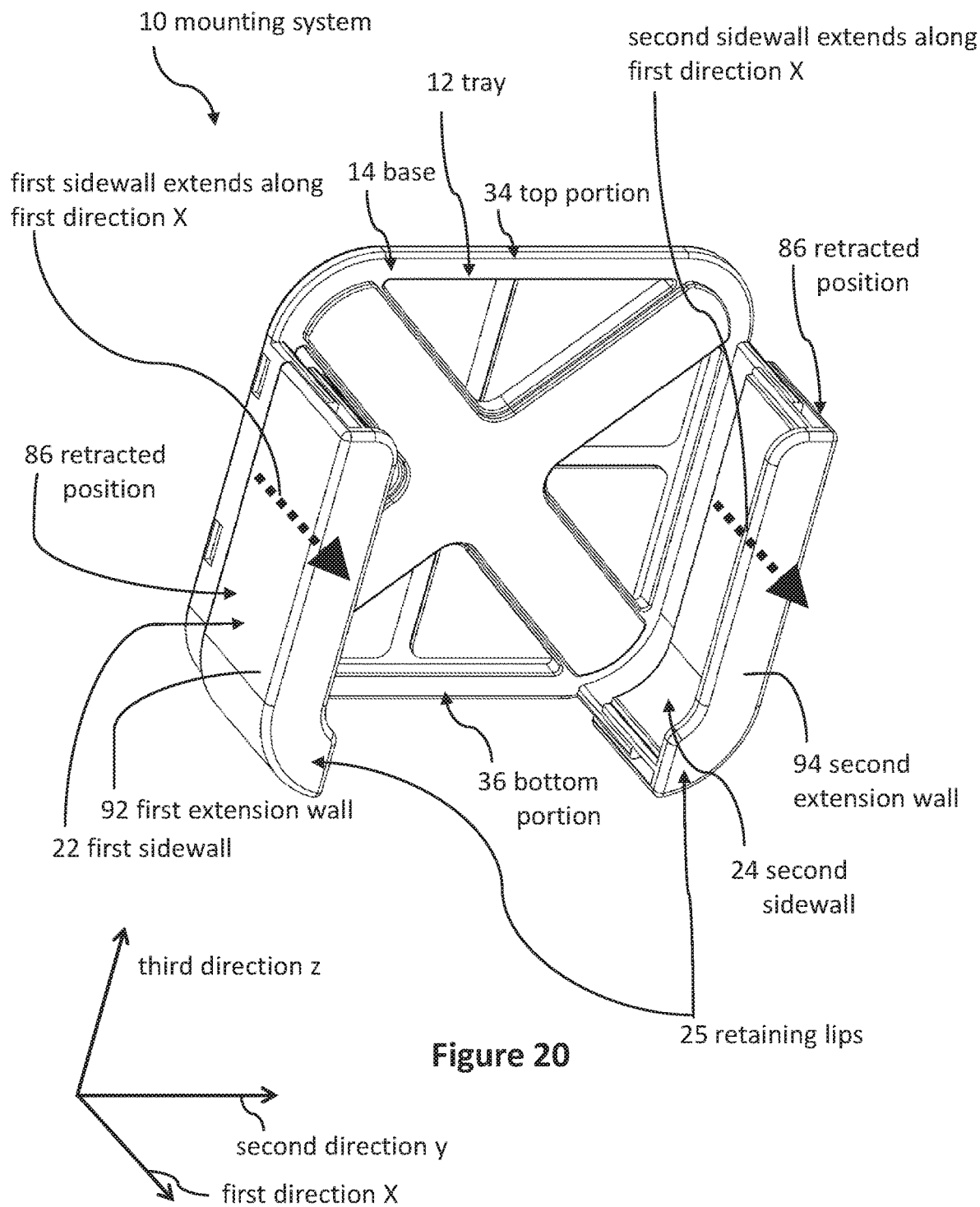
FIG. 20 illustrates a first front perspective view of an embodiment of a mounting system, according to some embodiments.

Embodiments of the mounting system 10 can be configured to receive different size electronic devices 11. With specific reference to FIGS. 20-30, mounting systems 10 can include height adjustable sidewalls that can be configured to receive electronic devices 11 of varying thicknesses or heights. In some embodiments, the mounting system 10 can include a base 14 configured to hold the electronic device 11 such that a portion of the base 14 is located between the television 13 and the electronic device 11. The base 14 can comprise a first sidewall 22 and a second sidewall 24. As shown in FIG. 20, mounting systems can also include retaining lips 25 coupled to the first sidewall 22 and the second sidewall 24. The retaining lips 25 can be configured to impede the electronic device 11 from falling out of the base 14.

In some embodiments, a mounting system 10 can be configurable to couple an electronic device 11 to a television 13. As shown in FIGS. 20-30, the mounting system 10 can include a base 14 configured to hold the electronic device 11. In some embodiments, the mounting system 10 also includes a first sidewall 22 that extends from the base 14 along a first direction X that points away from the television 13 and a second sidewall 24 that extends from the base 14 along the first direction X, wherein the second sidewall 24 is spaced from the first sidewall 22 along a second direction Y that is perpendicular to the first direction X.

Figure 33:
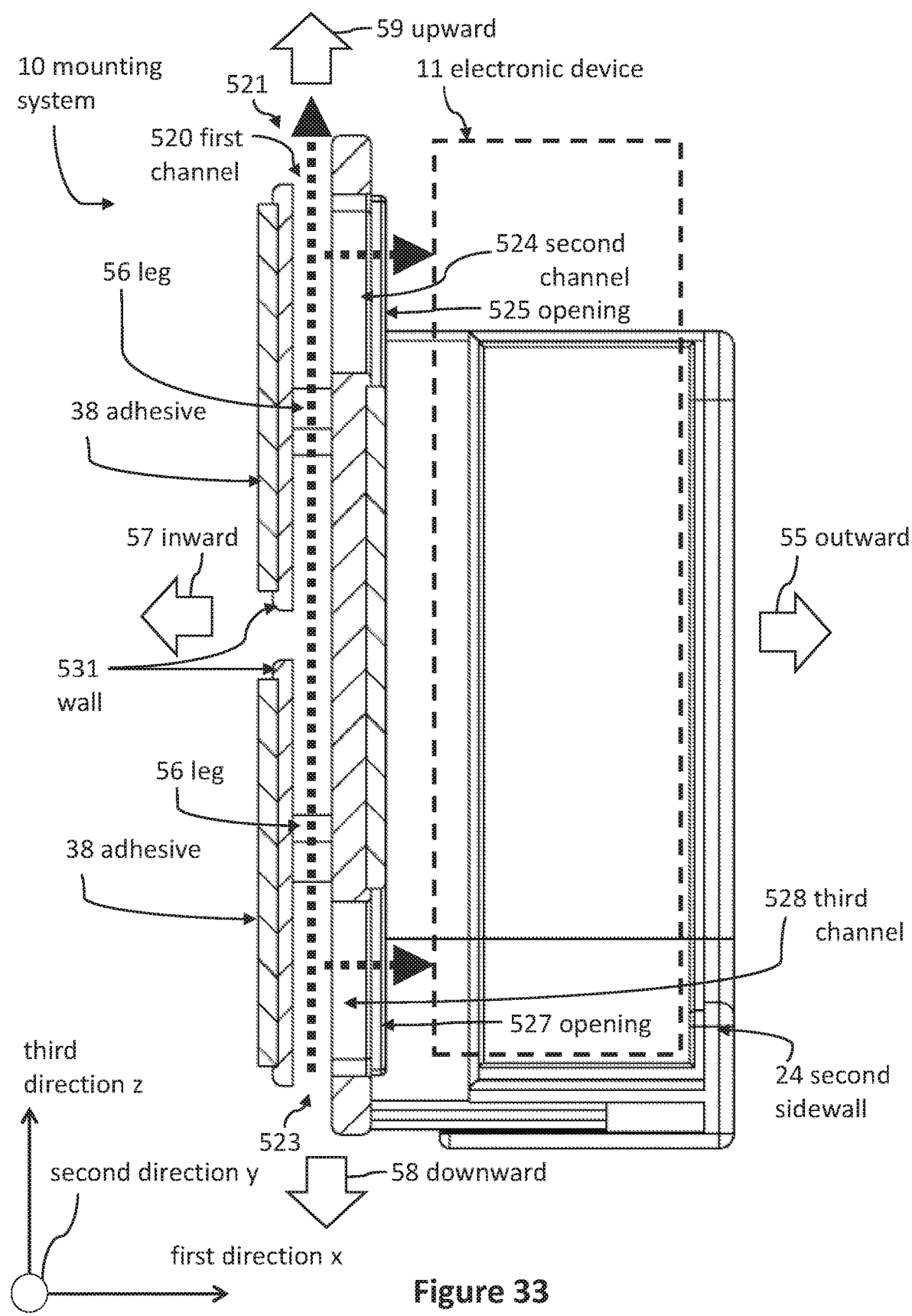
FIG. 33 illustrates a cross-sectional view along line C-C from FIG. 32, according to some embodiments.

FIG. 33 illustrates outward direction 55 and inward direction 57 (as indicated by the arrows in FIG. 33). The outward direction 55 is away from the adhesive 38 towards a portion of the mounting system 10 configured to hold an electronic device 11. The inward direction 57 is away from the adhesive 38 and is opposite relative to the outward direction 55. The outward direction 55 is away from a surface to which the mounting system 10 is coupled (e.g., via the adhesive 38). The inward direction 57 is towards the surface to which the mounting system 10 is coupled. In the context of FIG. 3, the inward direction 57 is towards the television 13 and the outward direction 55 is away from the television 13.

FIG. 33 illustrates a downward direction 58, which is perpendicular to the outward direction 55. FIG. 33 also illustrates an upward direction 59, which is perpendicular to the outward direction 55. As shown in FIG. 33, the first channel 520 extends from a first opening 521 (that faces upward) to second opening 523 (that faces downward). The vertical dashed arrow in FIG. 33 indicates the first ventilation channel 520. The horizontal (outward) dashed arrows in FIG. 33 indicate ventilation channels 524, 528 that face outward, are in fluid communication with the first ventilation channel 520, and are in fluid communication with a portion of the mounting system 10 that holds the electronic device 11.

As shown in FIG. 33, the mounting system 10 comprises an outward direction 55, a first opening (e.g. 525 or 527) and a second opening (e.g., 521 or 523). The first opening (e.g. 525 or 527) faces outward, the second opening (e.g., 521 or 523) faces perpendicular to the outward direction 55, and the first ventilation channel 520 and the second ventilation channel (e.g., 524 or 528) fluidly couple the first opening (e.g. 525 or 527) to the second opening (e.g., 521 or 523) such that the mounting system 10 is configured to enable air heated by the electronic device 11 to enter the first opening (e.g. 525 or 527) in an inward direction 57, pass through the second ventilation channel (e.g., 524 or 528), pass through the first ventilation channel 520, and then exit the second opening (e.g., 521 or 523).

Figure 31:
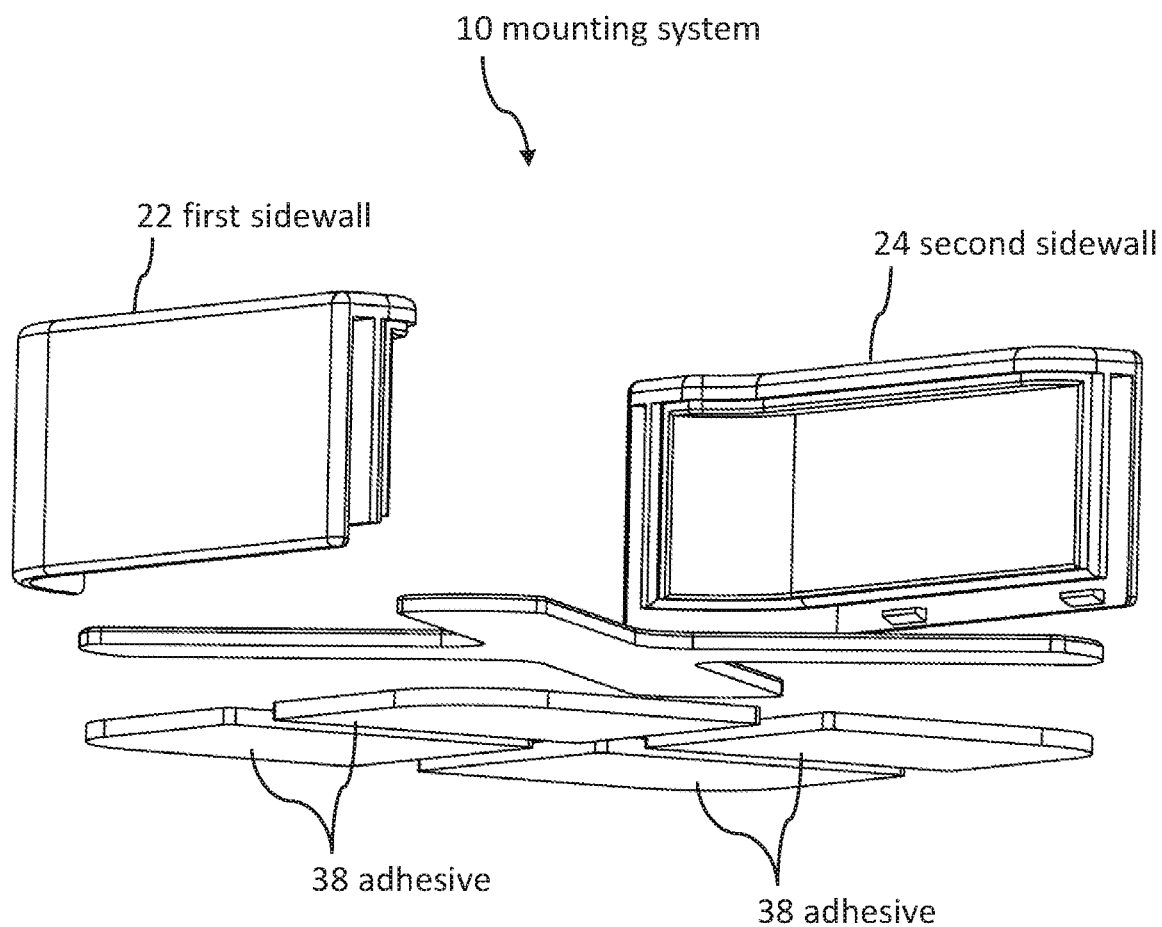
FIG. 31 illustrates an exploded bottom perspective view of a mounting system, according to some embodiments.
Figure 32:
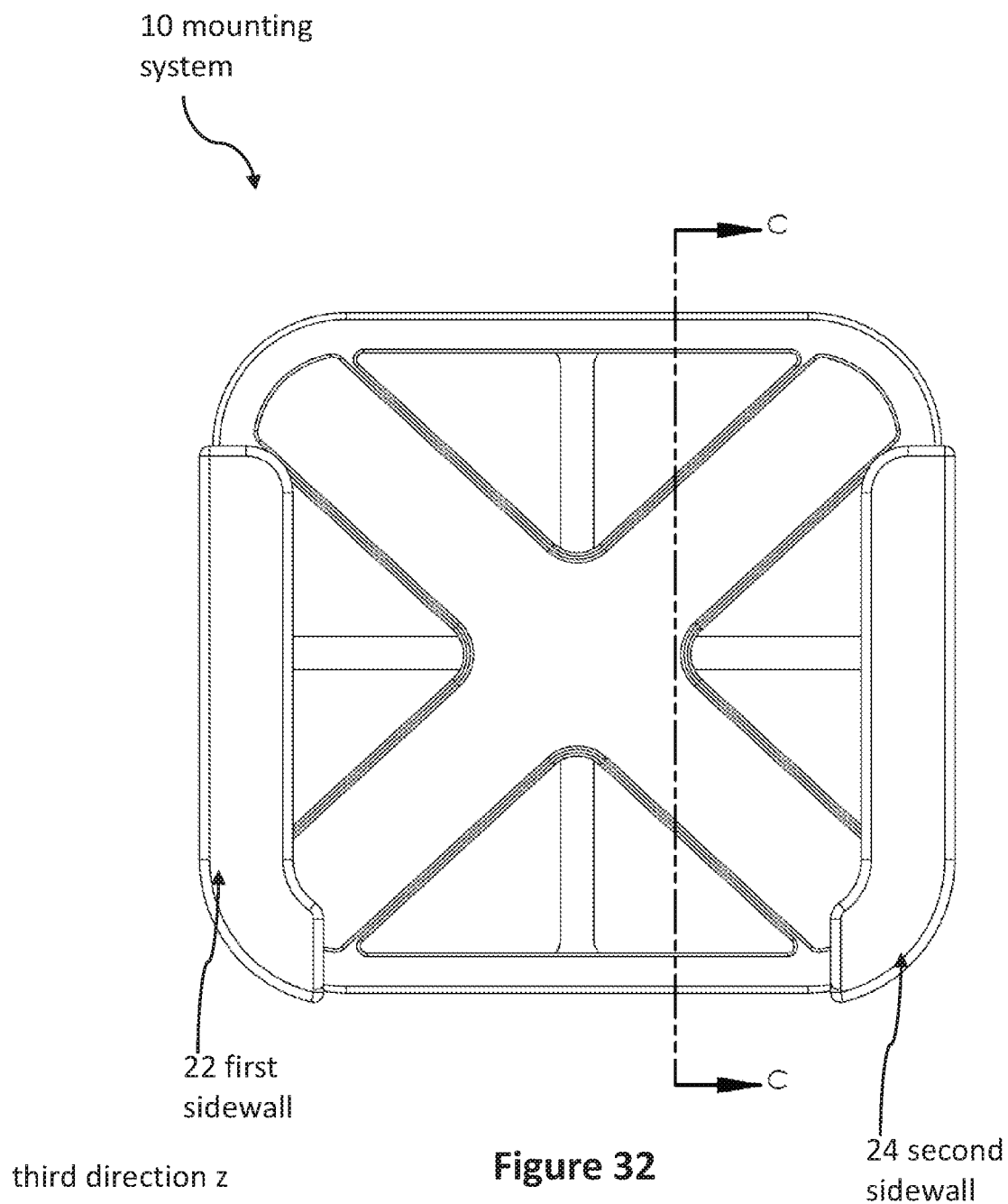
FIG. 32 illustrates a front view of an embodiment of a mounting system, according to some embodiments.

Various elements are hidden in the perspective view shown in FIG. 31. For example, the base is hidden. The interior of the side walls can be overmolded with a material (e.g., a thermoplastic elastomer) that is softer than the material (e.g., ABS) that is used to mold other elements. Protrusions (that enable the sidewalls to lock in upwards or downward positions) can face towards an area configured to hold the electronic device between the sidewalls or away from this area.

Figure 21:
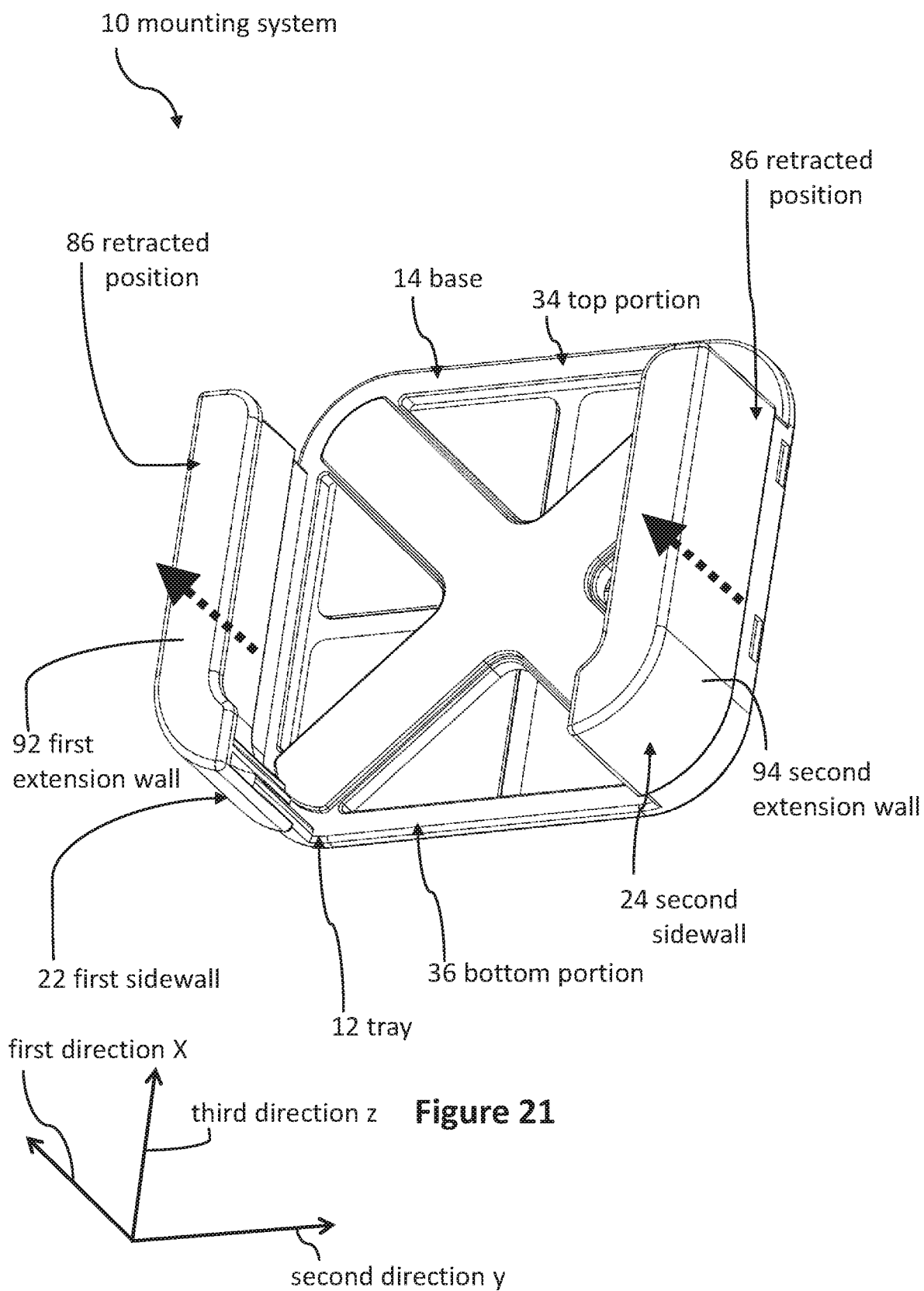
FIG. 21 illustrates a second front perspective view of an embodiment of a mounting system, according to some embodiments.

Now with reference to FIGS. 20-22, 25, and 27-32, embodiments of the mounting system 10 also include a first extension wall 92 slideably coupled to the first sidewall 22 and a second extension wall 94 slideably coupled to the second sidewall 24. In some embodiments, the first extension wall 92 moves with respect to the first sidewall 22 along the first direction X. As well, in some embodiments, the second extension wall 94 moves with respect to the second sidewall 24 along the first direction X. In this manner, the first and second extension walls 92, 94 can move between a retracted position 86 (or an inward locked position 86), as shown in FIGS. 20 and 21, and an extended position 88 (or an outward locked position 88), as shown in FIG. 22, to thereby accommodate different size (e.g. thickness or height) electronic devices 11. In some embodiments, the first extension wall 92 moves with respect to the first sidewall 22 along both the first direction X and the second direction Y. As well, in some embodiments, the second extension wall 94 moves with respect to the second sidewall 24 along both the first direction X and the second direction Y.

When both the first extension wall 92 and the second extension wall 94 are in the extended position 88, a first electronic device 11a having a first thickness can be securely coupled to the mounting system 10. It should be appreciated that thickness (e.g. first thickness and second thickness) can define the height of the electronic device along the first direction X. As well, when both the first extension wall 92 and the second extension wall 94 are in the retracted position 86, a second electronic device 11b having a second thickness can be securely coupled to the mounting system 10. In some embodiments, the first thickness is greater than the second thickness. In other words, when the first and second extension walls 92, 94 are in the extended position 88, thicker electronic devices 11 can be securely coupled between the first and second extension walls 92, 94. As such, when the first and second extension walls 92, 94 are in the retracted position 86, thinner electronic devices 11 can be securely coupled between the first and second extension walls 92, 94. In some embodiments, the first thickness is about 1.4 inches. In some embodiments, the second thickness is about 0.9 inches.

It should be appreciated that "securely coupled" means snugly fit or closely fit. In other words, "securely coupled" can mean that the inside space between the base and a top underside of the extension wall is slightly greater than the thickness (e.g. height) of the electronic device 11. For example, if the thickness of a first electronic device is 1.4 inches, then in the extended position 86 the inside space of the first and second extension walls 92, 94 can be a distance slightly greater than 1.4 inches, e.g. 1.45 inches, 1.5 inches, or even 1.6 inches. In another example, if the thickness of a second electronic device 11b is about 0.9 inches, then in the retracted position 86 the inside space of the first and second extension walls 92, 94 can be slightly greater than 0.9 inches, e.g. 0.95 inches, 1.0 inches, or even 1.1 inches.

FIG. 22 illustrates anchor walls 533 oriented parallel to the base 14 (and within plus or minus 30 degrees of parallel to the base) and coupled to the base 14 (labeled in FIG. 4)

by at least one connecting protrusion 56 (shown in FIG. 33) that protrudes inward from the base 14 to the anchor wall 533.

In some embodiments, the connecting protrusion 56 comprises a flexible neck (e.g., flexible neck 42, 52, 92, 124, 154, 158 as shown in FIG. 4 of U.S. patent application Ser. No. 14/572,293; filed Dec. 16, 2014; and entitled MOUNTING SYSTEMS FOR ELECTRONIC DEVICES). The entire contents of U.S. patent application Ser. No. 14/572, 293 are incorporated by reference herein. The flexible neck can enable the anchor wall 533 to be a foot 174, 176, 200, 206, 202, 204 configured to enable the adhesive to pivot and move relative to the base as explained in U.S. patent application Ser. No. 14/572,293 (e.g., as shown in FIG. 4).

Referring now to FIG. 22, an adhesive 38 is coupled to the anchor wall 533 and is configured to couple the mounting system 10 to a wall, such as the wall of a television 13 (shown in FIG. 3). The adhesive 38 can pivot and move relative to the base 14 due to flexible necks.

As used herein, an "anchor wall" is a wall having adhesive that is used to couple the mounting system to a mounting surface. The anchor wall 533 can be molded plastic. Adhesive 38 can be bonded to the anchor wall 533.

As shown in FIGS. 20, 21, and 23-26, a bottom portion of the first sidewall 22 and a bottom portion of the second sidewall 24 can curve inward such that the bottom portion of the first sidewall 22 can face the bottom portion of the second sidewall 24. As well, the first extension wall 92 can include a first retaining lip 25 that extends from a top portion to a bottom portion of the first extension wall 92. Accordingly, the second extension wall 94 can include a second retaining lip 25 that extends from a top portion to a bottom portion of the second extension wall 94. The first and second retaining lips 25 can thereby be configured to fix the electronic device 11 to the base 14 along the first direction X.

In some embodiments, the first extension wall 92 comprises a first retention portion 25 that faces away from the first sidewall 22 and the second extension wall 94 comprises a second retention 25 portion that faces away from the second sidewall 24. When the first extension wall 92 is in the extended position 88, the first retention portion 25 can be located a first distance from the base 14. Accordingly, when the first extension wall 92 is in the retracted position 86, the first retention portion 25 can be located a second distance from the base 14. Likewise, when the second extension wall 94 is in the extended position 88, the second retention portion 25 can be located a third distance from the base 14. As well, when the second extension wall 94 is in the retracted position 86, the second retention portion 25 can be located a fourth distance from the base 14. In some embodiments, the first distance is greater than the second distance and the third distance is greater than the fourth distance. Generally speaking, the movement of the first and second extension walls 92, 94, and therefore the first and second retention portions 25, along the first direction X, can thereby allow the mounting system 10 to securely couple to electronic devices 11 of various thicknesses (e.g. heights).

When the first and second extension walls 92, 94 are positioned in the retracted position 86 and/or the extended position 88, the extension walls 92, 94 can thereby be locked into place. In other words, when the first extension wall 92 is in the retracted position 86 and/or extended position 88, the first extension wall 92 can be locked in place relative to the first sidewall 22 and/or the base 14. As well, when the second extension wall 94 is in the retracted position 86 and/or extended position 88, the second extension wall 94 can be locked in place relative to the second sidewall 24 and/or the base 14.

Accordingly, with reference to FIGS. 27-30, some embodiments of the mounting system 10 can further include a first engaging portion 106 located along a portion of the first extension wall 92 and a second engaging portion 112 located along a portion of the second extension wall 94. As well, embodiments of the mounting system 10 can include a first retraction slot 102 located along an outer surface of the first sidewall 22. The first retraction slot 102 can be configured to receive the first engaging portion 106 when the first extension wall 92 is in the retracted position 86. Likewise, some embodiments of the mounting system 10 can include a second retraction slot 108 located along an outer surface of the second sidewall 24. The second retraction slot 108 can be configured to receive the second engaging portion 112 when the second extension wall 94 is in the retracted position 86.

Figure 28:
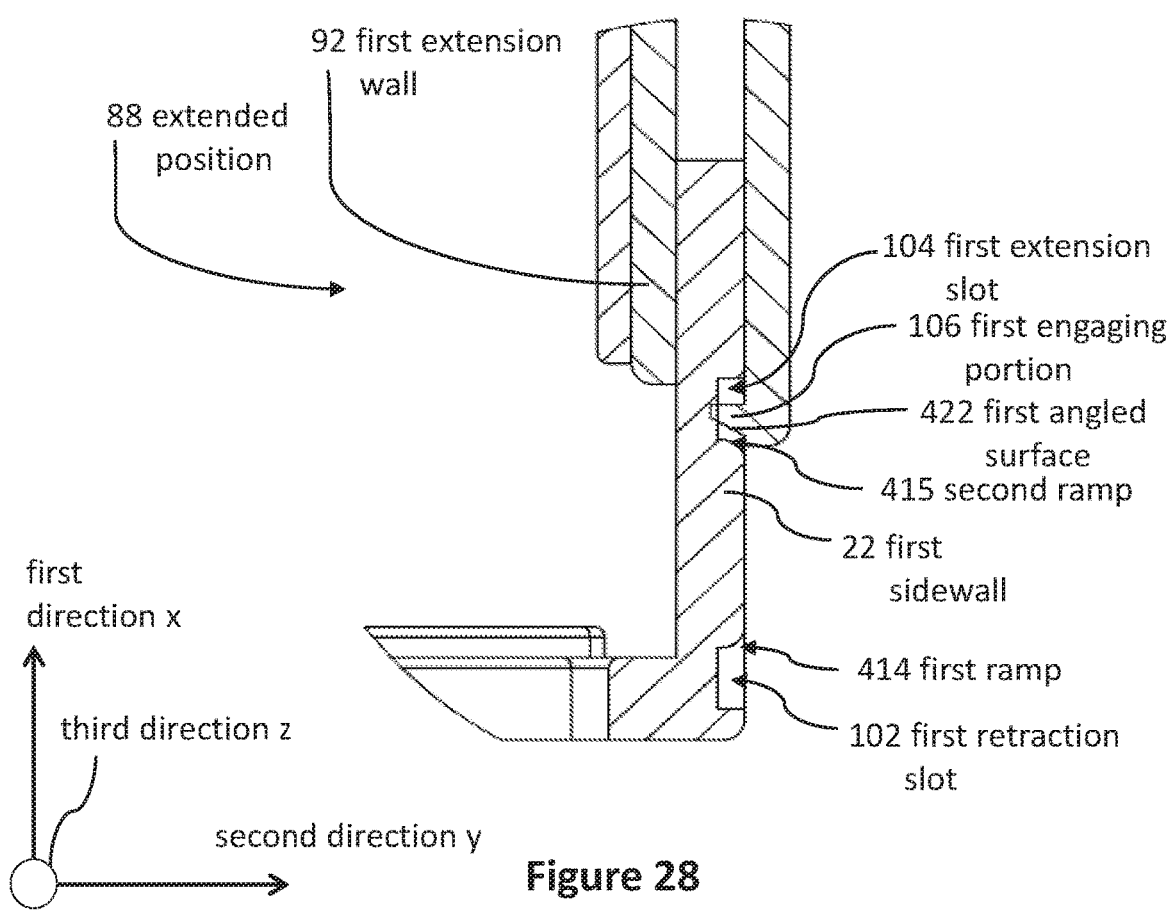
FIG. 28 illustrates detailed view E from FIG. 27, according to some embodiments.
Figure 29:
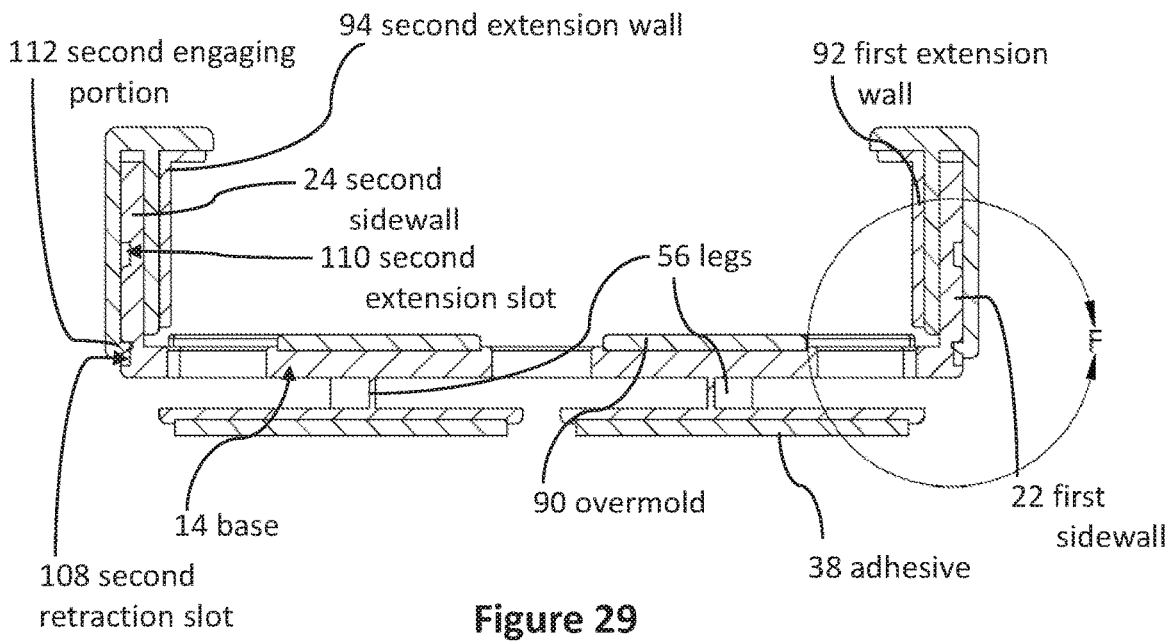
FIG. 29 illustrates a cross-sectional view along line D-D from FIG. 25 with first and second extension walls in a retracted position, according to some embodiments.
Figure 30:
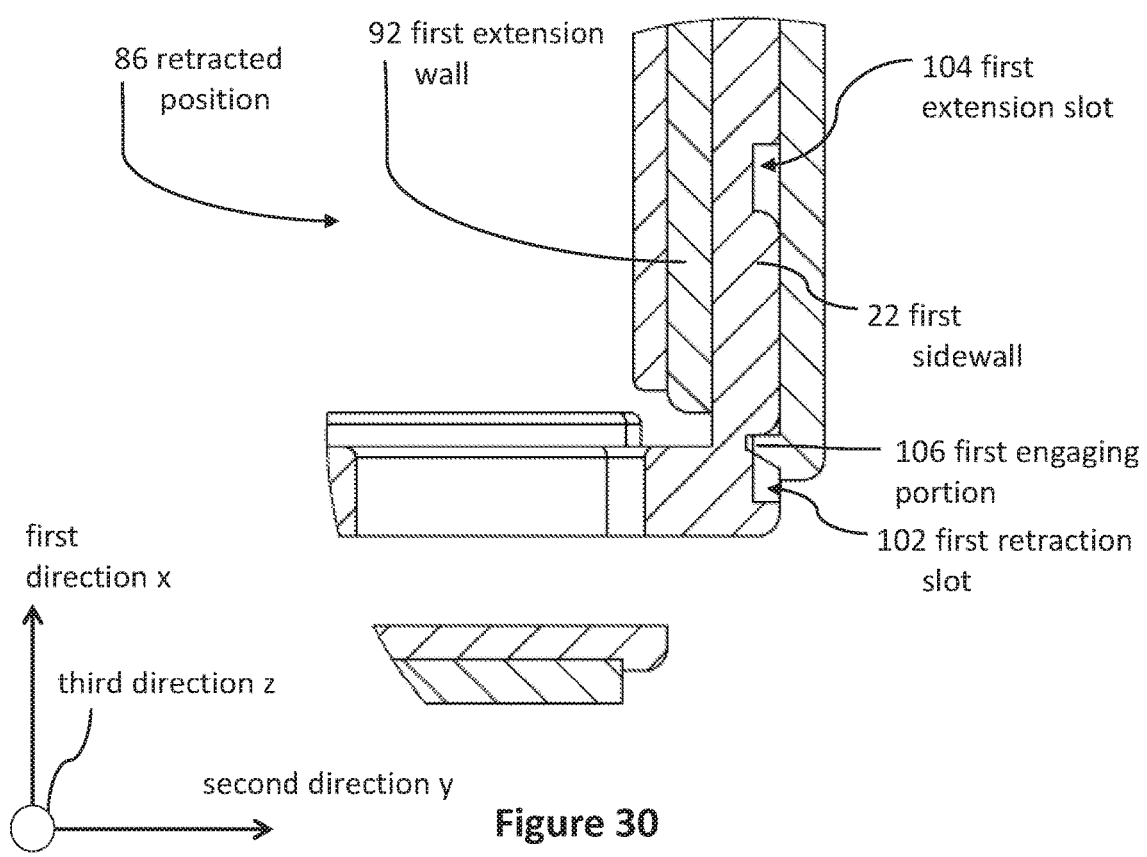
FIG. 30 illustrates detailed view E from FIG. 29, according to some embodiments.

The slots (e.g., 102, 104) can be indentation in a first sidewall (e.g., as shown in FIG. 28). The first sidewall can be coupled to a second sidewall configured to move inward and outward relative to the first sidewall. The second sidewall can include a protrusion oriented towards the indentations to releasably snap into an indentation. The system can include one indentation located outward from a second indentation. These two indentations can form a first locking mechanism. The system can include a second identical locking mechanism. The first locking mechanism can be located on an upper portion of the sidewall system and the second locking mechanism can be located on a lower portion of the sidewall system.

Accordingly, when the first extension wall 92 is located in the retracted position 86, the first engaging portion 106 can lock with the first retraction slot 102 to thereby lock the first extension wall 92 with respect to the first sidewall 22 and/or the base 14. As well, when the second extension wall 94 is located in the retracted position 86, the second engaging portion 112 can lock with the second retraction slot 108 to thereby lock the second extension wall 94 with respect to the second sidewall 24 and/or the base 14.

Mounting systems 10 can also include a first extension slot 104 located along the outer surface of the first sidewall 22. The first extension slot 104 can be located further from the base 14 than the first retraction slot 102. In operation, the first extension slot 104 can be configured to receive the first engaging portion 106 when the first extension wall 92 is in the extended position 88. As well, some embodiments of the mounting systems 10 can also include a second extension slot 110 located along the outer surface of the second sidewall 24. The second extension slot 110 can be located further from the base 14 than the second retraction slot 108. The second extension slot 110 can be configured to receive the second engaging portion 112 when the second extension wall 94 is in the extended position 88.

When the first extension wall 92 is located in the extended position 88, the first engaging portion 106 can lock with the first extension slot 104 to thereby lock the first extension wall 92 with respect to the first sidewall 22 and/or the base 14. As well, when the second extension wall 94 is located in the extended position 88, the second engaging portion 112 can lock with the second extension slot 110 to thereby lock the second extension wall 94 with respect to the second sidewall 24 and/or the base 14.

With reference to FIGS. 23, 24, and 27-30, embodiments of the mounting system 10 can include additional slots and engaging portions to provide additional security and support between the extension walls and sidewalls. While not explicitly shown, mounting systems 10 can include a third engaging portion 118 located along the portion of the first extension wall 92. The third engaging portion 118 can be spaced from the first engaging portion 106 along the third direction Z that is perpendicular to the first direction X and the second direction Y. As well, some mounting systems 10 can include a fourth engaging portion 124 located along the portion of the second extension wall 94. The fourth engaging portion can be spaced from the second engaging portion 112 along the third direction Z.

Figure 24:
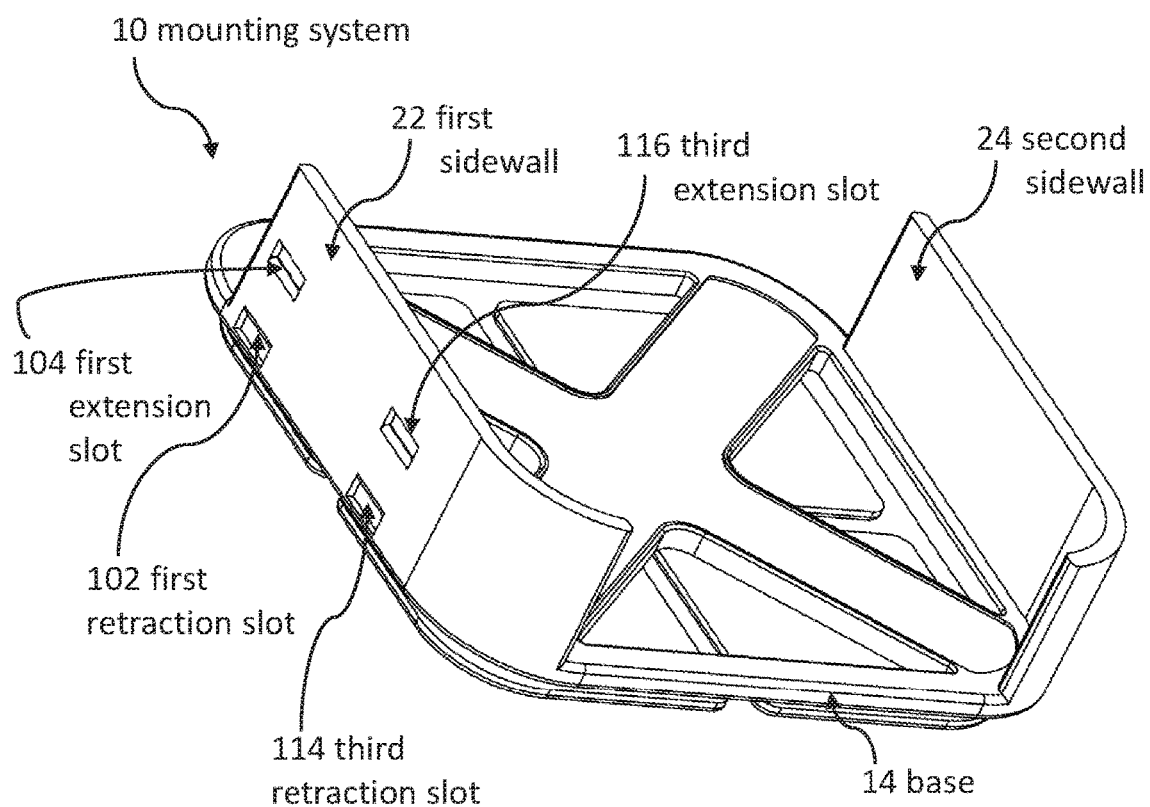
FIG. 24 illustrates a second side perspective view of an embodiment of a mounting system, according to some embodiments.
Figure 25:
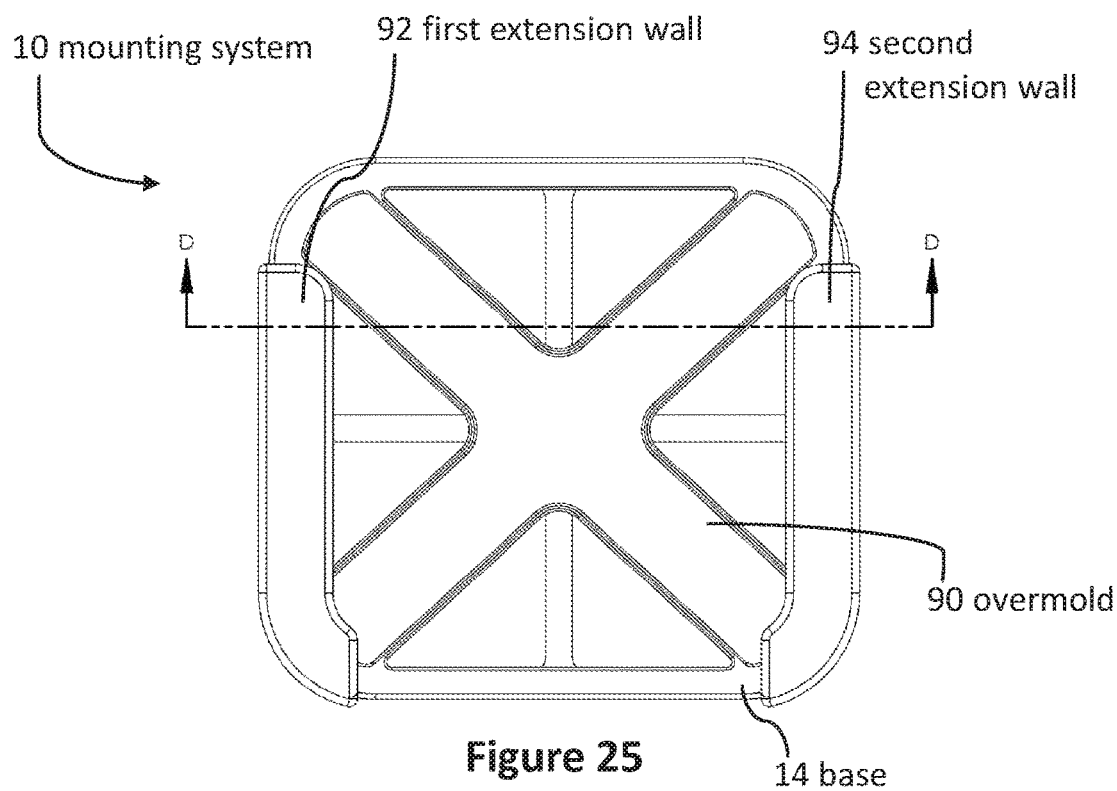
FIGS. 25 and 26 illustrate front views of embodiments of mounting systems, according to some embodiments.
Figure 26:
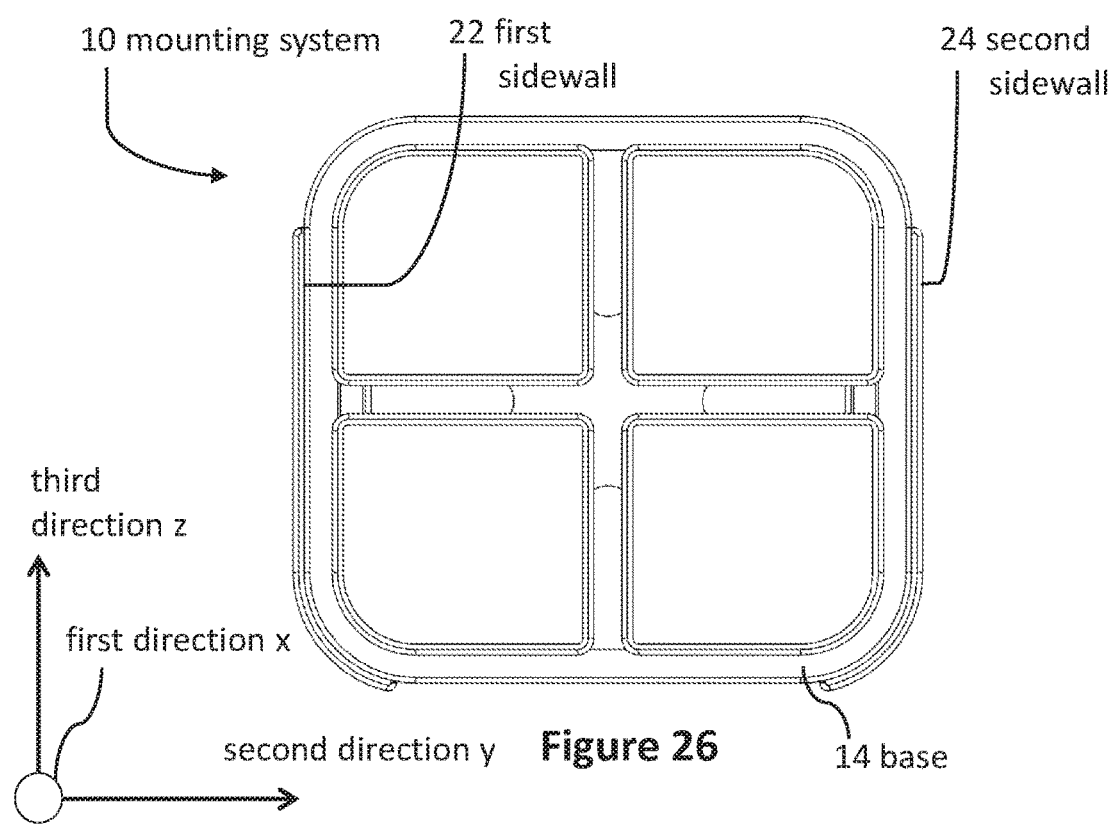
Figure 27:
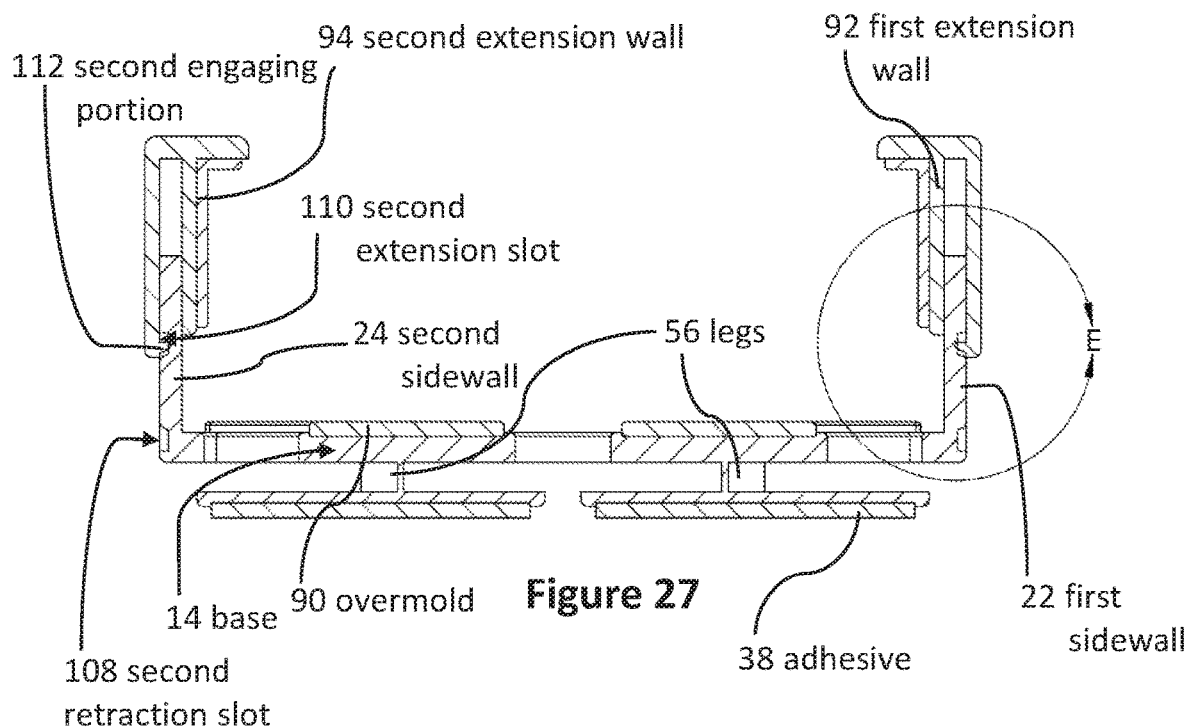
FIG. 27 illustrates a cross-sectional view along line D-D from FIG. 25 with first and second extension walls in an extended position, according to some embodiments.

As shown in FIGS. 23 and 24, embodiments of the mounting system 10 can include a third retraction slot 114 located along the outer surface of the first sidewall 22. The third retraction slot 114 can be spaced from the first retraction slot 102 along the third direction Z. The third retraction slot 114 can thereby be configured to receive the third engaging portion 118 when the first extension wall 92 is in the retracted position 86. As well, embodiments of the mounting system 10 can include a fourth retraction slot 120 located along the outer surface of the second sidewall 24. The fourth retraction slot 120 can be spaced from the second retraction slot 108 along the third direction Z. The fourth retraction slot 120 can thereby be configured to receive the fourth engaging portion 124 when the second extension wall 94 is in the retracted position 86.

As further shown in FIGS. 23 and 24, the mounting system 10 can also include a third extension slot 116 located along the outer surface of the first sidewall 22. In some embodiments, the third retraction slot 114 can be located closer to the base 14 than the third extension slot 116. The third extension slot 116 can be configured to receive the third engaging portion 118 when the first extension wall 92 is in the extended position 88. Embodiments of the mounting system 10 can also include a fourth extension slot 122 located along the outer surface of the second sidewall 24. The fourth retraction slot 120 can be located closer to the base 14 than the fourth extension slot 122. As well, the fourth extension slot 122 can be configured to receive the fourth engaging portion 124 when the second extension wall 94 is in the extended position 88.

Embodiments of the mounting system 10 can include additional features to aid in the movement of the first and second extension walls 92, 94 between the retracted position 86 and the extended position 88. More specifically, the additional features can help to unlock the respective engaging portions from the respective extension and/or retraction slots. In some embodiments, as shown in FIG. 27-30, the first retraction slot 102 comprises a first ramp 414 and the second retraction slot 108 comprises a third ramp 418. As the first engaging portion 106 slides across the first ramp 414, the first extension wall 92 can thereby move from the retracted position 86 to the extended position 88. As such, the first ramp 414 can allow the first engaging portion 106 to more easily unlock from the first retraction slot 102 when the first extension wall 92 moves from the retracted position 86 towards the extended position 88. As well, the third ramp 418 can allow the second engaging portion 112 to more easily unlock from the second retraction slot 108 when the second extension wall 94 moves from the retracted position 86 towards the extended position 88.

Furthermore, in order to assist in unlocking the extension walls 92, 94 from the extended position 88, the first extension slot 104 can include a second ramp 416 and the second extension slot 110 can include a fourth ramp 420. As the first engaging portion 106 slides across the second ramp 416, the first extension wall 92 moves from the extended position 88 to the retracted position 86. As well, when the second engaging portion 112 slides across the fourth ramp 420, the second extension wall 94 moves from the extended position 88 to the retracted position 86. As such, the second ramp 416 can allow the first engaging portion 106 to more easily unlock from the first extension slot 104 when the first extension wall 92 moves from the extended position 88 towards the retracted position 86. As well, the fourth ramp 420 can allow the second engaging portion 112 to more easily unlock from the second extension slot 110 when the second extension wall 94 moves from the extended position 88 towards the retracted position 86.

Some embodiments may even include additional features to further assist in unlocking the extension walls 92, 94 as they move from the retracted position 86 and/or the extended position 88. As further shown in FIGS. 27-30, the first engaging portion 106 can include a first angled surface 422 configured to slide across the second ramp 416 when the first extension wall 92 moves from the extended position 88 to the retracted position 86. As well, the second engaging portion 112 can comprise a second angled surface 424 configured to slide across the fourth ramp 420 when the second extension wall 94 moves from the extended position 88 to the retracted position 86. For example, the first angled surface 422 can allow the first engaging portion 106 to more easily unlock from the first extension slot 104 to thereby move the first extension wall 92 from the extended position. As well, the second angled surface 424 can allow the second engaging portion 112 to more easily unlock from the second extension slot 110 to thereby move the second extension wall 94 from the extended position. It should be appreciated that the angled surfaces can be disposed along any surface of the respective first engaging portion 106 and/or the second engaging portion 112. For example, the first angled surface 422 could be disposed along an opposite facing surface, as the surface that the first angled surface 422 is disposed in FIGS. 27 and 28. In this regard, this opposite configuration could assist the first engaging portion 106 to more easily unlock from the first retraction slot 102 to thereby move the first extension wall 92 from the retracted position 86.

Figure 18:
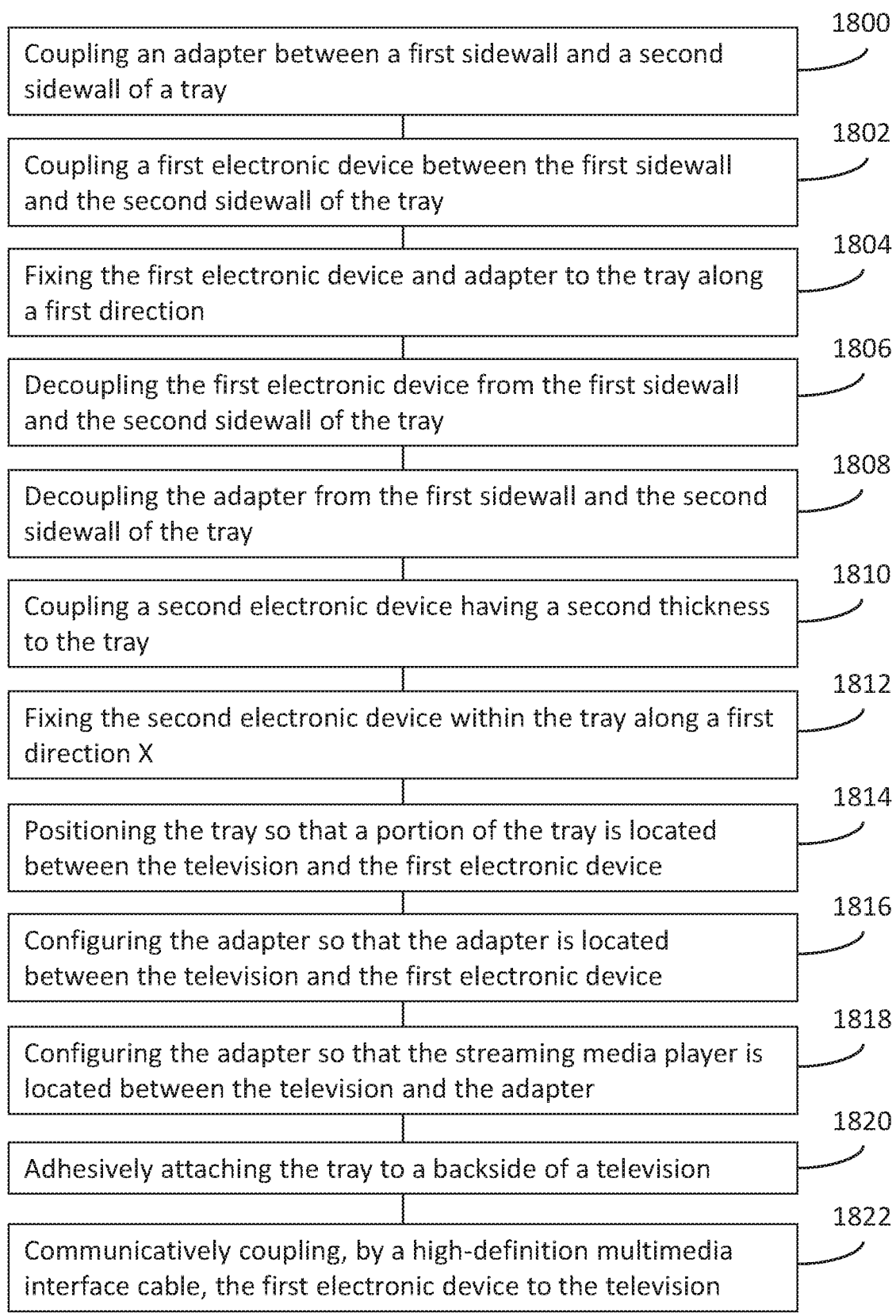
FIG. 18 illustrates a diagrammatic view of methods, according to some embodiments.

The disclosure also includes methods of using a tray 12 to couple an electronic device 11 to a television 13. As shown in FIG. 18, methods can include coupling an adapter 16 between a first sidewall 22 and a second sidewall 24 of the tray 12 (at step 1800). The first and second sidewalls 22, 24 can extend away from the television 13 along a first direction X. Methods can also include coupling a first electronic device 11a between the first sidewall 22 and the second sidewall 24 of the tray 12 (at step 1802).

Methods can also include fixing the first electronic device 11a and the adapter 16 to the tray 12 along the first direction X (at step 1804). Some methods can even include decoupling the first electronic device 11a from the first sidewall 22 and the second sidewall 24 of the tray 12 (at step 1806). Even still, methods can include decoupling the adapter 16 from the first sidewall 22 and the second sidewall 24 of the tray 12 (at step 1808).

With continued reference to FIG. 18, methods can even include coupling a second electronic device 11b between the first sidewall 22 and the second sidewall 24 of the tray 12 (at step 1810). In some embodiments, the first electronic device 11a has a first thickness extending along the first direction X. As well, the second electronic device 11b can have a second thickness extending along the first direction X. Even still, the adapter 16 can have a third thickness extending along the first direction X. In some embodiments, the third thickness is substantially equal to the first thickness plus the second thickness. It should be appreciated that the first, second, and third thicknesses can be equal to any size thickness.

Some methods can include fixing the second electronic device 11b to the tray 12 along the first direction X (at step 1812). As well, methods can include positioning the tray 12 so that a portion of the tray 12 is located between the television 13 and the first electronic device 11a (at step 1814). Some embodiments can include configuring the adapter 16 so that the adapter 16 is located between the television 13 and the first electronic device 11a (at step 1816). Even still, some embodiments can include configuring the adapter 16 so that the first electronic device 11a is located between the television 13 and the adapter 16 (at step 1818).

Methods can also include adhesively attaching the tray 12 to a backside surface of the television 13 (at step 1820). As well, methods can include communicatively coupling, by a High-Definition Multimedia Interface cable 70, the first electronic device 11a to the television 13 (at step 1822).

Figure 34:
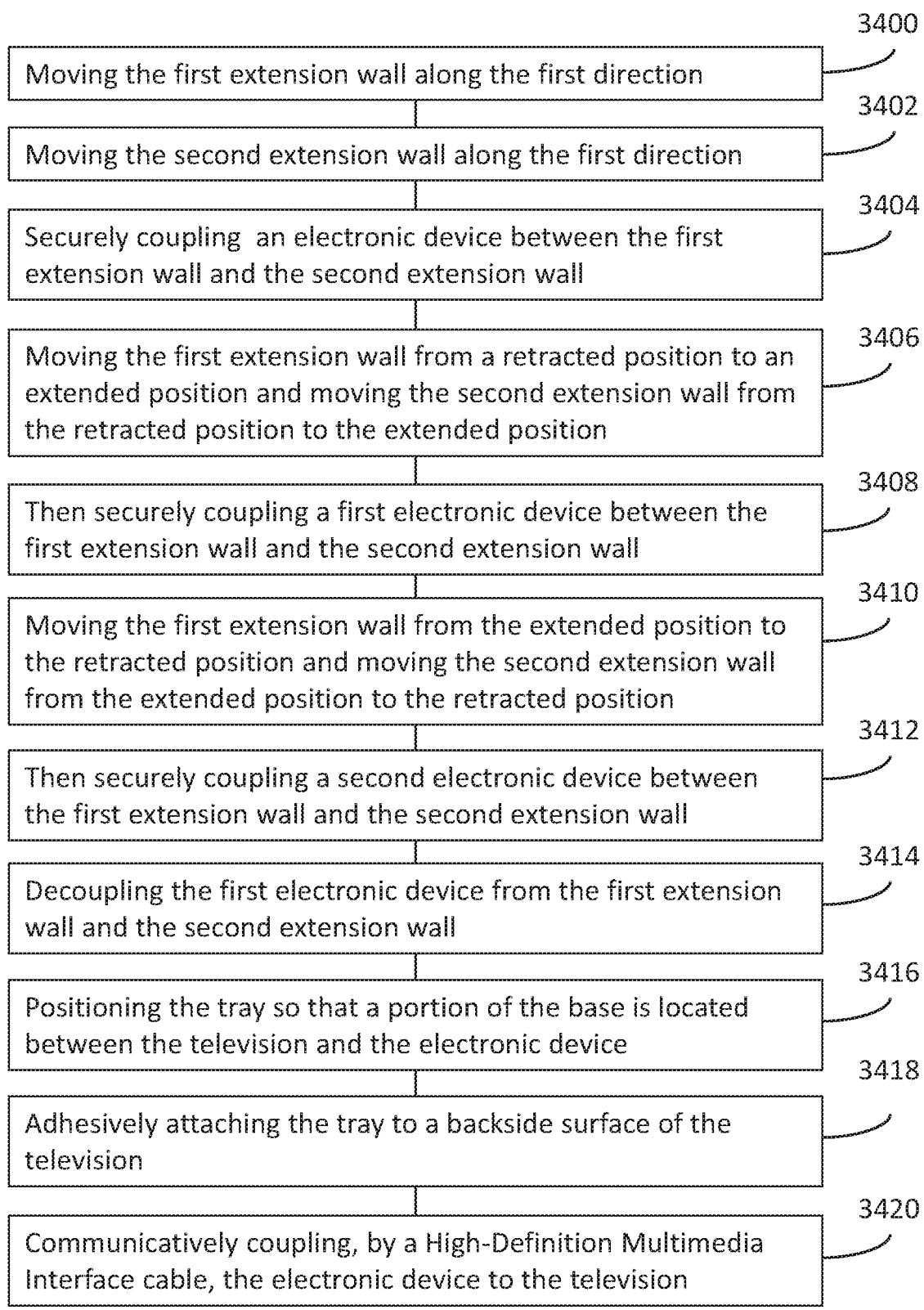
FIG. 34 illustrates a diagrammatic view of methods, according to some embodiments.

Now with reference to FIG. 34, the disclosure also includes methods of using a tray 12 to couple an electronic device 11 to a television 13. The tray 12 can comprise a base 14 configured to hold the electronic device 11, a first sidewall 22, a second sidewall 24, a first extension wall slideably coupled to the first sidewall, and a second extension wall slideably coupled to the second sidewall. As shown in FIG. 34, methods can include moving the first extension wall 92 along the first direction X (at step 3400). The first extension wall 92 can move with respect to the first sidewall 22. Methods can also include moving the second extension wall 94 along the first direction X (at step 3402). In some embodiments, the second extension wall 94 moves with respect to the second sidewall (at step 3402). Methods can also include securely coupling an electronic device 11 between the first extension wall 92 and the second extension wall 94 (at step 3404).

Methods can also include moving the first extension wall 92 from a retracted position 86 to an extended position 88 and moving the second extension wall 94 from the retracted position 86 to the extended position 88 (at step 3406). As well, after performing step 3406, methods can then include securely coupling a first electronic device 11a between the first extension wall 92 and the second extension wall 94 (at step 3408). The first electronic device 11a can define a first thickness extending along the first direction X.

In some embodiments, methods include moving the first extension wall 92 from the extended position 86 to the retracted position 88 and moving the second extension wall 94 from the extended position 88 to the retracted position 86 (at step 3410). After performing step 3410, methods can then include securely coupling a second electronic device 11b between the first extension wall 92 and the second extension wall 94 (at step 3412). The second electronic device 11b can define a second thickness extending along the first direction X. In some embodiments, the first thickness is greater than the second thickness.

Methods can even include decoupling the first electronic device 11a from the first extension wall 92 and the second extension wall 94 (at step 3414). In some embodiments, methods include positioning the tray 12 so that a portion of the base 14 is located between the television 13 and the electronic device 11 (at step 3416). In embodiments, the tray 12 can further include an adhesive pad 28 attached to the base 12. Methods can also include adhesively attaching the tray 12 to a backside surface of the television 13 (at step 3418). As well, methods can include communicatively coupling, by an HDMI cable 70, the electronic device 11 to the television 13 (at step 3420).

Mounts for Headphones

FIGS. 35-52 illustrate various aspects of a mounting system 500 configured to mount headphones 501 to a monitor 503. The monitor 503 can be a computer monitor. The monitor 503 can be a television monitor. To increase the clarity of the figures, not all items are labeled in each figure. Any aspect illustrated in FIGS. 35-52 can be combined with other aspects illustrated in FIGS. 35-52.

Figure 35:
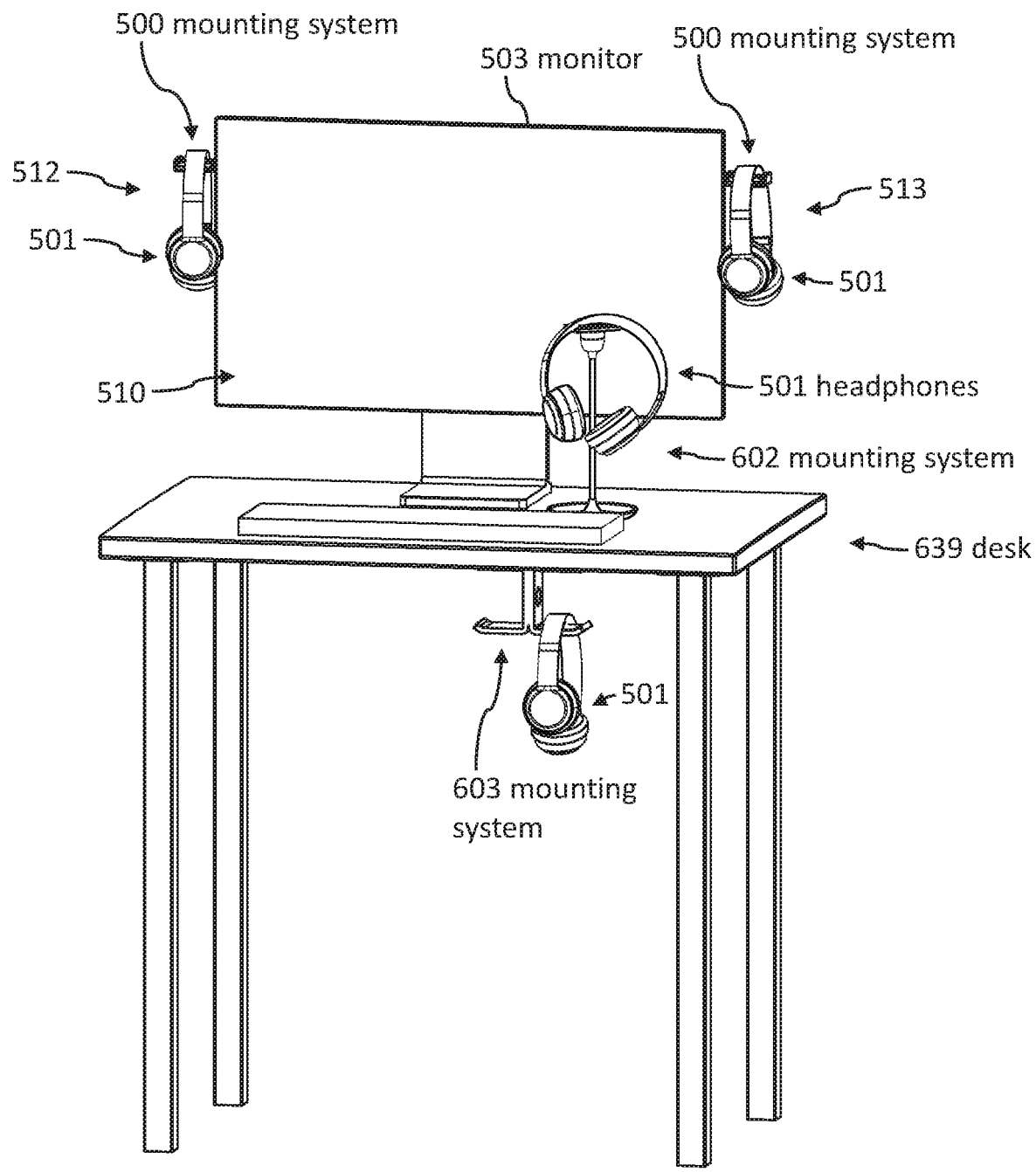
FIG. 35 illustrates a perspective view of a desk with headphones, according to some embodiments.

FIG. 35 illustrates a perspective view of a monitor 503 located on top of a desk 639. Many different types of mounts for headphones can be used with desks 639, however, many mounts for headphones have substantial disadvantages compared to the mounting system 500.

People can hang their headphones 501 on headphone stands, but this type of mounting system 602 is prone to tipping over easily, which could damage the headphones 501. In addition, headphone stands take up valuable and limited desk space. Moreover, headphones stands can get in the way of viewing the monitor 503 (as illustrated in FIG. 35). In contrast, mounting system 500 is much more stable, does not take up desk space, and prevents headphones 501 from blocking a user's view of the monitor 503.

Some people hang their headphones 501 on a hook attached to the underside of a desk 639, but this type of mounting system 603 has several disadvantages. First, when people sit down at their desk and slide their chair in, their knees can collide painfully with the hook. Second, these painful knee collisions can easily damage the headphones 501. In contrast, mounting system 500 keeps headphones safely out of the way.

Figure 36:
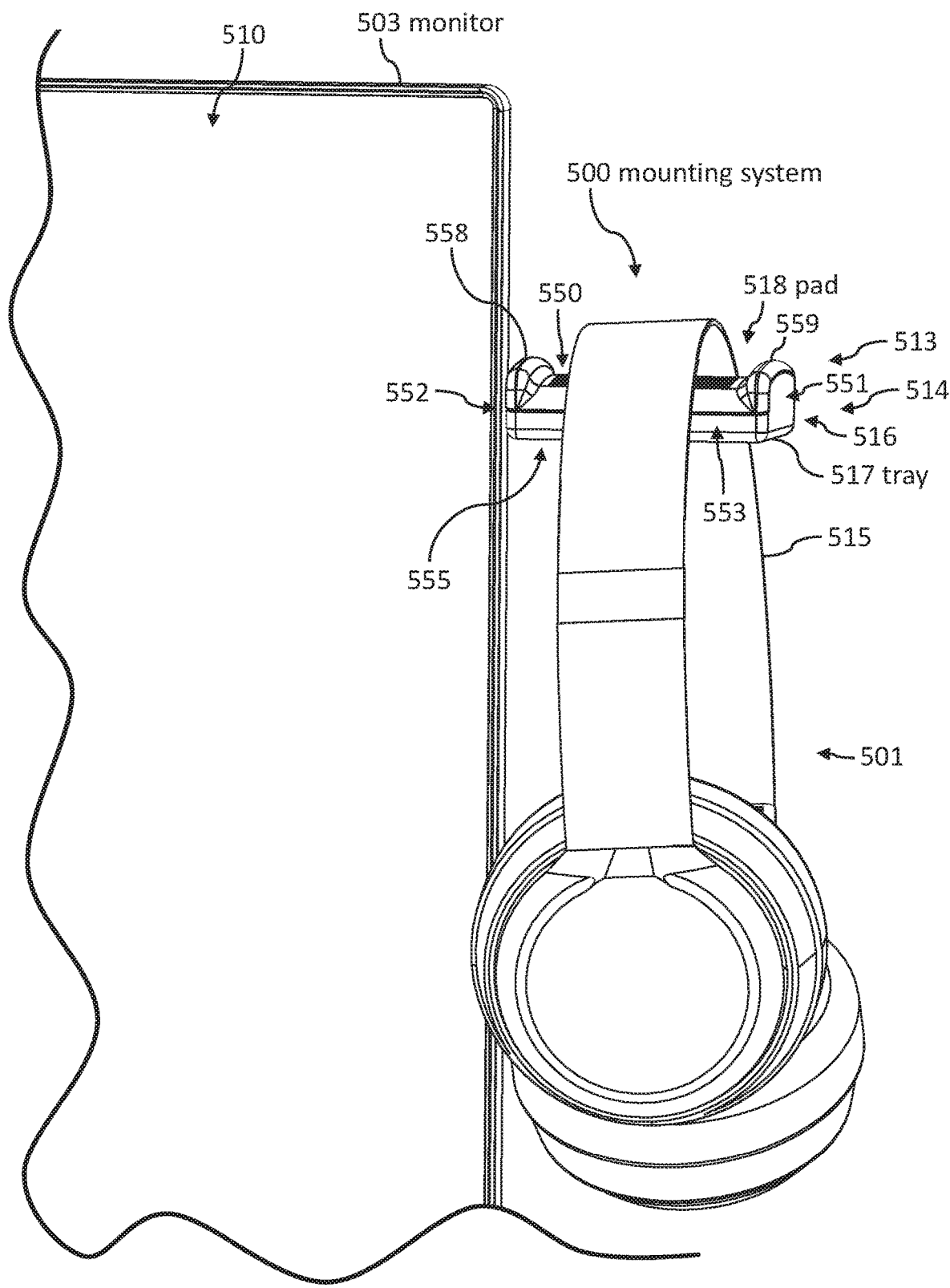
FIG. 36 illustrates a perspective view of a mounting system for headphones and a portion of a frontside of a monitor, according to some embodiments.

FIG. 36 illustrates a close-up perspective view of the mounting system 500 and a frontside 510 of the monitor 503. Much of the mounting system 500 is hidden behind the monitor 503.

Figure 37:
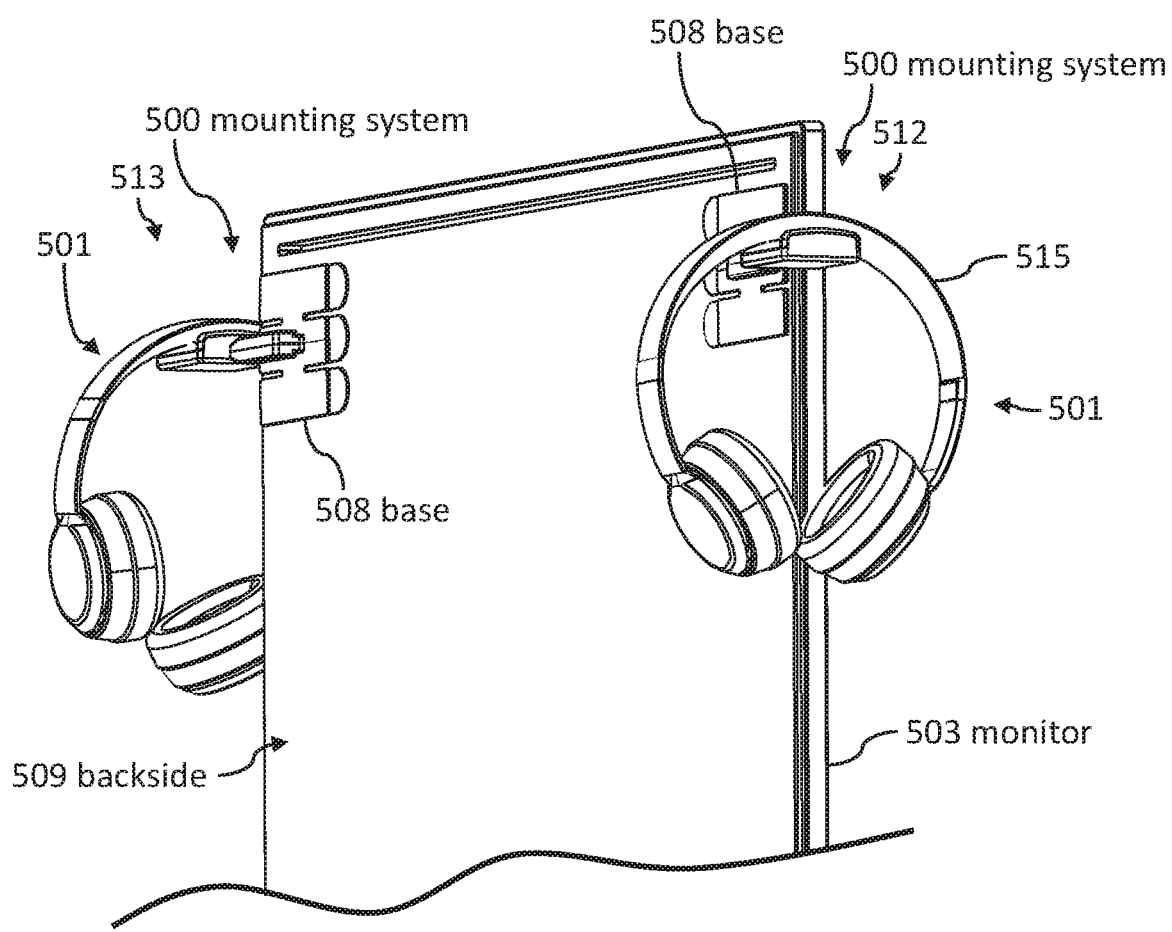
FIG. 37 illustrates a perspective view of the mounting system for headphones and a portion of a backside of the monitor, according to some embodiments.

FIG. 37 illustrates a perspective view of a backside 509 of the monitor 503 to show mounting components that are coupled to the backside 509 of the monitor 503 in order to support the headphones 501 on either the right side 513 of the monitor 503 or on the left side 512 of the monitor 503.

The right side 513 and the left side 512 of the monitor 503 are defined from the perspective of a user as she sits in front of the monitor 503 while looking directly at the frontside 510 of the monitor 503.

Figure 38:
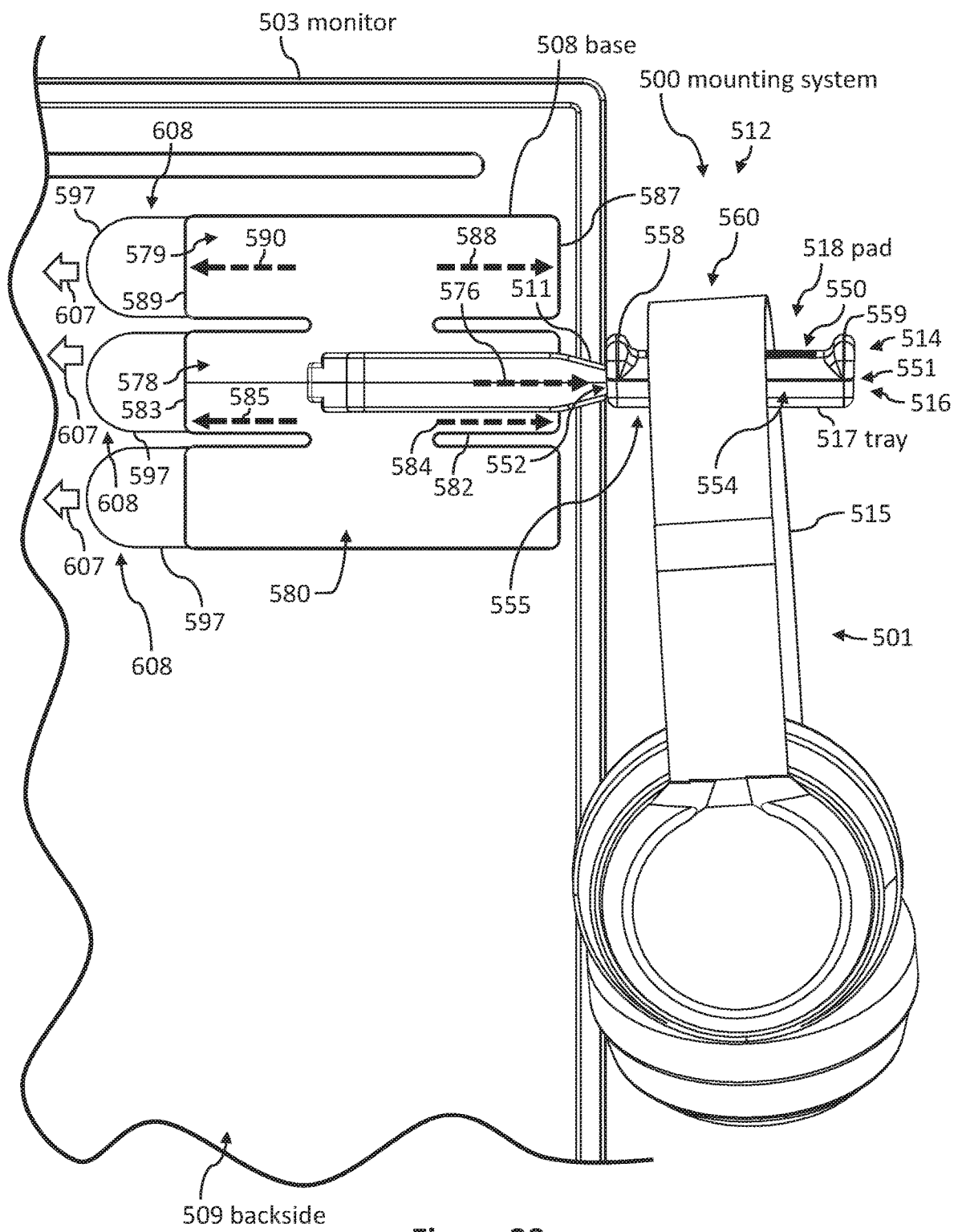
FIG. 38 illustrates a back view of the monitor to highlight some of the components of the mounting system for headphones, according to some embodiments.
Figure 39:
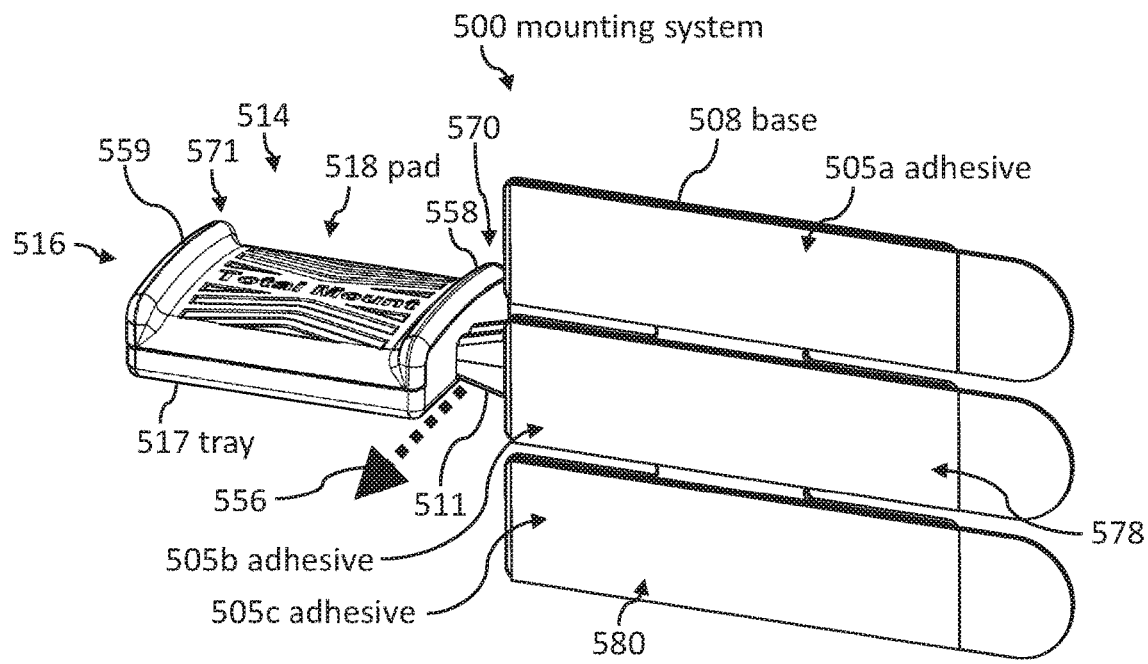
FIG. 39 illustrates a perspective view that includes the top of the mounting system for headphones, according to some embodiments.

FIG. 38 illustrates a back view of the monitor 503 to highlight some of the components of the mounting system 500. Many additional details of the mounting system 500 are explained in more detail in the context of FIGS. 39-52.

Figure 41:
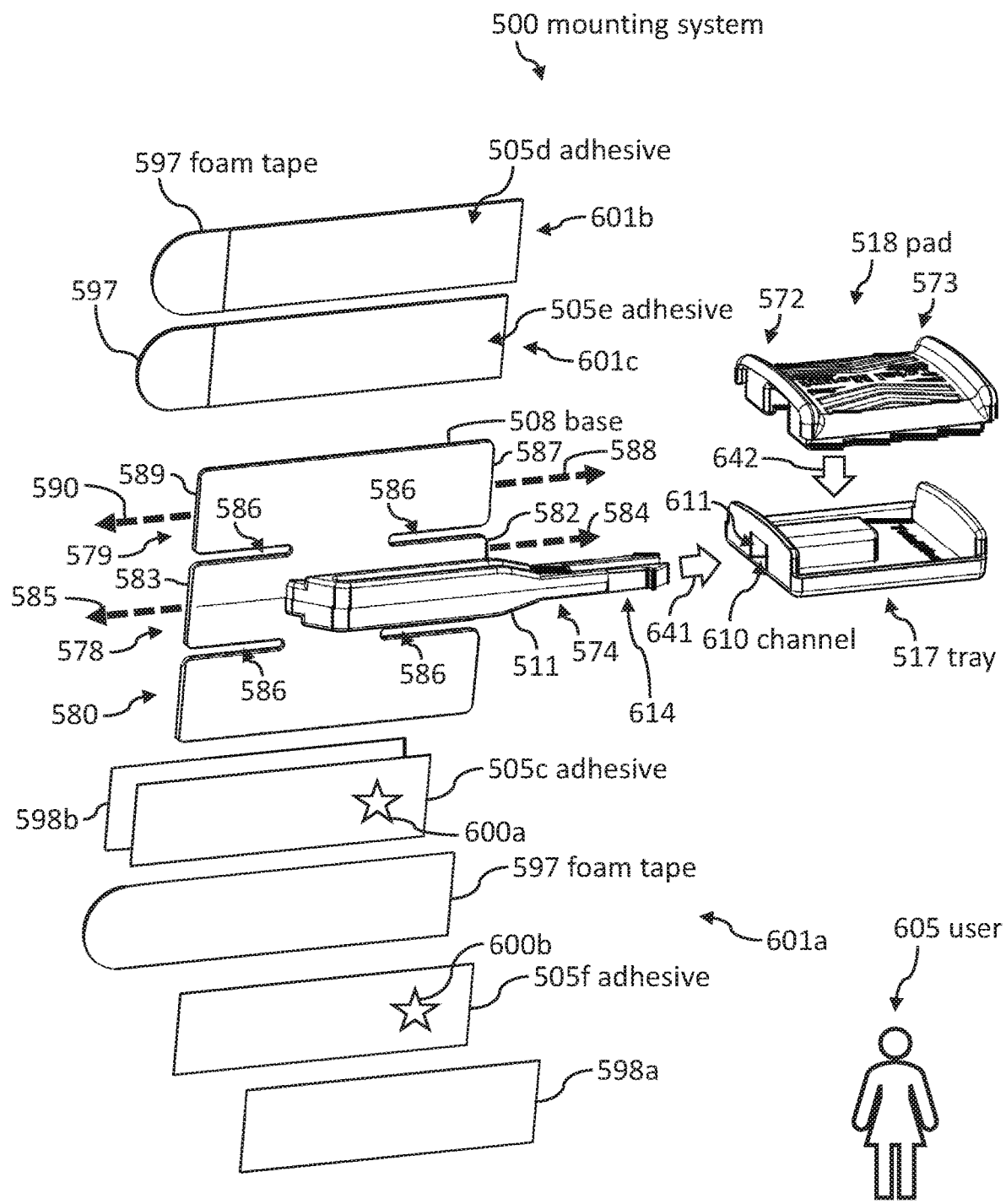
FIG. 41 illustrates an exploded, perspective view of the mounting system for headphones, according to some embodiments.

FIG. 41 illustrates an exploded, perspective view of the mounting system 500. A first adhesive assembly 601a is illustrated in an exploded format to highlight some of the components of the first adhesive assembly 601a. Second and third adhesive assemblies 601b, 601c are illustrated in an assembled format. Adhesive assemblies 601a, 601b, 601c can couple the base 508 of the mounting system 500 to the backside 509 of the monitor 503.

As indicated by arrow 641, a user 605 can slide protrusions 613, 614 (which are shown in more detail in FIG. 43) into a channel 610 to snap the base 508 to the tray 517. As indicated by arrow 642, the user 605 can press the pad 518 into the tray 517 using a compression fit.

Referring now to FIGS. 35-52, in some embodiments, a mounting system 500 is configurable to couple audio headphones 501 to a monitor 503. The mounting system 500 can comprise adhesive 505a, 505b, 505c, 505d, 505e, 505f; a base 508 configured to be coupled to a backside 509 of the monitor 503 by the first adhesive; and/or a first cantilever beam 511 coupled to the base 508 and configured to protrude horizontally away from the base 508.

A monitor 503 comprises a frontside 510 and a backside 509 located opposite the frontside 510. The frontside 510 is configured to display images and videos from a computer or media player. The frontside 510 can include an LED screen, an OLED screen, an LCD screen, or any other screen configured to display images. Monitors 503 can be computer monitors or television monitors.

In some embodiments, a mounting system 500 comprises a headphone support 514 coupled to a distal portion 615 of the first cantilever beam 511. The headphone support 514 can be configured to hold a headband 515 of the headphones 501 such that the headphones 501 are coupled to the monitor 503 by the mounting system 500.

Figure 42:
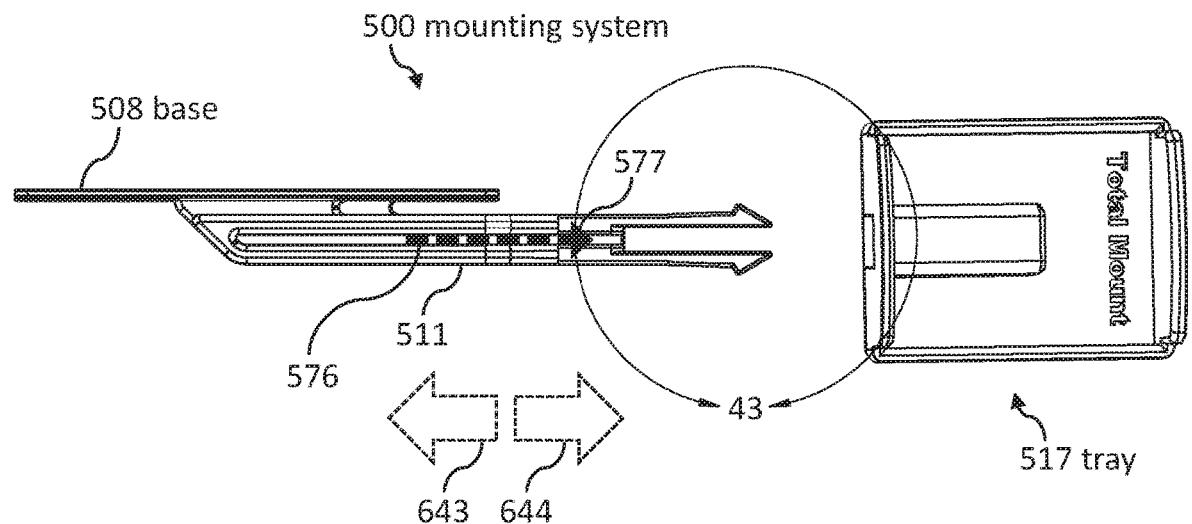
FIG. 42 illustrates a top view of portions of the mounting system for headphones, according to some embodiments.

As used herein, "distal" means situated away from the point of attachment. As used herein, "proximal" is defined relative to distal such that a proximal portion is located nearer to the point of attachment than a related distal portion. As shown in FIG. 42, for a first cantilever beam 511 that has a first central axis 576, arrow 644 indicates a distal direction and arrow 643 indicates a proximal direction.

Figure 52:
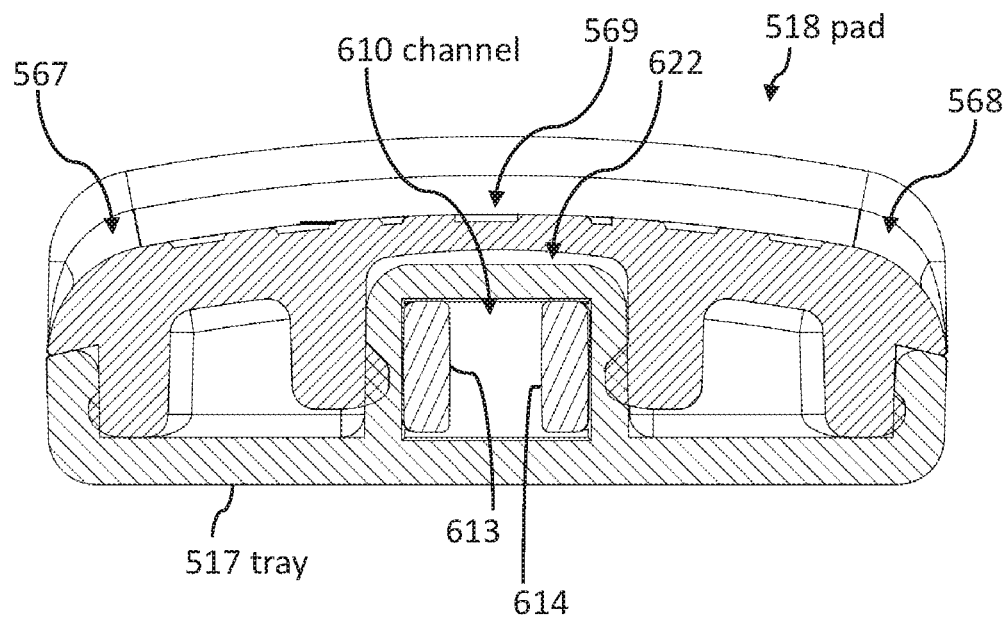
FIG. 52 illustrates a cross sectional view taken along line 52-52 in FIG. 51, according to some embodiments.

In some embodiments, a headphone support 514 comprises a platform 516 configured to hold a headband 515 of headphones 501. The platform 516 can comprise a tray 517 and a rubber pad 518. The rubber pad 518 can fit at least partially inside the tray 517 (e.g., as illustrated in FIG. 52). The tray 517 can be molded from acrylonitrile butadiene styrene ("ABS").

A base 508 can be coupled to the backside 509 of the monitor 503 such that the first cantilever beam 511 positions the platform 516 to at least one of a left side 512 of the monitor 503 and a right side 513 of the monitor 503.

In some embodiments, a platform 516 comprises an upward facing side 550, a distally facing side 551, a proximally facing side 552, a front facing side 553, a back facing side 554, and a downward facing side 555. The upward facing side 550 can be at least twice as large (in surface area) as the distally facing side 551, the proximally facing side 552, the front facing side 553, and the back facing side 554. In other words, the upward facing side 550 can be at least twice as large (in surface area) as the distally facing side 551; the upward facing side 550 can be at least twice as large (in surface area) as the proximally facing side 552; the upward facing side 550 can be at least twice as large (in surface area) as the front facing side 553; and the upward facing side 550 can be at least twice as large (in surface area) as the back facing side 554.

Figure 40:
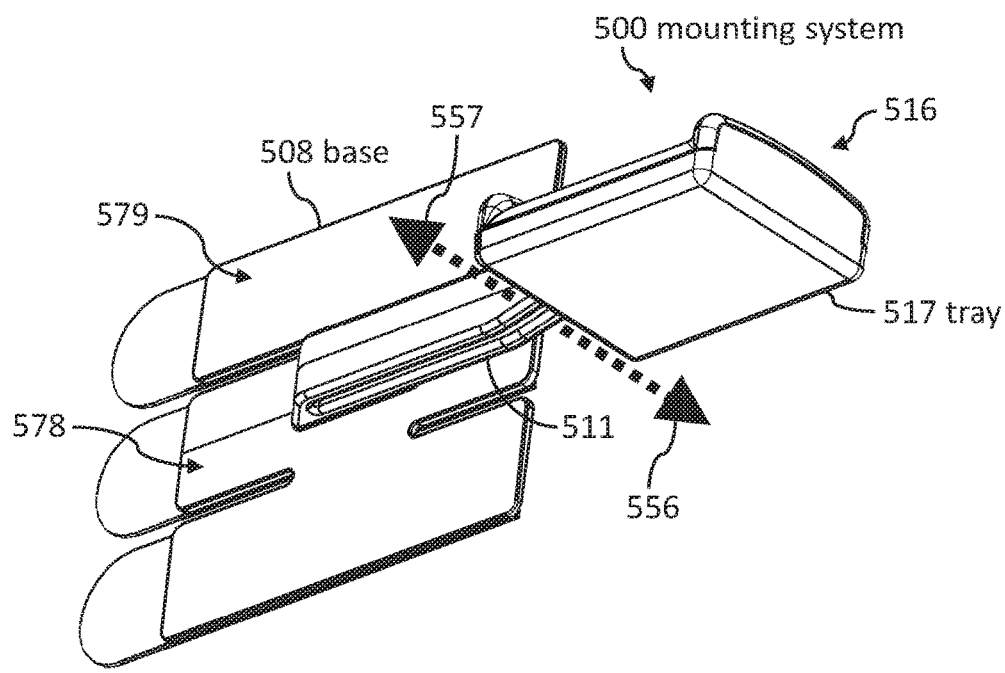
FIG. 40 illustrates a perspective view that includes the bottom of the mounting system for headphones, according to some embodiments.

The platform 516 can be configured to be oriented horizontally such that the platform 516 protrudes inward and outward relative to the first cantilever beam 511. FIG. 38 illustrates the platform oriented horizontally. FIG. 40 illustrates an arrow 556 indicating that the platform 516 protrudes outward relative to the first cantilever beam 511 and an arrow 557 indicating that the platform 516 protrudes inward relative to the first cantilever beam 511. The platform 516 protrudes outward in a first direction (e.g., as indicated by arrow 556) within twenty degrees of perpendicular to a central axis of the first cantilever beam 511. The platform 516 protrudes inward (e.g., as indicated by arrow 557) in a second direction within twenty degrees of perpendicular to a central axis of the first cantilever beam 511. The second direction can be within twenty degrees of opposite to the first direction.

As used herein, a second direction that is within twenty degrees of opposite to a first direction is within twenty degrees of an angle of 180 degrees relative to the first direction.

This is not to be confused with items located on opposite sides of an object. For example, a front side 510 of a monitor 503 is located on an opposite side of the monitor 503 relative to a backside 509 of the monitor 503.

In some embodiments, the proximally facing side 552 comprises a first sidewall 558 that protrudes upward and the distally facing side 551 comprises a second sidewall 559 that protrudes upward such that the platform 516 holds the headphones 501 and at least a portion 560 of the headband 515 is located between the first sidewall 558 and the second sidewall 559.

Figure 46:
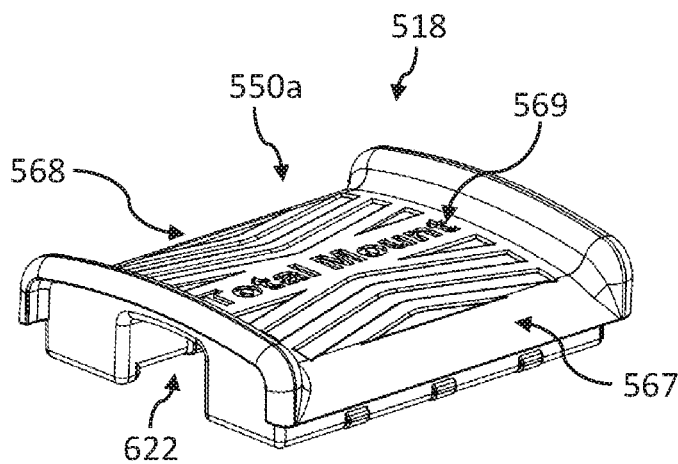
FIG. 46 illustrates a perspective view of portions of the mounting system for headphones, according to some embodiments.
Figure 47:
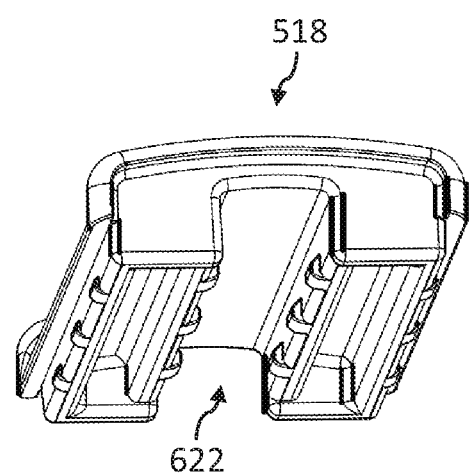
FIG. 47 illustrates a perspective view of portions of the mounting system for headphones, according to some embodiments.
Figure 48:
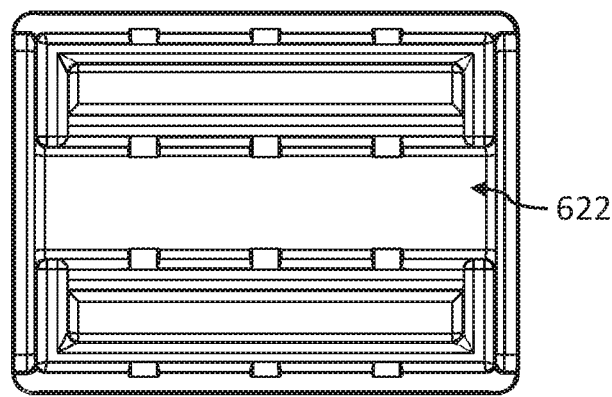
FIG. 48 illustrates a bottom view of portions of the mounting system for headphones, according to some embodiments.

In some embodiments, a headphone support 514 comprises an upward facing surface 550a that is convex. As illustrated in FIGS. 46 and 52, the upward facing surface 550a can comprise a first side 567, a second side 568 located opposite the first side, and a middle portion 569 located between the first side 567 and the second side 568. The middle portion 569 is farther upward than the first side 567 and the second side 568.

Referring now to FIG. 35-52, in some embodiments, a base 508 is coupled to the backside 509 of the monitor 503 such that the first cantilever beam 511 positions the upward facing surface 550a to at least one of a left side 512 of the monitor 503 and a right side 513 of the monitor 503.

In some embodiments, a headphone support 514 comprises a first sidewall 558 located on a proximal portion 570 of the headphone support 514 and a second sidewall 559 located on a distal portion 571 of the headphone support 514 such that the headphone support 514 is configured to hold at least a portion 560 of the headband 515 between the first sidewall 558 and the second sidewall 559.

In some embodiments, the first sidewall 558 and the second sidewall 559 protrude upward. The base 508 is coupled to the backside 509 of the monitor 503 such that the first cantilever beam 511 positions the first sidewall 558 and the second sidewall 559 to a left side 512 of the monitor 503 or to a right side 513 of the monitor 503.

The base 508 can comprise a first portion 578, a second portion 579, and a third portion 580. A first adhesive 505e can couple the first portion 578 to the backside 509 of the monitor 503. A second adhesive 505d can couple the second portion 579 to the backside 509 of the monitor 503. A third adhesive 505f can couple the third portion 580 to the backside 509 of the monitor 503.

Each portion 578, 579, 580 can be molded from thin acrylonitrile butadiene styrene ("ABS") such that each portion 578, 579, 580 can bend to match the curvature of the backside 509 of the monitor 503. This bending can dramatically increase the surface area of adhesive that couples the portions 578, 579, 580 to the backside 509 of the monitor 503. As a result, the bending dramatically increases the overall adhesion strength between the mounting system 500 and the monitor 503.

In some embodiments, a first cantilever beam 511 comprises a first central axis 576 oriented in a first direction 577 (indicated by an arrow in FIG. 42) toward the headphone support 514. A base 508 can comprise a first portion 578 having a second cantilever beam 582 that protrudes in a second direction 584 that is within twenty degrees of parallel to the first direction 577. The first portion 578 can comprise the second cantilever beam 582 and a third cantilever beam 583.

A base 508 can comprise a third cantilever beam 583 that protrudes in a third direction 585 that is within twenty degrees of opposite to the first direction 577. The second cantilever beam 582 can protrude away from the third cantilever beam 583. The second cantilever beam 582 and the third cantilever beam 583 can be on opposite sides of the base 508. The first portion 578 of the base 508 can be configured to be coupled to the backside 509 of the monitor 503 by the first adhesive 505e.

Slots 586 can separate cantilever beams of the base 508. A slot 586 can separate the third cantilever beam 583 from the fifth cantilever beam 589. A slot 586 can separate the second cantilever beam 582 from the fourth cantilever beam 587.

Figure 51:
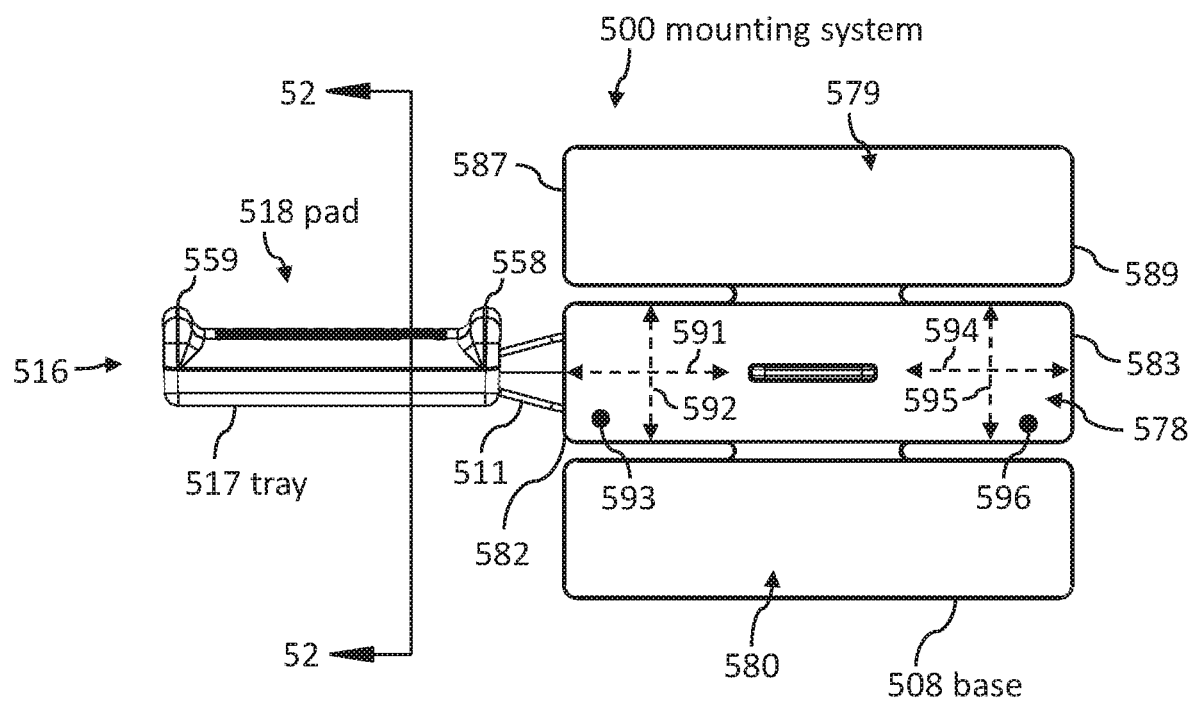
FIG. 51 illustrates a front view of portions of the mounting system for headphones, according to some embodiments.

In some embodiments, the second cantilever beam 582 is thin such that the second cantilever beam 582 is configured to bend according to the contours of the backside 509 of the monitor 503 such that adhesive can couple the second cantilever beam 582 to the backside 509 of the monitor 503 even if the backside 509 is curved. As illustrated in FIG. 51, the second cantilever beam 582 can comprise a first length 591 of greater than 14 millimeters and less than 100 millimeters; a first height 592 greater than 14 millimeters and less than 35 millimeters; and a first thickness 593 less than 4 millimeters and greater than 0.7 millimeters. The first thickness 593 is measured directly into the page as illustrated in FIG. 51.

In some embodiments, the third cantilever beam 583 is thin such that the third cantilever beam 583 is configured to bend according to the contours of the backside 509 of the monitor 503 such that adhesive (e.g., adhesive 505e) can couple the third cantilever beam 583 to the backside 509 of the monitor 503 even if the backside 509 is curved. As illustrated in FIG. 51, the third cantilever beam 583 can comprise a second length 594 of greater than 14 millimeters and less than 100 millimeters; a second height 595 greater than 14 millimeters and less than 35 millimeters; and a second thickness 596 less than 4 millimeters and greater than 0.7 millimeters. The second thickness 596 is measured directly into the page as illustrated in FIG. 51.

Some embodiments comprise a first adhesive 505c, a second adhesive 505f, and a stretchable foam tape 597. The stretchable foam tape 597 can couple the first adhesive 505c to the second adhesive 505f. A first removable paper liner 598b (which can be made from a film) can cover the first adhesive 505c to protect the first adhesive 505c prior to the first adhesive 505c being adhered to a surface. A second removable paper liner 598a can cover the second adhesive 505f to protect the second adhesive 505f prior to the second adhesive 505f being adhered to a surface.

An adhesive assembly 601a comprising a first adhesive 505c, a second adhesive 505f, a stretchable foam tape 597, a first removable paper liner 598b, and/or a second removable paper liner 598a can be used on the first portion 578 of the base 508. An equivalent and separate adhesive assembly 601b can be used on the second portion 579 of the base 508. An equivalent and separate adhesive assembly 601c can be used on the third portion 580 of the base 508. The adhesive assemblies 601a, 601b, 601c can be 3M Command Strips made by the 3M Company.

The first stretchable foam tape 597 can be configured to break a first adhesion 600a between the backside 509 of the monitor 503 and the first adhesive 505c and to break a second adhesion 600b between the first portion 578 of the base 508 and the second adhesive 505f in response to a user 605 stretching the first stretchable foam tape 597. (The user 605 is not drawn to scale in FIG. 41.)

In some embodiments, the first stretchable foam tape 597 comprises a first pull tab 608 configured to enable the user to stretch the first stretchable foam tape 597. The first pull tab 608 can be coupled to the third cantilever beam 583.

When the user 605 pulls the pull tabs 608 of the foam tapes 597 in the directions indicated by arrows 607 in FIG. 38, each foam tape 597 stretches until the adhesion of each adhesive of each adhesive assembly 601a, 601b, 601c is broken such that the adhesive assembly 601a, 601b, 601c no longer adheres to the mating surfaces (e.g., the base 508 and the backside 509 of the monitor 503).

In some embodiments, the base 508 comprises a second portion 579 having a fourth cantilever beam 587 that protrudes in a fourth direction 588 that is within twenty degrees of parallel to the first direction 577 and a fifth cantilever beam 589 that protrudes in a fifth direction 590 that is within twenty degrees of opposite to the first direction 577. The fourth cantilever beam 587 and the fifth cantilever beam 589 can be on opposite sides of the base 508.

The second portion 579 of the base 508 can comprise the fourth cantilever beam 587 and the fifth cantilever beam 589. The second portion 579 of the base 508 can be configured to be coupled to the backside 509 of the monitor 503 by adhesive (e.g., adhesive 505d).

Some embodiments comprise a second adhesive 505f coupled to the first portion 578 of the base 508, a third adhesive (equivalent to adhesive 505c but in a different adhesive assembly 601b), a fourth adhesive 505d coupled to the second portion 579 of the base 508, a first foam tape 597 that couples the first adhesive 505c to the second adhesive 505f, and a second foam tape 597 that couples the third adhesive to the fourth adhesive 505d.

In some embodiments, the first adhesive 505c couples the first foam tape 597 to the backside 509 of the monitor 503, the second adhesive 505f couples the first foam tape 597 to the first portion 578 of the base 508, the third adhesive couples the second foam tape 597 to the backside 509 of the monitor 503, and the fourth adhesive 505d couples the second foam tape 597 to the second portion 579 of the base 508.

In some embodiments, the headphone support 514 comprises a platform 516 configured to hold the headband 515. The platform 516 can comprise a first channel 610 having a first opening 611 and a second opening 612. The first cantilever beam 511 can comprise a first central axis 576 oriented in a first direction 577 toward the platform 516.

The mounting system 500 can comprise a protrusion 618 coupled to the first cantilever beam 511. The protrusion 618 protrudes radially outward relative to the first central axis 576 such that the protrusion 618 is configured to impede the first cantilever beam 511 from exiting the first channel 610 by the protrusion 618 interfering with the second opening 612.

Figure 43:
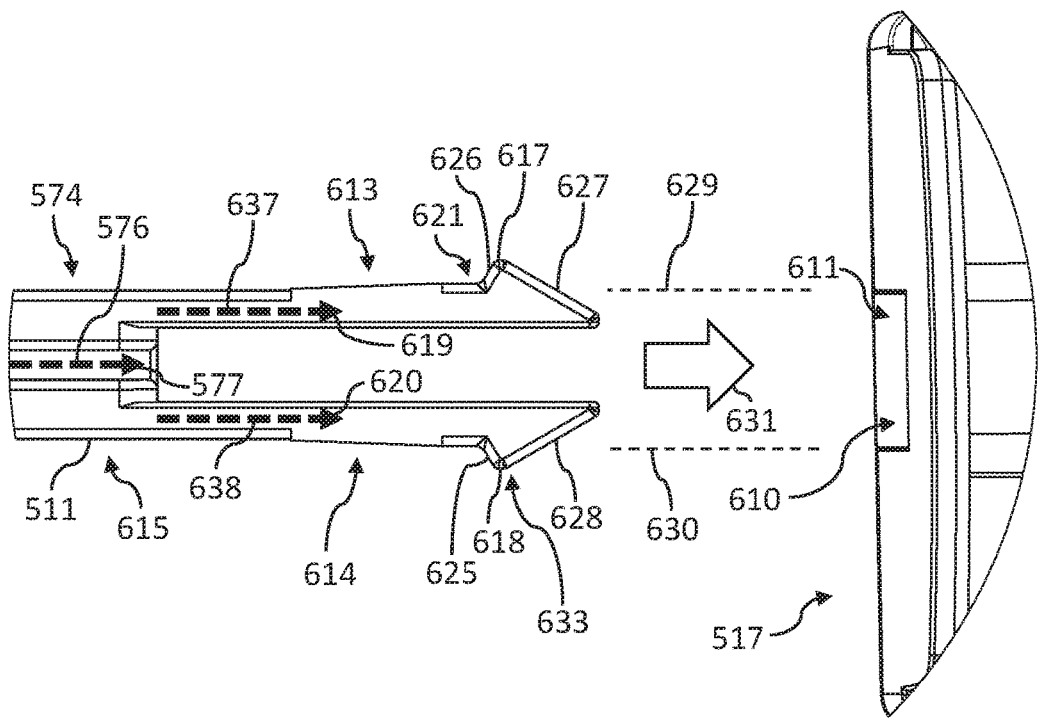
FIG. 43 illustrates the portion of FIG. 42 indicated by circle 43, according to some embodiments.
Figure 44:
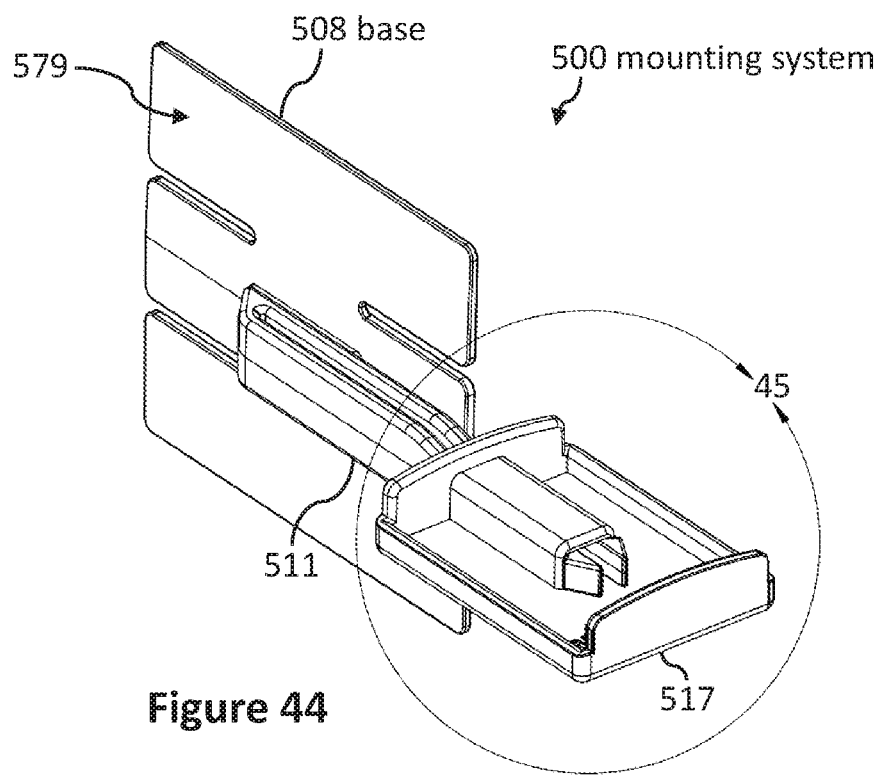
FIG. 44 illustrates a perspective view of portions of the mounting system for headphones, according to some embodiments.
Figure 45:
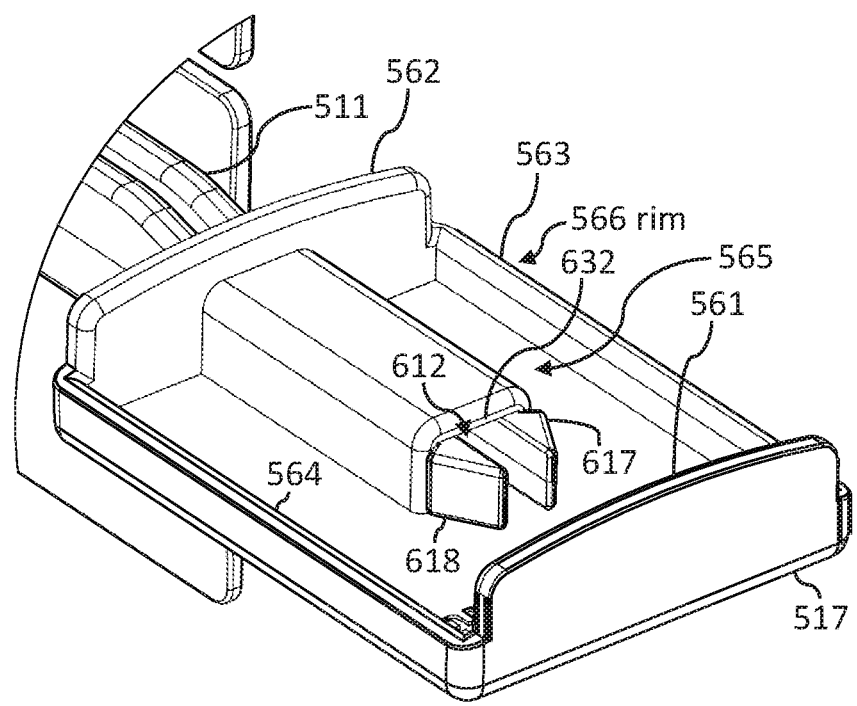
FIG. 45 illustrates the portion of FIG. 44 indicated by circle 45, according to some embodiments.
Figure 49:
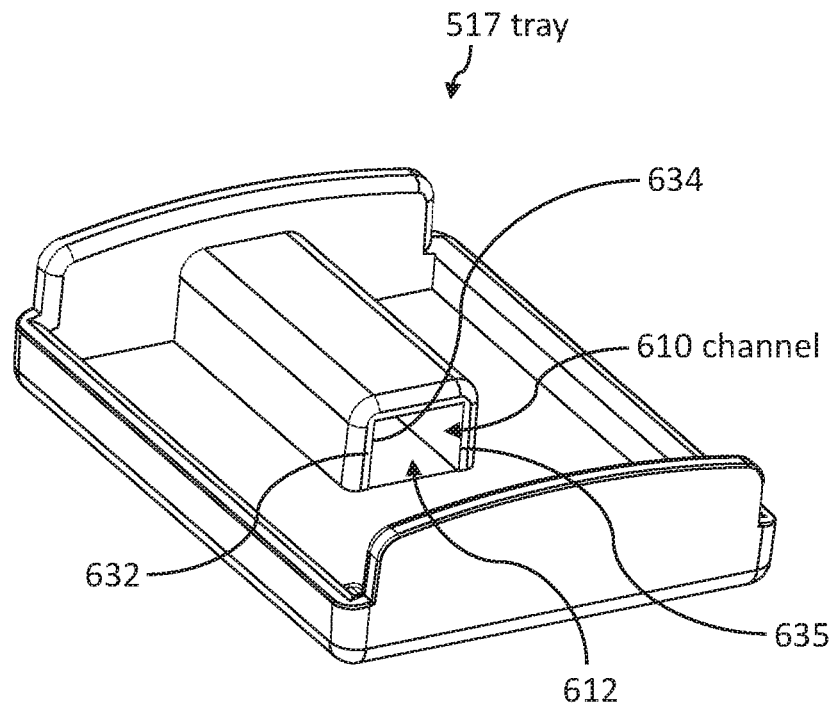
FIG. 49 illustrates a perspective view of portions of the mounting system for headphones, according to some embodiments.
Figure 50:
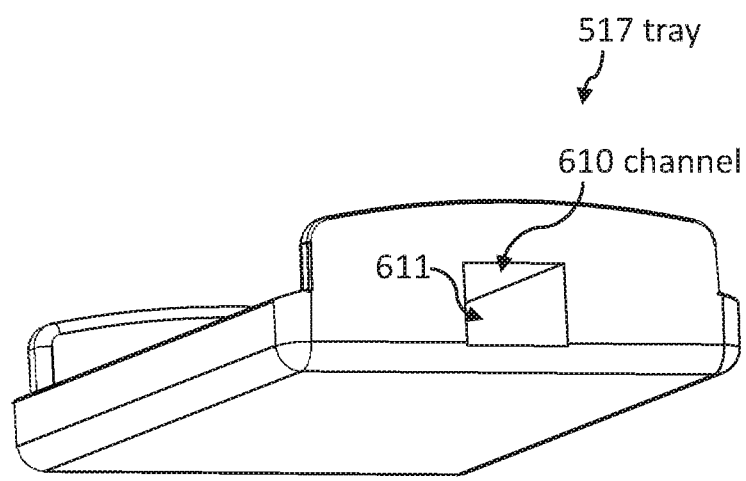
FIG. 50 illustrates a perspective view of portions of the mounting system for headphones, according to some embodiments.

Referring now primarily to FIGS. 43, 45, and 49, the protrusion 618 (and/or protrusion 617) can interfere with the second opening 612 because at least a portion 633 of the protrusion 618 is located farther radially outward relative to a central axis of the first channel 610 than an edge (e.g., edge 634, edge 635) of the second opening 612. As a result, trying to pull the base 508 away from the tray 517 (e.g., trying to pull the protrusions 617, 618 out of the channel 610) would cause the protrusions 617, 618 to collide with a rim 632 that defines the second opening 612.

This collision impedes uncoupling the tray 517 from the base 508. Pulling the base 508 away from the tray 517 with sufficient force can overcome the interference. Ramps 625, 626 on proximal portions of the protrusions 617, 618 cause the first protrusion 613 and the second protrusion 614 to bend toward each other in response to pulling the tray 517 away from the base 508. Decoupling the tray 517 from the base 508 in this manner enables the user 605 to flip the orientation of the tray 517 relative to the base 508 in order to orient the mounting system 500 on the right side of the monitor 503 rather than on the left side of the monitor 503 or on the left side of the monitor 503 rather than on the right side of the monitor 503.

Ramps 627, 628 on distal portions of the protrusions 617, 618 and/or on distal portions of protrusions 613, 614 cause protrusions 613, 614 to bend toward each other in response to the user 605 pushing first cantilever beam 511 and/or the protrusions 613, 614 into the first channel 610 through the first opening 611. A first width from the outer edge of protrusion 617 to the outer edge of protrusion 618 (e.g., measured perpendicularly to the central axis 576 of the first cantilever beam 511) is larger than a second width of the first opening 611 and/or is larger than a third width of the second opening 612. As a result, the ramps 627, 628 are important to cause the bending of the protrusions 613, 614 that enables the protrusions 613, 614 to fit through the channel 610 and also snap onto the rim 632 that defines the second opening 612. The protrusions 613, 614 snap onto the rim 632 by springing back toward the shapes they had prior to the bending. In some embodiments, the protrusions 613, 614 cannot spring completely back to the shapes they had prior to bending because the protrusions 613, 614 collide with interior walls of the channel 610, and the interior walls limit the movement of the protrusions 613, 614.

Lines 629, 630 in FIG. 43 indicate a width (measured between the lines 629, 630) of the channel 610. An arrow 631 indicates that the protrusions 613, 614 and/or the first cantilever beam 511 are pushed into the channel 610.

Referring now to FIGS. 35-52, a mounting system 500 can comprise a first cantilever beam 511 having a first central axis 576 oriented in a first direction toward a platform 516. The first protrusion 613 can comprise a second central axis 637 oriented within twenty degrees of parallel to the first central axis 576. The second protrusion 614 can comprise a third central axis 638 oriented within twenty degrees of parallel to the first central axis 576 and within twenty degrees of parallel to the second central axis 637.

The mounting system 500 can comprise a third protrusion 617 coupled to the first protrusion 613. The third protrusion 613 can protrude radially outward relative to the second central axis 637 and/or relative to the first central axis 576 such that the third protrusion 613 is configured to impede the first protrusion 613 from exiting the first channel 610 by the third protrusion 617 interfering with the second opening 612 and/or interfering with a rim 632 whose interior is the second opening 612.

The mounting system 500 can comprise a fourth protrusion 618 coupled to the second protrusion 614. The fourth protrusion 618 can protrude radially outward relative to the third central axis 638 and/or relative to the first central axis 576 such that the fourth protrusion 618 is configured to impede the second protrusion 614 from exiting the first channel 610 by the fourth protrusion 618 interfering with the second opening 612 and/or interfering with a rim 632 whose interior is the second opening 612.

In some embodiments, the first protrusion 613 is at least 4 millimeters long and/or less than 50 millimeters long (as measured along the central axis 637 of the first protrusion 613). In some embodiments, the second protrusion 614 is at least 4 millimeters long and/or less than 50 millimeters long (as measured along the central axis 638 of the second protrusion 614). In some embodiments, the third protrusion 617 protrudes radially outward at least 0.3 millimeters and/or less than 5 millimeters (as measured perpendicularly relative to the central axis 637). In some embodiments, the fourth protrusion 618 protrudes radially outward at least 0.3 millimeters and/or less than 5 millimeters (as measured perpendicularly relative to the central axis 638).

FIG. 51 illustrates a front view of portions of the mounting system 500. The frontside of the mounting system 500 is configured to be coupled by adhesive to the backside 509 of the monitor 503. The adhesive is hidden in FIG. 51 to show other features of the mounting system 500.

Referring now to FIGS. 35-52, in some embodiments, a headphone support 514 comprises a platform 516 configured to hold the headband 515. The platform 516 can comprise a tray 517 and a rubber pad 518. The platform 516 can comprise a first channel 610 having a first opening 611 and a second opening 612.

In some embodiments, a mounting system 500 comprises a first protrusion 613 coupled to the distal portion 615 of the first cantilever beam 511 and a second protrusion 614 coupled to the distal portion 615 of the first cantilever beam 511. The first protrusion 613 and the second protrusion 614 can secure the first cantilever beam 511 to the platform 516. The first protrusion 613 and the second protrusion 614 can be configured to couple the first cantilever beam 511 to the platform 516 by entering the first opening 611 and residing at least partially inside the first channel 610 (e.g., as illustrated in FIG. 52).

In some embodiments, the first protrusion 613 is a first cantilever protrusion 613 having a third protrusion 617 configured to pass through the first channel 610 and impede the first cantilever protrusion from exiting the first channel 610 by interfering with the second opening 612.

In some embodiments, the second protrusion 614 is a second cantilever protrusion 614 having a fourth protrusion 618 configured to pass through the first channel 610 and impede the second cantilever protrusion from exiting the first channel 610 by interfering with the second opening 612.

In some embodiments, the first protrusion 613 and the second protrusion 614 are configured to flex toward each other to enable the third protrusion 617 and the fourth protrusion 618 to pass through the first channel 610. The first protrusion 613 and the second protrusion 614 are configured to flex away from each other to enable the third protrusion 617 and the fourth protrusion 618 to interfere with the second opening 612 to impede the first and second cantilever protrusions from exiting the first channel 610.

In some embodiments, a headphone support 514 comprises a platform 516 configured to hold the headband 515. The platform 516 can comprise a first channel 610 having a proximal opening 611 and a distal opening 612. The first cantilever beam 511 can comprise a first central axis 576 oriented in a first direction 577 toward the headphone support 514.

In some embodiments, a mounting system 500 comprises a first protrusion 613 coupled to the distal portion 615 of the first cantilever beam 511 and a second protrusion 614 coupled to the distal portion 615 of the first cantilever beam 511. The first protrusion 613 can protrude in a second direction 619 that is within twenty degrees of parallel to the first direction 577. The second protrusion 614 can protrude in a third direction 620 that is within twenty degrees of parallel to the first direction 577. The first protrusion 613 and the second protrusion 614 can be oriented within twenty degrees of parallel to each other.

In some embodiments, the first protrusion 613 and the second protrusion 614 are located at least partially in the first channel 610 (illustrated in FIG. 52), a third protrusion 617 is coupled to a distal portion 621 of the first protrusion 613 (illustrated in FIG. 43), and the third protrusion 617 interferes with the distal opening 612 such that the third protrusion 617 is configured to impede the first protrusion 613 from exiting the first channel 610 out of the proximal opening 611 (illustrated in FIG. 45).

In some embodiments, a headphone support 514 comprises a platform 516 to hold the headband 515. The platform 516 can comprise a distal sidewall 561, a proximal sidewall 562, a front sidewall 563, and a back sidewall 564. The headphone support 514 can comprise a rubber pad 518 located at least partially between the distal sidewall 561, the proximal sidewall 562, the front sidewall 563, and the back sidewall 564. The rubber pad 518 can be molded from silicone having a durometer between 40 Shore A and 75 Shore A.

In some embodiments, the platform 516 comprises a tray 517 that is an open receptacle with a flat bottom 565 and a low rim 566 for holding a rubber pad 518. The rim 566 can be formed by the distal sidewall 561, the proximal sidewall 562, the front sidewall 563, and the back sidewall 564. The tray 517 can be oriented such that it faces upward to hold the rubber pad 518 on top of the tray 517.

In some embodiments, a rubber pad 518 comprises a first sidewall 558 coupled to a proximal portion 572 of the rubber pad 518 and a second sidewall 559 coupled to a distal portion 573 of the rubber pad 518. At least a portion 560 of the headband 515 can be located between the first sidewall 558 and the second sidewall 559 such that the first cantilever beam 511 positions the portion 560 of the headband 515 to at least one of a left side 512 of the monitor 503 and a right side 513 of the monitor 503, and an adhesive couples the base 508 to the backside 509 of the monitor 503.

In some embodiments, a headphone support 514 comprises a platform 516 configured to hold the headband 515, the platform 516 comprises a first channel 610, at least a first portion 574 of the first cantilever beam 511 is located in the first channel 610, the headphone support 514 comprises a rubber pad 518 configured to face upward toward at least a portion 560 of the headband 515, the rubber pad 518 comprises a downward facing open area 622, and the rubber pad 518 is coupled to the platform 516 such that the first channel 610 is located at least partially in the open area 622 of the rubber pad 518 (illustrated in FIG. 52).

Interpretation

As used herein, the term "susbtantially" can be interpretted to have different meanings depending upon the context. For example, "substantially" can mean two surfaces that are within 25-degrees of each other. As well, the term "substantially" can be understood to mean that two protrusions are aligned within 0.5 inches of one another along a defined direction. In other contexts, "substantially" can mean plus or minus 0.5 inches.

As well, the term "about" can be interpreted to mean different things depending upon the context. For example, if the disclosure states that a pad is "about" 0.045 inches thick. The term "about" can mean that the pad is within + or −0.005 inches. In another example, if the disclosure states that a thickness is "about" 0.5 inches thick. The term "about," within this context, can mean that the thickness is within + or −0.05 inches. In yet another example, if the disclosure states that a thickness is "about" 1 millimeter thick. The term "about," within this context, can mean that the thickness is within + or −0.1 millimeters.

"Electronic device" can comprise any electronic device, such as a streaming media player, gaming console, cable box (for bringing digital cable television content from a cable provider to a television), and the like. The term "wall" can comprise any surface located along a television, such as a backside surface of a television. "Wall" can also comprise any wall associated with a building (e.g. home, office building, school, etc.), such as an interior wall and an exterior wall.

"Securely coupled" can mean snugly fit or closely fit. In other words, "securely coupled" can mean that the inside space between the base and a top underside of the extension wall is slightly greater than the thickness (e.g. height) of the electronic device 11.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A mounting system configurable to couple audio headphones to a monitor, the mounting system comprising:
   a first adhesive;
   a base configured to be coupled to a backside of the monitor by the first adhesive; and
   a first cantilever beam coupled to the base and configured to protrude horizontally away from the base.

2. The mounting system of claim 1, further comprising a headphone support coupled to a distal portion of the first cantilever beam, wherein the headphone support is configured to hold a headband of the headphones such that the headphones are coupled to the monitor by the mounting system.

3. The mounting system of claim 2, wherein the headphone support comprises a platform configured to hold the headband, wherein the base is coupled to the backside of the monitor such that the first cantilever beam positions the platform to at least one of a left side of the monitor and a right side of the monitor.

4. The mounting system of claim 3, wherein the platform comprises an upward facing side, a distally facing side, a proximally facing side, a front facing side, a back facing side, and a downward facing side,
   the upward facing side is at least twice as large in surface area as the distally facing side, the proximally facing side, the front facing side, and the back facing side, and
   the platform is configured to be oriented horizontally such that the platform protrudes inward and outward relative to the first cantilever beam.

5. The mounting system of claim 4, wherein the proximally facing side comprises a first sidewall that protrudes upward and the distally facing side comprises a second sidewall that protrudes upward such that the platform holds the headphones and at least a portion of the headband is located between the first sidewall and the second sidewall.

6. The mounting system of claim 2, wherein the headphone support comprises an upward facing surface that is convex, wherein the upward facing surface comprises a first side, a second side located opposite the first side, and a middle portion located between the first side and the second side, and the middle portion is farther upward than the first side and the second side,
   wherein the base is coupled to the backside of the monitor such that the first cantilever beam positions the upward facing surface to at least one of a left side of the monitor and a right side of the monitor.

7. The mounting system of claim 2, wherein the headphone support comprises a first sidewall located on a proximal portion of the headphone support and a second sidewall located on a distal portion of the headphone support such that the headphone support is configured to hold at least a portion of the headband between the first sidewall and the second sidewall.

8. The mounting system of claim 7, wherein the first sidewall and the second sidewall protrude upward, and
   the base is coupled to the backside of the monitor such that the first cantilever beam positions the first sidewall and the second sidewall to at least one of a left side of the monitor and a right side of the monitor.

9. The mounting system of claim 2, wherein the first cantilever beam comprises a first central axis oriented in a first direction toward the headphone support,
   the base comprises a first portion having a second cantilever beam that protrudes in a second direction that is within twenty degrees of parallel to the first direction and a third cantilever beam that protrudes in a third direction that is within twenty degrees of opposite to the first direction, and
   the first portion of the base is configured to be coupled to the backside of the monitor by the first adhesive.

10. The mounting system of claim 9, wherein the second cantilever beam comprises a first length of at least 14 millimeters, a first height of at least 14 millimeters, and a first thickness of less than 4 millimeters, and
   the third cantilever beam comprises a second length of at least 14 millimeters, a second height of at least 14 millimeters, and a second thickness of less than 4 millimeters.

11. The mounting system of claim 9, further comprising a second adhesive and a first stretchable foam tape that couples the first adhesive to the second adhesive, wherein the first stretchable foam tape is configured to break a first adhesion between the backside of the monitor and the first adhesive and to break a second adhesion between the first portion of the base and the second adhesive in response to a user stretching the first stretchable foam tape, wherein the first stretchable foam tape comprises a first pull tab configured to enable the user to stretch the first stretchable foam tape, wherein the first pull tab is coupled to the third cantilever beam.

12. The mounting system of claim 9, wherein the base comprises a second portion having a fourth cantilever beam that protrudes in a fourth direction that is within twenty degrees of parallel to the first direction and a fifth cantilever beam that protrudes in a fifth direction that is within twenty degrees of opposite to the first direction.

13. The mounting system of claim 12, further comprising a second adhesive coupled to the first portion of the base, a third adhesive, a fourth adhesive coupled to the second portion of the base, a first foam tape that couples the first adhesive to the second adhesive, and a second foam tape that couples the third adhesive to the fourth adhesive, wherein the first adhesive couples the first foam tape to the backside of the monitor, the second adhesive couples the first foam tape to the first portion of the base, the third adhesive couples the second foam tape to the backside of the monitor, and the fourth adhesive couples the second foam tape to the second portion of the base.

14. The mounting system of claim 2, wherein the headphone support comprises a platform configured to hold the headband, the platform comprises a first channel having a first opening and a second opening, and the first cantilever beam comprises a first central axis oriented in a first direction toward the platform, wherein the mounting system further comprises a protrusion coupled to the first cantilever beam, and the protrusion protrudes radially outward relative to the first central axis such that the protrusion is configured to impede the first cantilever beam from exiting the first channel by the protrusion interfering with the second opening.

15. The mounting system of claim 2, wherein the headphone support comprises a platform configured to hold the headband, wherein the platform comprises a first channel having a first opening and a second opening, the mounting system further comprising a first protrusion coupled to the distal portion of the first cantilever beam and a second protrusion coupled to the distal portion of the first cantilever beam, and the first protrusion and the second protrusion are configured to couple the first cantilever beam to the platform by entering the first opening and residing at least partially inside the first channel.

16. The mounting system of claim 15, wherein the first cantilever beam comprises a first central axis oriented in a first direction toward the platform, and the first protrusion comprises a second central axis oriented within twenty degrees of parallel to the first central axis, wherein the mounting system further comprises a third protrusion coupled to the first protrusion, and the third protrusion protrudes radially outward relative to the second central axis such that the third protrusion is configured to impede the first protrusion from exiting the first channel by the third protrusion interfering with the second opening.

17. The mounting system of claim 15, wherein the first protrusion is a first cantilever protrusion having a third protrusion configured to pass through the first channel and impede the first cantilever protrusion from exiting the first channel by interfering with the second opening, and the second protrusion is a second cantilever protrusion having a fourth protrusion configured to pass through the first channel and impede the second cantilever protrusion from exiting the first channel by interfering with the second opening.

18. The mounting system of claim 17, wherein the first protrusion and the second protrusion are configured to flex toward each other to enable the third protrusion and the fourth protrusion to pass through the first channel, and the first protrusion and the second protrusion are configured to flex away from each other to enable the third protrusion and the fourth protrusion to interfere with the second opening to impede the first and second cantilever protrusions from exiting the first channel.

19. The mounting system of claim 2, wherein the headphone support comprises a platform configured to hold the headband, the platform comprises a first channel having a proximal opening and a distal opening, and the first cantilever beam comprises a first central axis oriented in a first direction toward the headphone support, the mounting system further comprising a first protrusion coupled to the distal portion of the first cantilever beam and a second protrusion coupled to the distal portion of the first cantilever beam, wherein the first protrusion protrudes in a second direction that is within twenty degrees of parallel to the first direction, and the second protrusion protrudes in a third direction that is within twenty degrees of parallel to the first direction, wherein the first protrusion and the second protrusion are located at least partially in the first channel, a third protrusion is coupled to a distal portion of the first protrusion, and the third protrusion interferes with the distal opening such that the third protrusion is configured to impede the first protrusion from exiting the first channel out of the proximal opening.

20. The mounting system of claim 2, wherein the headphone support comprises a platform configured to hold the headband, and the platform comprises a distal sidewall, a proximal sidewall, a front sidewall, and a back sidewall, the headphone support further comprises a rubber pad located at least partially between the distal sidewall, the proximal sidewall, the front sidewall, and the back sidewall.

21. The mounting system of claim 20, wherein the rubber pad comprises a first sidewall coupled to a proximal portion of the rubber pad and a second sidewall coupled to a distal portion of the rubber pad, wherein at least a portion of the headband is located between the first sidewall and the second sidewall such that the first cantilever beam positions the portion of the headband to at least one of a left side of the monitor and a right side of the monitor, and the first adhesive couples the base to the backside of the monitor.

22. The mounting system of claim 2, wherein the headphone support comprises a platform configured to hold the headband, the platform comprises a first channel, at least a first portion of the first cantilever beam is located in the first channel, the headphone support comprises a rubber pad configured to face upward toward at least a portion of the headband, the rubber pad comprises an open area, and the rubber pad is coupled to the platform such that the first channel is located at least partially in the open area of the rubber pad.

\* \* \* \* \*